US012038705B2

(12) United States Patent
Furuichi et al.

(10) Patent No.: US 12,038,705 B2
(45) Date of Patent: Jul. 16, 2024

(54) NIP FORMING DEVICE AND IMAGE FORMING APPARATUS

(71) Applicants: Yuusuke Furuichi, Kanagawa (JP); Hiroyuki Shimada, Tokyo (JP); Yukimichi Someya, Saitama (JP)

(72) Inventors: Yuusuke Furuichi, Kanagawa (JP); Hiroyuki Shimada, Tokyo (JP); Yukimichi Someya, Saitama (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/060,566

(22) Filed: Nov. 30, 2022

(65) Prior Publication Data

US 2023/0185222 A1 Jun. 15, 2023

(30) Foreign Application Priority Data

Dec. 9, 2021 (JP) ................................ 2021-200075
Oct. 20, 2022 (JP) ................................ 2022-168319

(51) Int. Cl.
*G03G 15/20* (2006.01)

(52) U.S. Cl.
CPC ..... *G03G 15/2053* (2013.01); *G03G 15/2028* (2013.01); *G03G 15/2064* (2013.01); *G03G 2215/2038* (2013.01)

(58) Field of Classification Search
CPC ........... G03G 15/2028; G03G 15/2032; G03G 15/2035; G03G 15/2042; G03G 15/2053;
(Continued)

(56) References Cited

U.S. PATENT DOCUMENTS

2009/0110452 A1* 4/2009 Ogata ................ G03G 15/2028 399/331
2012/0082491 A1 4/2012 Yamada
(Continued)

FOREIGN PATENT DOCUMENTS

EP 2 778 796 A2 9/2014
JP 2000-219383 A 8/2000
(Continued)

OTHER PUBLICATIONS

Extended European Search Report issued Apr. 13, 2023 in European Patent Application No. 22208191.1, 9 pages.
(Continued)

*Primary Examiner* — Sophia S Chen
(74) *Attorney, Agent, or Firm* — XSENSUS LLP

(57) ABSTRACT

A nip forming device includes an endless belt that is flexible and rotates and a nip former that is disposed opposite an inner circumferential face of the endless belt. A pressure rotator presses against the nip former via the endless belt to form a nip between the endless belt and the pressure rotator, through which a conveyed object is conveyed. A separator is disposed downstream from the nip in a conveyance direction of the conveyed object. The separator separates the conveyed object from the endless belt. The separator includes a non-contact portion separated from the endless belt and a contact portion that contacts the endless belt. The contact portion retains a gap having a predetermined size between the non-contact portion and the endless belt.

19 Claims, 28 Drawing Sheets

(58) Field of Classification Search
CPC ........... G03G 15/2064; G03G 21/1647; G03G 21/1685; G03G 2215/2035; G03G 2215/2038
See application file for complete search history.

(56) References Cited

U.S. PATENT DOCUMENTS

| | | | | |
|---|---|---|---|---|
| 2013/0189005 | A1* | 7/2013 | Saito | G03G 15/2053 399/323 |
| 2013/0236225 | A1 | 9/2013 | Ogawa et al. | |
| 2014/0029989 | A1 | 1/2014 | Koda et al. | |
| 2014/0255064 | A1* | 9/2014 | Suzuki | G03G 15/2028 399/329 |
| 2014/0301751 | A1 | 10/2014 | Takagi et al. | |
| 2015/0030358 | A1 | 1/2015 | Yamakawa | |
| 2019/0196374 | A1* | 6/2019 | Adachi | G03G 15/2042 |
| 2021/0003946 | A1 | 1/2021 | Takahashi et al. | |
| 2021/0278790 | A1 | 9/2021 | Furuichi et al. | |
| 2022/0179338 | A1 | 6/2022 | Seshita et al. | |
| 2022/0283530 | A1 | 9/2022 | Adachi et al. | |
| 2022/0291610 | A1 | 9/2022 | Seki et al. | |
| 2022/0299920 | A1 | 9/2022 | Shimada et al. | |
| 2022/0308511 | A1 | 9/2022 | Someya et al. | |

FOREIGN PATENT DOCUMENTS

| | | |
|---|---|---|
| JP | 2010-204543 A | 9/2010 |
| JP | 2013-186394 | 9/2013 |
| JP | 2015-011167 | 1/2015 |
| JP | 2015-200702 A | 11/2015 |
| JP | 2017-173777 A | 9/2017 |
| JP | 2019-082733 | 5/2019 |
| JP | 2020-052345 | 4/2020 |

OTHER PUBLICATIONS

Office Action issued Apr. 25, 2024 in European Patent Application No. 22 208 191.1, 6 pages.

Office Action issued May 9, 2024 in Chinese Patent Application No. 202211580444.8, 6 pages.

* cited by examiner

NIP FORMING DEVICE AND IMAGE FORMING APPARATUS

CROSS-REFERENCE TO RELATED APPLICATION

This patent application is based on and claims priority pursuant to 35 U.S.C. § 119(a) to Japanese Patent Application Nos. 2021-200075, filed on Dec. 9, 2021, and 2022-168319, filed on Oct. 20, 2022, in the Japan Patent Office, the entire disclosure of each of which is hereby incorporated by reference herein.

BACKGROUND

Technical Field

Embodiments of this disclosure relate to a nip forming device and an image forming apparatus, and more specifically, to a nip forming device including a separator for separating a conveyed object having passed through a nip from an endless belt and an image forming apparatus incorporating the nip forming device.

Related Art

Related-art image forming apparatuses, such as copiers, facsimile machines, printers, and multifunction peripherals (MFP) having two or more of copying, printing, scanning, facsimile, plotter, and other functions, typically form an image on a recording medium according to image data.

Such image forming apparatuses include a fixing device that fixes an image on a recording medium such as a sheet. The fixing device employs a belt fixing method using an endless belt.

SUMMARY

This specification describes below an improved nip forming device. In one embodiment, the nip forming device includes an endless belt that is flexible and rotates and a nip former that is disposed opposite an inner circumferential face of the endless belt. A pressure rotator presses against the nip former via the endless belt to form a nip between the endless belt and the pressure rotator, through which a conveyed object is conveyed. A separator is disposed downstream from the nip in a conveyance direction of the conveyed object. The separator separates the conveyed object from the endless belt. The separator includes a non-contact portion separated from the endless belt and a contact portion that contacts the endless belt. The contact portion retains a gap having a predetermined size between the non-contact portion and the endless belt.

This specification further describes an improved image forming apparatus. In one embodiment, the image forming apparatus includes an image forming device that forms an image and the nip forming device described above through which a conveyed object bearing the image is conveyed.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
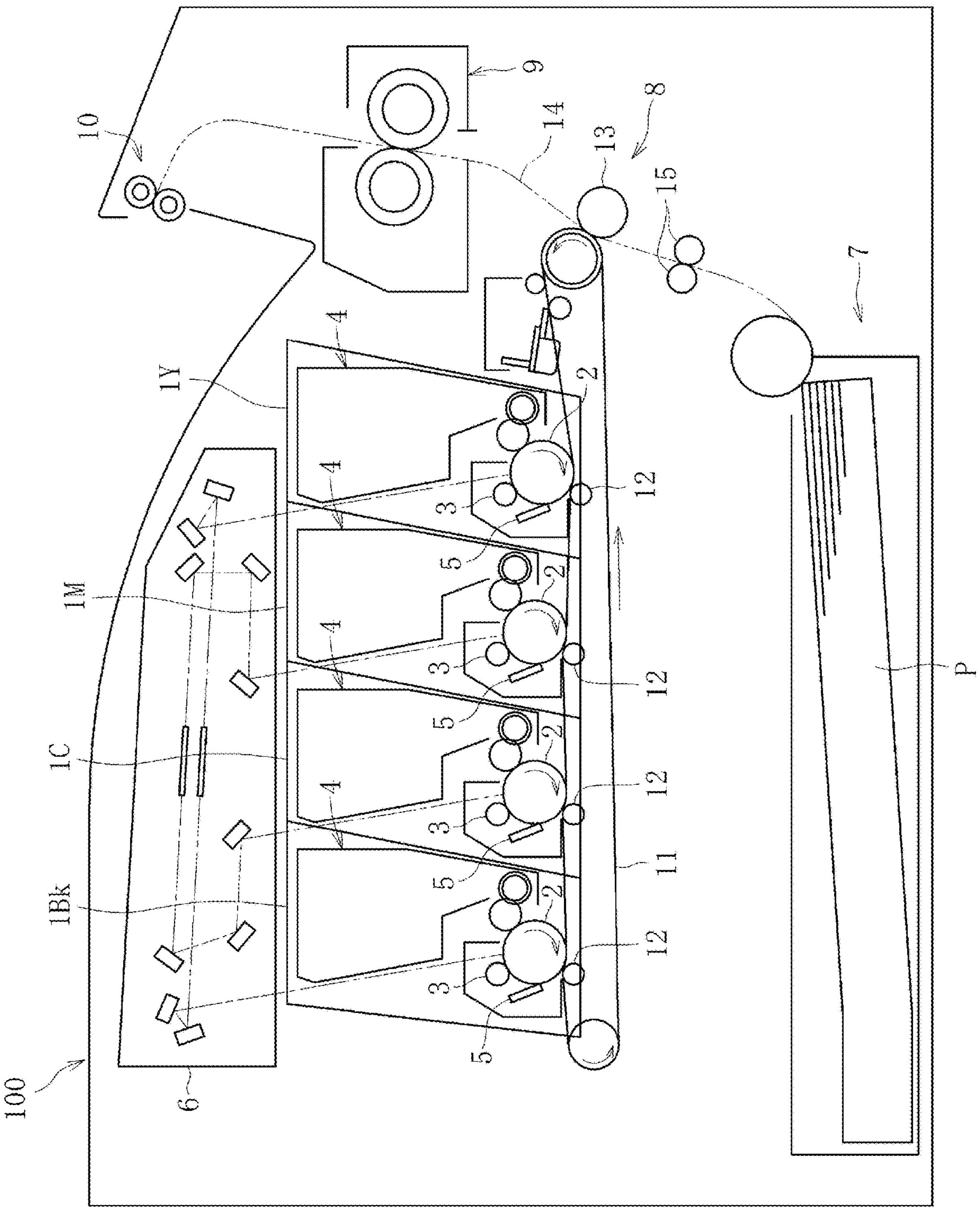
FIG. 1 is a schematic cross-sectional view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Referring to the attached drawings, the following describes embodiments of the present disclosure. In the drawings for explaining the embodiments of the present disclosure, identical reference numerals are assigned to elements such as members and parts that have an identical function or an identical shape as long as differentiation is possible and a description of those elements is omitted once the description is provided.

A description is provided of a construction of an image forming apparatus 100.

FIG. 1 is a schematic cross-sectional view of the image forming apparatus 100 according to an embodiment of the present disclosure. As illustrated in FIG. 1, the image forming apparatus 100 includes four image forming units 1Y, 1M, 1C, and 1Bk, serving as image forming devices, that are installed in a body of the image forming apparatus 100 such that the mage forming units 1Y, 1M, 1C, and 1Bk are attached to and removed from the body of the image forming apparatus 100 for maintenance or replacement.

The image forming units 1Y, 1M, 1C, and 1Bk have a similar construction. However, the image forming units 1Y, 1M, 1C, and 1Bk contain developers in different colors, that is, yellow, magenta, cyan, and black, respectively, which correspond to color separation components for a color image. For example, each of the image forming units 1Y, 1M, 1C, and 1Bk includes a photoconductor 2, a charger 3, a developing device 4, and a cleaner 5. The photoconductor 2 is drum-shaped and serves as an image bearer. The charger 3 charges a surface of the photoconductor 2. The developing device 4 supplies toner as the developer to the surface of the photoconductor 2 to form a toner image. The cleaner 5 cleans the surface of the photoconductor 2.

The image forming apparatus 100 further includes an exposure device 6, a sheet feeder 7, a transfer device 8, a fixing device 9, and an output device 10. The exposure device 6 exposes the surface of each of the photoconductors 2 and forms an electrostatic latent image thereon. The sheet feeder 7 supplies a sheet P serving as a conveyed object or a recording medium to the transfer device 8. The transfer device 8 transfers the toner image formed on each of the photoconductors 2 onto the sheet P. The fixing device 9 serves as a nip forming unit or a nip forming device that fixes the toner image transferred onto the sheet P thereon. The output device 10 ejects the sheet P onto an outside of the image forming apparatus 100. The recording media include, in addition to plain paper as a sheet P, thick paper, a postcard, an envelope, thin paper, coated paper, art paper, tracing paper, an overhead projector (OHP) transparency, plastic film, prepreg, and copper foil.

The transfer device 8 includes an intermediate transfer belt 11, four primary transfer rollers 12, and a secondary transfer roller 13. The intermediate transfer belt 11 is an endless belt serving as an intermediate transferor stretched taut across a plurality of rollers. The four primary transfer rollers 12 serve as primary transferors that transfer yellow, magenta, cyan, and black toner images formed on the photoconductors 2 onto the intermediate transfer belt 11, respectively, thus forming a full color toner image on the intermediate transfer belt 11. The secondary transfer roller 13 serves as a secondary transferor that transfers the full color toner image formed on the intermediate transfer belt 11 onto the sheet P. The plurality of primary transfer rollers 12 is pressed against the photoconductors 2, respectively, via the intermediate transfer belt 11.

Accordingly, the intermediate transfer belt 11 contacts each of the photoconductors 2, forming a primary transfer nip therebetween. On the other hand, the secondary transfer roller 13 is pressed against one of the plurality of rollers across which the intermediate transfer belt 11 is stretched taut via the intermediate transfer belt 11. Thus, a secondary transfer nip is formed between the secondary transfer roller 13 and the intermediate transfer belt 11.

The image forming apparatus 100 accommodates a sheet conveyance path 14 through which the sheet P fed from the sheet feeder 7 is conveyed. The sheet conveyance path 14 is provided with a timing roller pair 15 at a position between the sheet feeder 7 and the secondary transfer nip defined by the secondary transfer roller 13.

Referring to FIG. 1, a description is provided of printing processes performed by the image forming apparatus 100 having the construction described above.

When the image forming apparatus 100 receives an instruction to start printing, a driver disposed inside the body of the image forming apparatus 100 drives and rotates the photoconductor 2 clockwise in FIG. 1 in each of the image forming units 1Y, 1M, 1C, and 1Bk. The charger 3 charges the surface of the photoconductor 2 uniformly at a high electric potential. Subsequently, the exposure device 6 exposes the surface of each of the photoconductors 2 based on image data (e.g., print data) instructed by a terminal, thus decreasing the electric potential of an exposed portion on the photoconductor 2 and forming an electrostatic latent image on the photoconductor 2. Alternatively, if the image forming apparatus 100 is a copier, the exposure device 6 exposes the charged surfaces of the photoconductors 2, respectively, according to image data created by a scanner that reads an image on an original. The developing device 4 of each of the image forming units 1Y, 1M, 1C, and 1Bk supplies toner to the electrostatic latent image formed on the photoconductor 2, forming a toner image thereon.

When the toner images formed on the photoconductors 2 reach the primary transfer nips defined by the primary transfer rollers 12 in accordance with rotation of the photoconductors 2, the primary transfer rollers 12 transfer the toner images formed on the photoconductors 2 onto the intermediate transfer belt 11 driven and rotated counterclockwise in FIG. 1 successively such that the toner images are superimposed on the intermediate transfer belt 11, forming a full color toner image thereon. Thereafter, as the full color toner image formed on the intermediate transfer belt 11 is conveyed to the secondary transfer nip defined by the secondary transfer roller 13 in accordance with rotation of the intermediate transfer belt 11, the secondary transfer roller 13 transfers the full color toner image onto a sheet P conveyed to the secondary transfer nip.

The sheet P is supplied from the sheet feeder 7. The timing roller pair 15 temporarily halts the sheet P supplied from the sheet feeder 7. Thereafter, the timing roller pair 15 conveys the sheet P to the secondary transfer nip at a time when the full color toner image formed on the intermediate transfer belt 11 reaches the secondary transfer nip. The secondary transfer roller 13 transfers the full color toner image onto the sheet P. Thus, the sheet P bears the full color toner image. After the toner image is transferred onto the intermediate transfer belt 11, the cleaner 5 removes residual toner remaining on the photoconductor 2 therefrom.

The sheet P transferred with the full color toner image is conveyed to the fixing device 9 that fixes the full color toner image on the sheet P. Thereafter, the output device 10 ejects the sheet P onto the outside of the image forming apparatus 100, thus finishing a series of printing processes.

A description is provided of a construction of the fixing device 9, serving as the nip forming unit or the nip forming device, according to an embodiment of the present disclosure.

Figure 2:
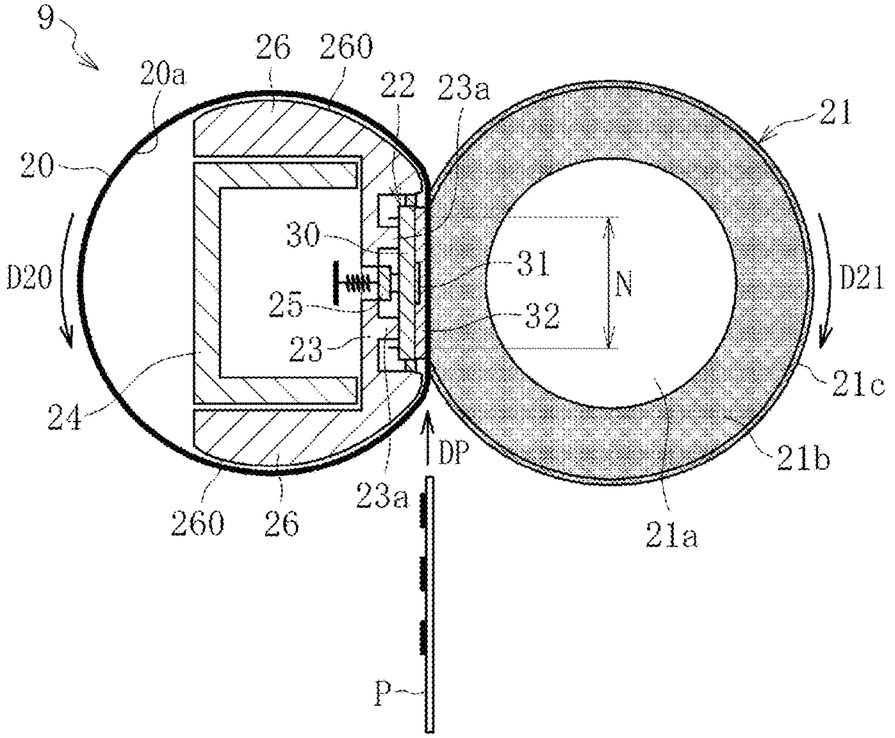
FIG. 2 is a schematic cross-sectional view of a fixing device incorporated in the image forming apparatus depicted in FIG. 1.

As illustrated in FIG. 2, the fixing device 9 according to the embodiment includes a fixing belt 20, a pressure roller 21, a heater 22, a heater holder 23, a stay 24, and thermistors 25. The fixing belt 20 is an endless belt. The fixing belt 20 rotates in a rotation direction D20. The pressure roller 21 serves as an opposed rotator or a pressure rotator that contacts an outer circumferential face of the fixing belt 20 to form a fixing nip N between the fixing belt 20 and the pressure roller 21. The pressure roller 21 rotates in a rotation direction D21. The heater 22 heats the fixing belt 20. The heater holder 23 serves as a holder that holds or supports the heater 22. The stay 24 serves as a support that supports the heater holder 23. The thermistors 25 serve as temperature detectors that detect temperatures of the heater 22, respectively.

The fixing belt 20 includes a tubular base layer that is made of polyimide (PI) and has an outer diameter of 25 mm and a thickness in a range of from 40 μm to 120 μm, for example. The fixing belt 20 further includes a release layer serving as an outermost surface layer. The release layer is made of fluororesin, such as perfluoroalkoxy alkane (PFA) and polytetrafluoroethylene (PTFE), and has a thickness in a range of from 5 μm to 50 μm to enhance durability of the fixing belt 20 and facilitate separation of the sheet P and a foreign substance from the fixing belt 20.

The fixing belt 20 may further include an elastic layer that is interposed between the base layer and the release layer. The elastic layer is made of rubber or the like and has a thickness in a range of from 50 μm to 500 μm. The base layer of the fixing belt 20 may be made of heat-resistant resin such as polyetheretherketone (PEEK) or metal such as nickel (Ni) and stainless used steel (SUS), instead of polyimide. The fixing belt 20 may include an inner circumferential face 20*a* that is coated with polyimide, PTFE, or the like to produce a sliding layer.

The pressure roller 21 has an outer diameter of 25 mm, for example. The pressure roller 21 includes a core metal 21*a*, an elastic layer 21*b*, and a release layer 21*c*. The core metal 21*a* is solid and made of iron. The elastic layer 21*b* is disposed on a surface of the core metal 21*a*. The release layer 21*c* coats an outer surface of the elastic layer 21*b*. The elastic layer 21*b* is made of silicone rubber and has a thickness of 3.5 mm, for example. In order to facilitate separation of the sheet P and the foreign substance from the pressure roller 21, the release layer 21*c* that is made of fluororesin and has a thickness of approximately 40 μm, for example, is preferably disposed on the outer surface of the elastic layer 21*b*.

The fixing device 9 further includes a biasing member that biases the pressure roller 21 toward the fixing belt 20, pressing the pressure roller 21 against the heater 22 via the fixing belt 20. Thus, the fixing nip N is formed between the fixing belt 20 and the pressure roller 21. The fixing device 9 further includes a driver that drives and rotates the pressure roller 21. As the pressure roller 21 rotates in the rotation direction D21, the fixing belt 20 is driven and rotated by the pressure roller 21.

The heater 22 is a laminated heater that extends in a longitudinal direction thereof throughout an entire span of the fixing belt 20 in a width direction, that is, a longitudinal direction, of the fixing belt 20. The heater 22 includes a base 30 that is platy, resistive heat generators 31 that are disposed on the base 30, and an insulating layer 32 that coats the resistive heat generators 31. The insulating layer 32 of the heater 22 contacts the inner circumferential face 20*a* of the fixing belt 20. The resistive heat generators 31 generate heat that is conducted to the fixing belt 20 through the insulating layer 32.

According to the embodiment, the base 30 includes a fixing belt opposed face that is disposed opposite the fixing belt 20 and the fixing nip N. The fixing belt opposed face mounts the resistive heat generators 31 and the insulating layer 32. Alternatively, the resistive heat generators 31 and the insulating layer 32 may be mounted on a heater holder opposed face of the base 30, which is disposed opposite the heater holder 23. In this case, heat generated by the resistive heat generators 31 is conducted to the fixing belt 20 through the base 30. Hence, the base 30 is preferably made of a material having an increased thermal conductivity, such as aluminum nitride. The base 30 made of the material having the increased thermal conductivity causes the resistive heat generators 31 to heat the fixing belt 20 sufficiently, even if the resistive heat generators 31 are disposed on the heater holder opposed face of the base 30.

The heater holder 23 and the stay 24 are disposed within a loop formed by the fixing belt 20. The stay 24 includes a channel made of metal. The stay 24 have both lateral ends in a longitudinal direction thereof, which are supported by side plates of the fixing device 9, respectively. Since the stay 24 supports the heater holder 23 and the heater 22 supported by the heater holder 23, in a state in which the pressure roller 21 is pressed against the fixing belt 20, the heater 22 receives pressure from the pressure roller 21 precisely to form the fixing nip N stably.

Since the heater holder 23 is subject to high temperatures by heat from the heater 22, the heater holder 23 is preferably made of a heat-resistant material. For example, if the heater holder 23 is made of heat-resistant resin having a decreased thermal conductivity, such as liquid crystal polymer (LCP), the heater holder 23 suppresses conduction of heat thereto from the heater 22, facilitating heating of the fixing belt 20.

In order to decrease a contact area where the heater holder 23 contacts the heater 22 and thereby reduce an amount of heat conducted from the heater 22 to the heater holder 23, the heater holder 23 includes projections 23*a* that contact the base 30 of the heater 22. According to the embodiment, the projections 23*a* of the heater holder 23 do not contact a part of the heater holder opposed face of the base 30, which is opposite to the resistive heat generators 31 mounted on the fixing belt opposed face of the base 30, that is, a part of the base 30, which is susceptible to temperature increase, thus decreasing the amount of heat conducted to the heater holder 23 further and causing the heater 22 to heat the fixing belt 20 efficiently.

The heater holder 23 mounts guides 26 that guide the fixing belt 20. The guides 26 are disposed upstream from and below the heater 22 and disposed downstream from and above the heater 22 in FIG. 2, respectively, in the rotation direction D20 of the fixing belt 20.

Figure 3:
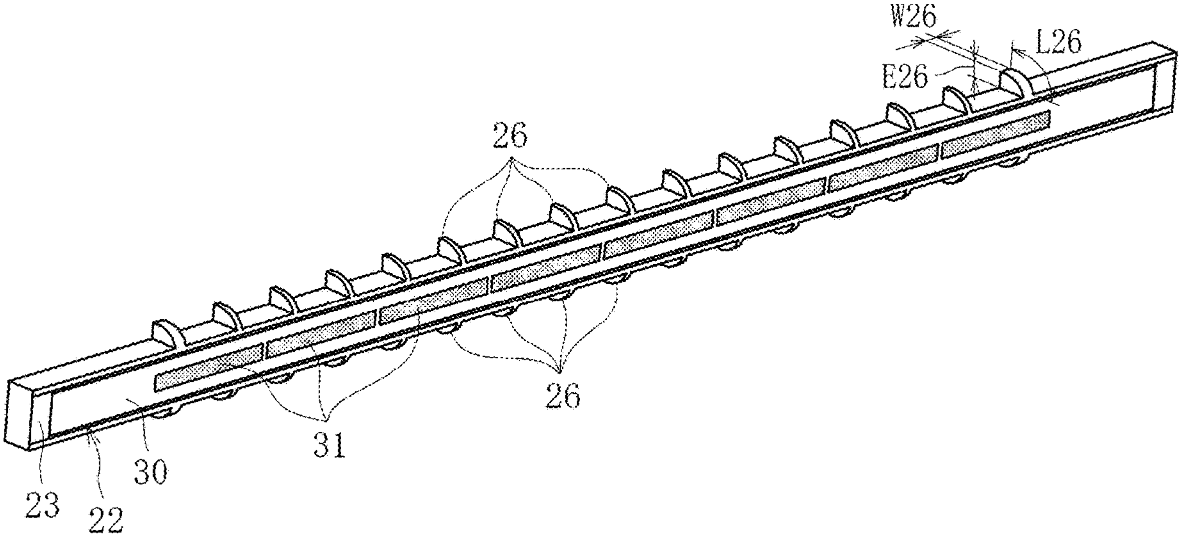
FIG. 3 is a perspective view of a heater, a heater holder, and guides incorporated in the fixing device depicted in FIG. 2.

As illustrated in FIG. 3, the plurality of guides 26 disposed upstream and downstream from the heater 22 in the rotation direction D20 of the fixing belt 20 is arranged in the longitudinal direction of the heater 22, that is, the width direction of the fixing belt 20, with a gap between the adjacent guides 26. Each of the guides 26 is substantially fan-shaped. As illustrated in FIG. 2, each of the guides 26 includes a fixing belt opposed face 260 that is disposed opposite the inner circumferential face 20*a* of the fixing belt 20 and defines an arc or a projecting curved face that extends in a circumferential direction of the fixing belt 20. As illustrated in FIG. 3, according to the embodiment, each of the guides 26 disposed at both lateral ends of the heater 22 in the longitudinal direction thereof has a width W26 that is greater than a width W26 of each of other guides 26. However, each of the guides 26 has a length L26 (e.g., a circumferential length) in the circumferential direction of the fixing belt 20 and a height E26, which are common.

In the fixing device 9 according to the embodiment, when printing starts, the driver drives and rotates the pressure roller 21 and the fixing belt 20 starts rotation in accordance with rotation of the pressure roller 21. Since the inner circumferential face 20*a* of the fixing belt 20 is contacted and guided by the fixing belt opposed face 260 of each of the guides 26, the fixing belt 20 rotates stably and smoothly.

Additionally, as power is supplied to the resistive heat generators 31 of the heater 22, the heater 22 heats the fixing belt 20. In a state in which the temperature of the fixing belt 20 reaches a predetermined target temperature (e.g., a fixing temperature), as a sheet P bearing an unfixed toner image is conveyed through the fixing nip N formed between the fixing belt 20 and the pressure roller 21 in a sheet conveyance direction DP as illustrated in FIG. 2, the fixing belt 20 and the pressure roller 21 fix the unfixed toner image on the sheet P under heat and pressure.

A description is provided of a construction of the heater 22.

Figure 4:
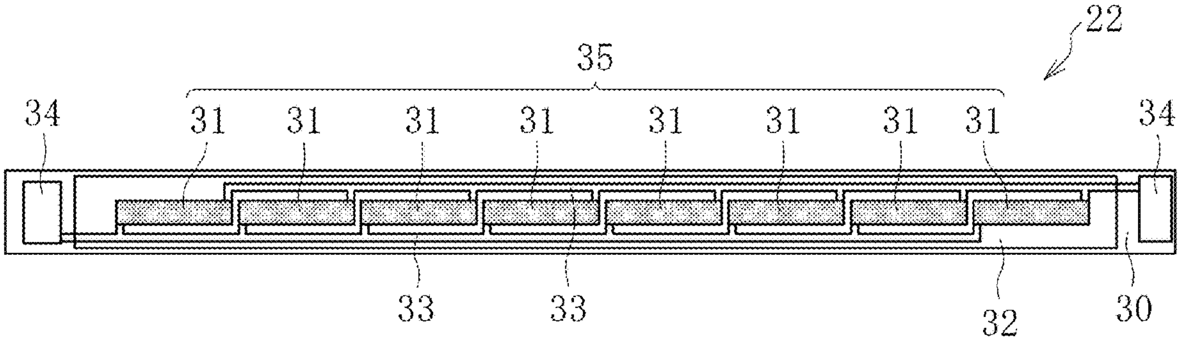
FIG. 4 is a plan view of the heater depicted in FIG. 3.

FIG. 4 is a plan view of the heater 22 according to the embodiment. As illustrated in FIG. 4, the heater 22 according to the embodiment includes the plurality of resistive heat generators 31 arranged in the longitudinal direction of the heater 22, that is, the width direction of the fixing belt 20, with a gap between the adjacent resistive heat generators 31. In other words, the heater 22 includes a heat generating portion 35 that is divided into the plurality of resistive heat generators 31 arranged in the width direction of the fixing belt 20. The heat generating portion 35 may be divided into at least three or four parts that construct lateral end heaters and a center heater. The lateral end heaters are disposed opposite and heat both lateral end spans of the fixing belt 20 in the longitudinal direction thereof, respectively. The center heater is disposed opposite and heats a center span of the fixing belt 20 in the longitudinal direction thereof.

The resistive heat generators 31 are electrically connected in parallel to a pair of electrodes 34 through feeders 33. The electrodes 34 are mounted on both lateral ends of the base 30 in a longitudinal direction thereof, respectively. Each of the feeders 33 is made of a conductor having a resistance value smaller than a resistance value of the resistive heat generator 31.

The adjacent resistive heat generators 31 define the gap therebetween, that is 0.2 mm or greater, preferably 0.4 mm or greater, in view of ensuring insulation between the adjacent resistive heat generators 31. If the gap between the adjacent resistive heat generators 31 is excessively great, the fixing belt 20 is subject to temperature decrease at an opposed portion thereon that is disposed opposite the gap. Hence, the gap is 5 mm or smaller, preferably 1 mm or smaller, in view of suppressing uneven temperature of the fixing belt 20 in the longitudinal direction thereof.

The resistive heat generators 31 are made of a material having a positive temperature coefficient (PTC) property that is characterized in that the resistance value increases, that is, a heater output decreases, as the temperature increases. Accordingly, if a sheet P having a decreased width that is smaller than an entire width of the heat generating portion 35 is conveyed through the fixing nip N, for example, since the sheet P does not draw heat from the fixing belt 20 in an outboard span that is outboard from the sheet P in the width direction of the fixing belt 20, the resistive heat generators 31 in the outboard span are subject to temperature increase.

Since a constant voltage is applied to the resistive heat generators 31, when the temperature of the resistive heat generators 31 in the outboard span increases and the resistance value thereof increases, conversely, an output (e.g., a heat generating amount) from the resistive heat generators 31 decreases relatively, suppressing temperature increase of the resistive heat generators 31 that are disposed at both lateral ends of the heat generating portion 35 in a longitudinal direction thereof. Additionally, the plurality of resistive heat generators 31 is electrically connected in parallel, suppressing temperature increase in a non-conveyance span where the sheet P is not conveyed while retaining the printing speed.

Alternatively, the heat generating portion 35 may include heat generators other than the resistive heat generators 31 having the PTC property. The heat generators may be arranged in a plurality of columns in a short direction of the heater 22.

For example, the resistive heat generator 31 is produced as below. Silver-palladium (AgPd), glass powder, and the like are mixed into paste. The paste coats the base 30 by screen printing or the like. Thereafter, the base 30 is subject to firing. According to the embodiment, the resistive heat generator 31 has a resistance value of 80Ω at an ambient temperature.

Alternatively, the resistive heat generators 31 may be made of a resistive material such as a silver alloy (AgPt) and ruthenium oxide ($RuO_2$). The feeders 33 and the electrodes 34 are made of a material prepared with silver (Ag) or silver-palladium (AgPd) by screen printing or the like.

The base 30 is preferably made of ceramic, such as alumina and aluminum nitride, or a nonmetallic material, such as glass and mica, which has an increased heat resistance and an increased insulation. According to the embodiment, the base 30 is made of alumina and has a short width of 8 mm, a longitudinal length of 270 mm, and a thickness of 1.0 mm.

Alternatively, the base 30 may include a conductive layer made of metal or the like and an insulating layer disposed on the conductive layer. The metal is preferably aluminum, stainless steel, or the like that is available at reduced costs. In order to improve evenness of heat generated by the heater 22 so as to enhance quality of an image formed on a sheet P, the base 30 may be made of a material that has an increased thermal conductivity such as copper, graphite, and graphene.

The insulating layer 32 is made of heat-resistant glass and has a thickness of 75 μm, for example. The insulating layer 32 covers the resistive heat generators 31 and the feeders 33 and insulates and protects the resistive heat generators 31 and the feeders 33 while retaining smooth sliding of the fixing belt 20 over the heater 22.

Figure 5:
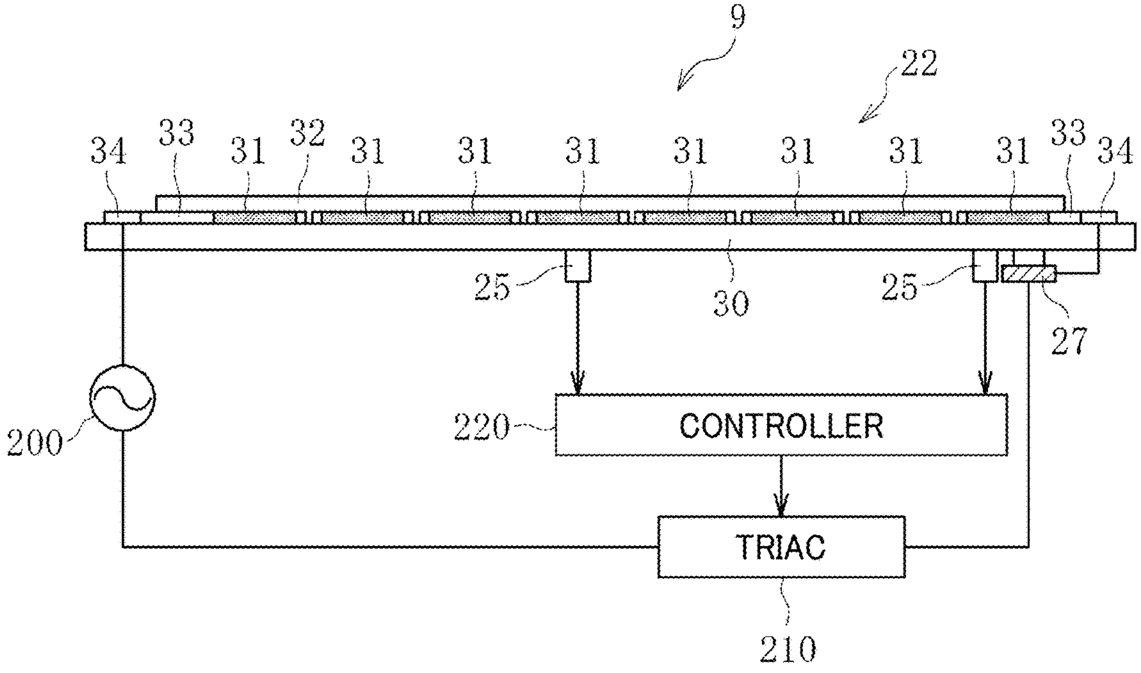
FIG. 5 is a diagram of a power supply circuit that supplies power to the heater depicted in FIG. 4.

FIG. 5 is a diagram of the heater 22 according to the embodiment, illustrating a power supply circuit that supplies power to the heater 22.

As illustrated in FIG. 5, according to the embodiment, the power supply circuit for supplying power to the resistive heat generators 31 includes an alternating current power supply 200 that is electrically connected to the electrodes 34 of the heater 22. The power supply circuit further includes a triac 210 that controls an amount of power supplied to the resistive heat generators 31.

The power supply circuit further includes a controller 220 that controls the amount of power supplied to the resistive heat generators 31 through the triac 210 based on temperatures of the heater 22, that are detected by the thermistors 25 serving as the temperature detectors, respectively. The controller 220 includes a microcomputer that includes a central processing unit (CPU), a read only memory (ROM), a random access memory (RAM), and an input-output (I/O) interface.

According to the embodiment, the thermistors 25 serving as the temperature detectors are disposed opposite a center span of the heater 22 in the longitudinal direction thereof, that is, a minimum sheet conveyance span where a minimum size sheet P available in the fixing device 9 is conveyed, and one lateral end span of the heater 22 in the longitudinal direction thereof, respectively. The fixing device 9 further includes a thermostat 27 serving as a power interrupter that is disposed opposite one lateral end of the heater 22 in the longitudinal direction thereof. The thermostat 27 interrupts supplying power to the resistive heat generators 31 when a temperature of the resistive heat generator 31 is a predetermined temperature or higher. The thermistors 25 and the thermostat 27 contact a back face of the base 30, which is opposite to a front face of the base 30, which mounts the resistive heat generators 31. The thermistors 25 and the thermostat 27 detect the temperature of the resistive heat generators 31.

Figure 6:
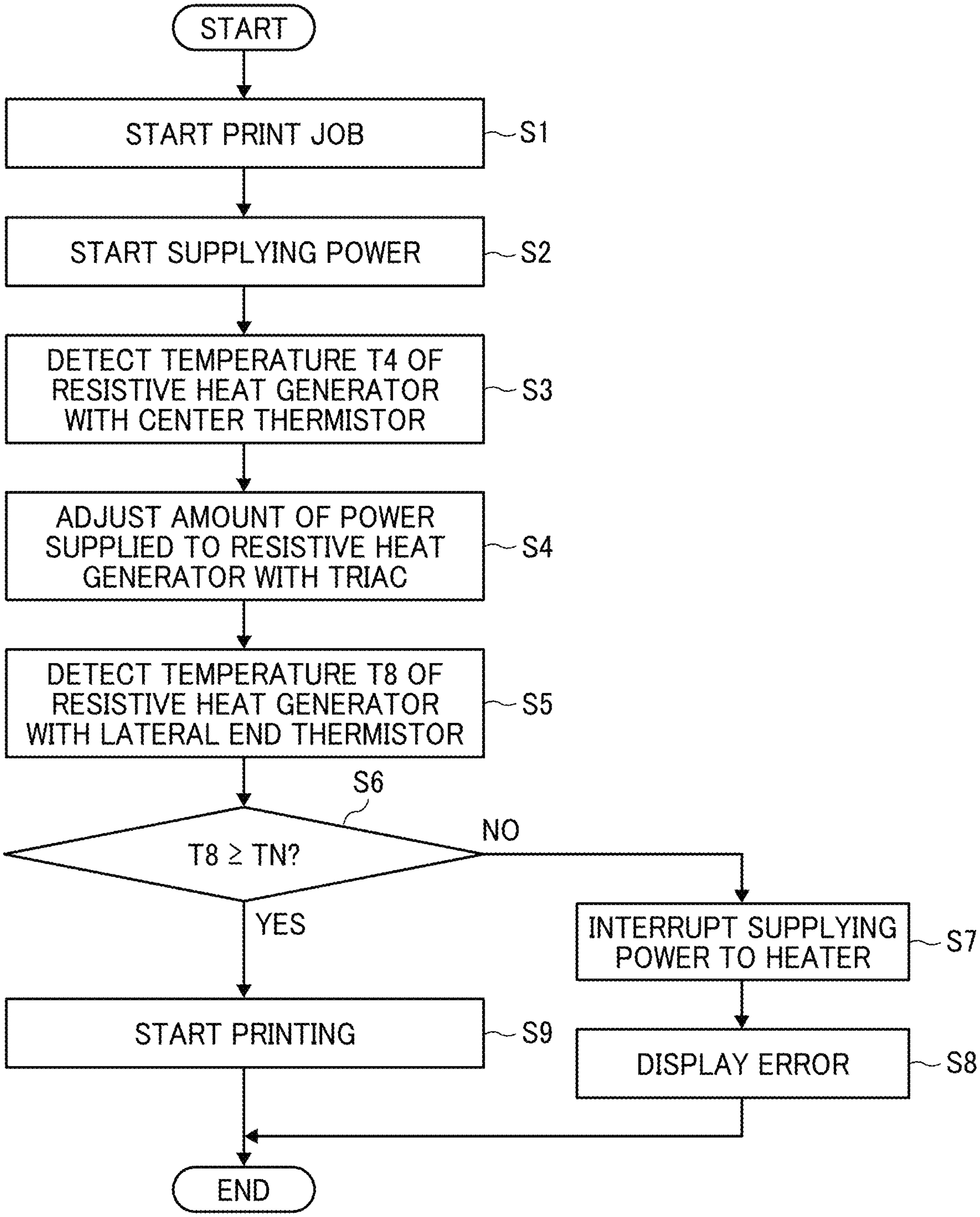
FIG. 6 is a flowchart illustrating control processes for controlling the heater depicted in FIG. 5.

Referring to FIG. 6 illustrating a flowchart, a description is provided of control processes for controlling the heater 22 according to the embodiment.

As illustrated in FIG. 6, in step S1, the image forming apparatus 100 starts a print job. In step S2, the controller 220 causes the alternating current power supply 200 to start supplying power to the resistive heat generators 31 of the heater 22.

Accordingly, the resistive heat generators 31 start generating heat, heating the fixing belt 20. In step S3, the thermistor 25, that is, a center thermistor, disposed opposite the center span of the heater 22 in the longitudinal direction thereof, detects a temperature T4 of the resistive heat generator 31 disposed in the center span of the heater 22 in the longitudinal direction thereof. In step S4, based on the temperature T4 sent from the thermistor 25, that is, the center thermistor, the controller 220 controls the triac 210 to adjust the amount of power supplied to the resistive heat generators 31 so that the resistive heat generators 31 attain a predetermined temperature.

Simultaneously, in step S5, the thermistor 25, that is, a lateral end thermistor, disposed opposite the lateral end span of the heater 22 in the longitudinal direction thereof, also detects a temperature T8 of the resistive heat generator 31 disposed in the lateral end span of the heater 22 in the longitudinal direction thereof. In step S6, the controller 220 determines whether or not the temperature T8 of the resistive heat generator 31, that is detected by the thermistor 25 serving as the lateral end thermistor, is a predetermined temperature TN or higher (T8≥TN). If the controller 220 determines that the temperature T8 of the resistive heat generator 31 is lower than the predetermined temperature TN (NO in step S6), the controller 220 determines that an abnormally decreased temperature (e.g., disconnection) generates and interrupts supplying power to the heater 22 in step S7. In step S8, the controller 220 causes a control panel of the image forming apparatus 100 to display an error. Conversely, if the controller 220 determines that the temperature T8 of the resistive heat generator 31, that is detected by the thermistor 25, is the predetermined temperature TN or higher (YES in step S6), the controller 220 determines that no abnormally decreased temperature generates and starts printing in step S9.

If the controller 220 does not perform temperature control based on the temperature detected by the thermistor 25, that is, the center thermistor, due to breakage, disconnection, or the like of the resistive heat generator 31, the resistive heat generator 31 disposed in the lateral end span of the heater 22 in the longitudinal direction thereof and other resistive heat generators 31 may suffer from an abnormally increased temperature. In this case, when the temperature of the resistive heat generator 31 reaches the predetermined temperature TN or higher, the controller 220 activates the thermostat 27 to interrupt supplying power to the resistive heat generators 31, preventing the resistive heat generators 31 from suffering from the abnormally increased temperature.

A description is provided of a construction of a comparative fixing device.

The comparative fixing device includes a fixing belt and a sheet separation plate disposed in proximity to the fixing belt. The sheet separation plate separates a sheet from the fixing belt. If a gap between the fixing belt and the sheet separation plate is excessively small, the sheet separation plate comes into contact with the fixing belt easily, damaging the fixing belt and resulting in formation of a faulty image.

If the gap between the fixing belt and the sheet separation plate is excessively great, the sheet passes through the gap easily and is wound around the fixing belt, causing the sheet to be jammed. Hence, the sheet separation plate is requested to be closer to the fixing belt without contacting the fixing belt.

The comparative fixing device includes a sheet separation plate mover that adjusts and optimizes the gap. However, the sheet separation plate mover includes a driver that drives the sheet separation plate and a plurality of sensors, causing the construction of the comparative fixing device to be complex and increasing costs. To address the circumstances described above of the comparative fixing device, the fixing device 9 according to the embodiments of the present disclosure optimizes a gap between an endless belt (e.g., the fixing belt 20) and a separator with a simple construction, improving separation of a conveyed object (e.g., the sheet P) from the endless belt as described below.

A description is provided of a construction of a sheet separation assembly 300 incorporated in the fixing device 9.

Figure 7A:
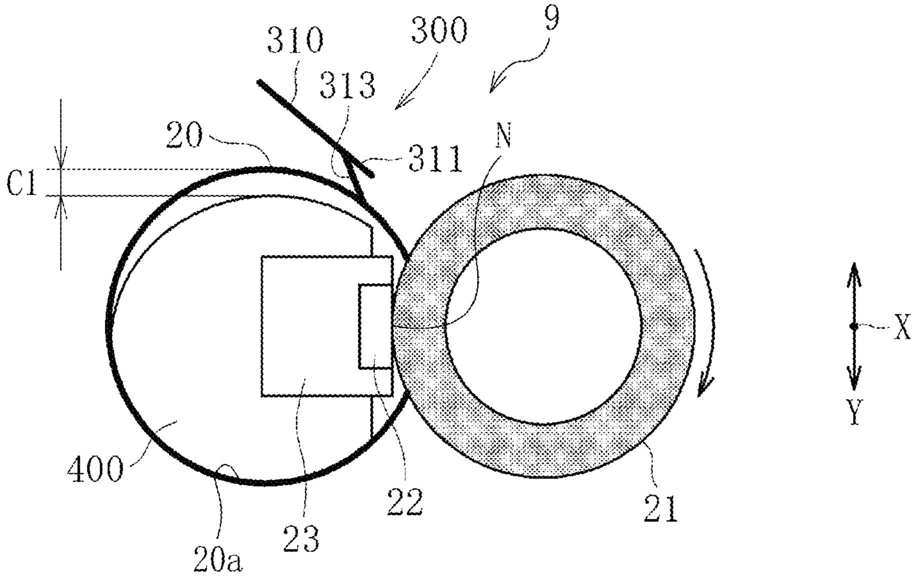
FIG. 7A is a schematic cross-sectional view of the fixing device depicted in FIG. 2, illustrating a sheet separation assembly incorporated therein.

FIG. 7A is a schematic cross-sectional view of the fixing device 9 incorporating the sheet separation assembly 300 that separates the sheet P that has passed through the fixing nip N from the fixing belt 20. The sheet separation assembly 300 includes a separation plate 310 serving as a separator that separates the sheet P from the fixing belt 20. The separation plate 310 moves toward and away from the fixing belt 20 as described below.

The heater 22 serving as a nip formation pad or a nip former and the heater holder 23 move in a horizontal direction in FIG. 7A with respect to the pressure roller 21 between a pressurization position where the pressure roller 21 presses against the heater 22 and the heater holder 23 via the fixing belt 20 at the fixing nip N and a separation position where the pressure roller 21 releases pressure applied at the fixing nip N. The sheet separation assembly 300 further includes a pivot restricting hole 321 including a first restricting portion as described below with reference to FIG. 8A. In a state in which the first restricting portion of the pivot restricting hole 321 restricts pivoting of the separation plate 310, the heater 22 and the heater holder 23 move to the separation position.

The separation plate 310 extends parallel to a longitudinal direction X, that is, an axial direction, of the fixing belt 20. The separation plate 310 includes contact portions 313 disposed at both lateral ends of the separation plate 310 in a longitudinal direction thereof, respectively. The contact portions 313 are disposed outboard from a conveyance span where the sheet P is conveyed over the fixing belt 20 in the longitudinal direction thereof. The contact portions 313 contact the outer circumferential face of the fixing belt 20. As the contact portions 313 contact the outer circumferential face of the fixing belt 20 at both lateral ends of the fixing belt 20 in the axial direction thereof, respectively, the contact portions 313 restrict the gap between the separation plate 310 and the fixing belt 20 to a predetermined size.

The separation plate 310 mounts pivot restricted tabs 312 that project from both lateral ends of the separation plate 310 in the longitudinal direction X thereof, respectively. The pivot restricting hole 321 includes a first restricting portion 321*a* and a second restricting portion 321*b*. While the contact portions 313 contact the fixing belt 20, the contact portions 313 restrict a position of the separation plate 310 in a pivot direction thereof. Hence, the pivot restricted tab 312 does not contact the first restricting portion 321*a* basically.

The fixing device 9 further includes flanges 400 serving as guides that support both lateral ends of the fixing belt 20 in the longitudinal direction X thereof, respectively, such that the fixing belt 20 slides over the flanges 400. Each of the flanges 400 is a ring that is inserted into the loop formed by the fixing belt 20 at each lateral end of the fixing belt 20 in the longitudinal direction X thereof such that the inner circumferential face 20*a* of the fixing belt 20 slides over the flange 400. Thus, the flanges 400 guide the fixing belt 20 that rotates.

Figure 7B:
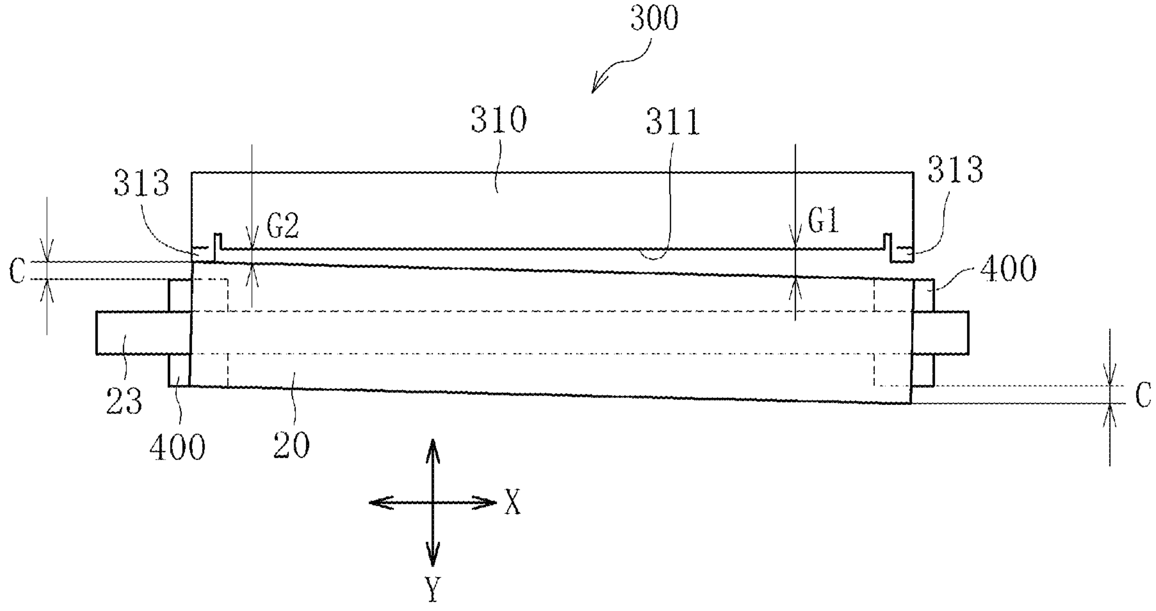
FIG. 7B is a plan view of the sheet separation assembly depicted in FIG. 7A.

As illustrated in FIG. 7B, at both lateral ends of the fixing belt 20 in the longitudinal direction X thereof, a clearance C (e.g., backlash or looseness) is provided between the inner circumferential face 20*a* of the fixing belt 20 and an outer circumferential face of the flange 400. The clearance C facilitates smooth rotation of the fixing belt 20.

However, if the fixing belt 20 is not parallel to the pressure roller 21, the fixing belt 20 may follow the pressure roller 21 and may be inclined with respect to the flange 400. Accordingly, the fixing belt 20 may rotate unstably, causing the sheet P to be jammed.

Figure 7C:
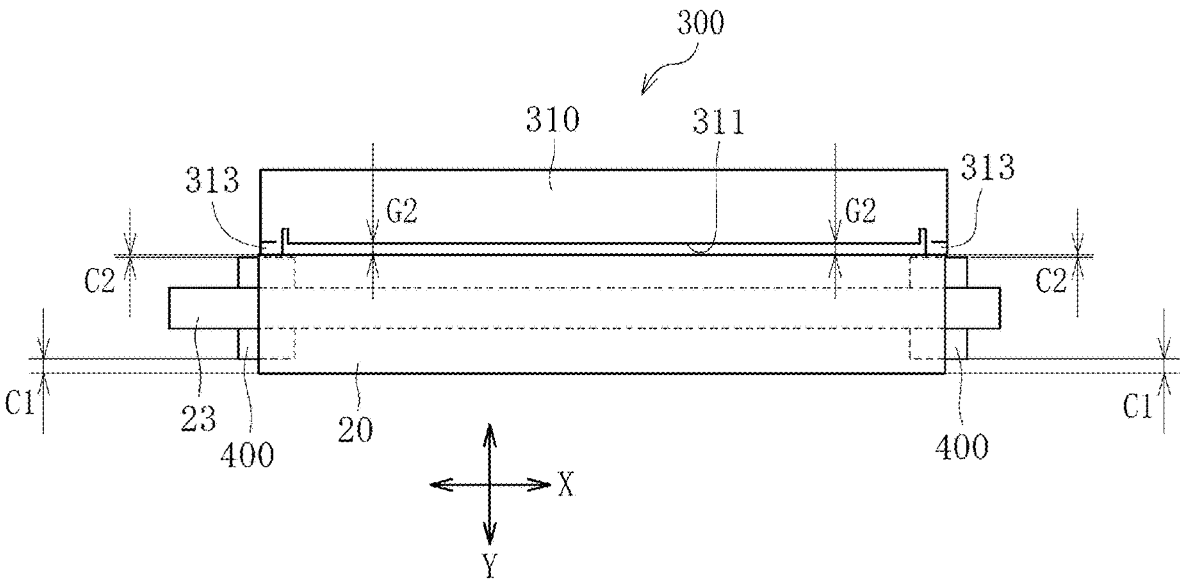
FIG. 7C is a plan view of the sheet separation assembly depicted in FIG. 7A, illustrating a separation plate incorporated therein.

According to the embodiment, as illustrated in FIGS. 7B and 7C, at least one of the contact portions 313 disposed at both lateral ends of the separation plate 310 in the longitudinal direction thereof contacts the outer circumferential face of the fixing belt 20 at at least one of both lateral ends of the fixing belt 20 in the longitudinal direction X thereof, thus suppressing inclination of the fixing belt 20 (e.g., degradation in parallelism between the fixing belt 20 and the flange 400) and stabilizing rotation (e.g., motion in the circumferential direction) of the fixing belt 20. As illustrated in FIGS. 7B and 7C, the contact portions 313 are disposed opposite the flanges 400 in a radial direction of the fixing belt 20, decreasing an amount of backlash of the fixing belt 20.

For example, as illustrated in FIG. 7B, the separation plate 310 is separated from the fixing belt 20 or the flanges 400 with an increased distance therebetween. Hence, one of the contact portions 313, that is, the left contact portion 313, of the separation plate 310 contacts the outer circumferential face of the fixing belt 20 at one lateral end of the fixing belt 20 in the longitudinal direction X thereof. Conversely, another one of the contact portions 313, that is, the right contact portion 313, of the separation plate 310 is separated from the outer circumferential face of the fixing belt 20 at another lateral end of the fixing belt 20 in the longitudinal direction X thereof.

The separation plate 310 further includes an edge portion 311 serving as a non-contact portion that does not contact the fixing belt 20. The edge portion 311 and the outer circumferential face of the fixing belt 20 produce an increased gap G1 that is not appropriate and is greater than a decreased gap G2 that is appropriate. Accordingly, the sheet P may pass through the increased gap G1, may be wound around the fixing belt 20, and may be jammed easily.

To address this circumstance, as illustrated in FIG. 7C, the separation plate 310 moves toward the fixing belt 20 such that the edge portion 311 of the separation plate 310 does not contact the fixing belt 20. Accordingly, in a state in which the contact portions 313 disposed at both lateral ends of the separation plate 310 in the longitudinal direction thereof contact the outer circumferential face of the fixing belt 20 at both lateral ends of the fixing belt 20 in the longitudinal direction X thereof, respectively, the contact portions 313 move toward the left flange 400 and the right flange 400, respectively.

As illustrated in FIG. 7B, the clearance C between the flange 400 and the fixing belt 20 increases inclination (e.g., degradation in parallelism) of the fixing belt 20 with respect to an axial direction of the flange 400, destabilizing rotation (e.g., motion in the circumferential direction) of the fixing belt 20. However, as illustrated in FIG. 7C, the contact portions 313 disposed at both lateral ends of the separation plate 310 in the longitudinal direction thereof move toward the left flange 400 and the right flange 400, respectively, thus suppressing inclination of the fixing belt 20 (e.g., degradation in parallelism between the fixing belt 20 and the flange 400) and stabilizing rotation (e.g., motion in the circumferential direction) of the fixing belt 20.

As illustrated in FIG. 7C, the flanges 400 (e.g., the left flange 400 and the right flange 400) and the fixing belt 20 below the flanges 400 define an increased clearance C1 (e.g., backlash or looseness) that is greater than a decreased clearance C2 (e.g., backlash or looseness) between the flanges 400 and the fixing belt 20 above the flanges 400. However, the contact portions 313 disposed at both lateral ends of the separation plate 310 in the longitudinal direction thereof are situated closer to the left flange 400 and the right flange 400, respectively. Hence, the decreased clearance C2 is produced between the flanges 400 (e.g., the left flange 400 and the right flange 400) and the fixing belt 20 above the flanges 400. Accordingly, inclination of the fixing belt 20 (e.g., degradation in parallelism between the fixing belt 20 and the flange 400) does not increase and therefore rotation (e.g., motion in the circumferential direction) of the fixing belt 20 is stabilized.

Figure 7D:
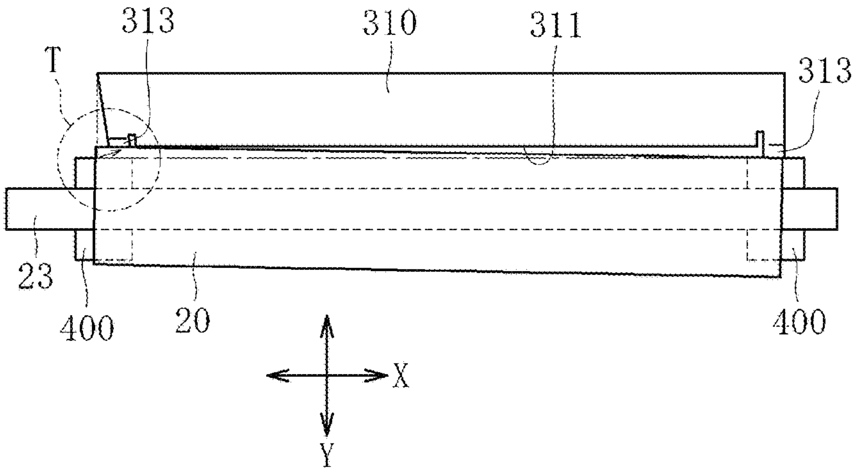
FIG. 7D is a plan view of the separation plate incorporated in the sheet separation assembly depicted in FIG. 7B, illustrating deformation of the separation plate.
Figure 7E:
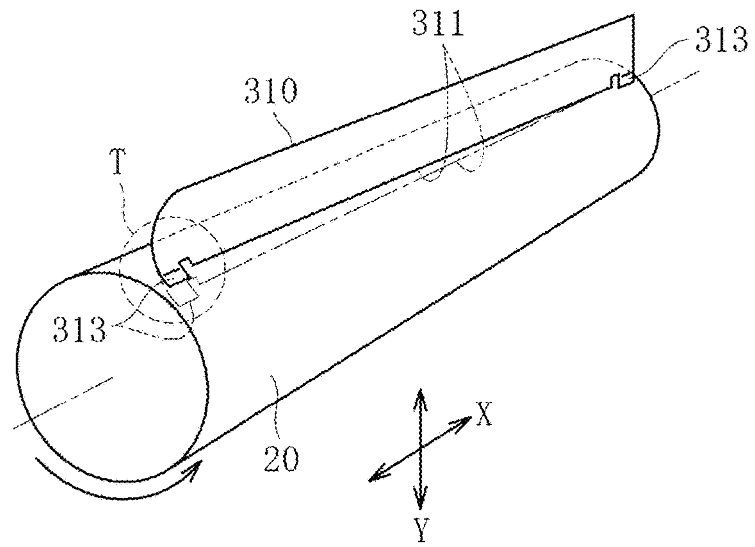
FIG. 7E is a perspective view of the separation plate depicted in FIG. 7D, illustrating deformation of the separation plate.
Figure 7F:
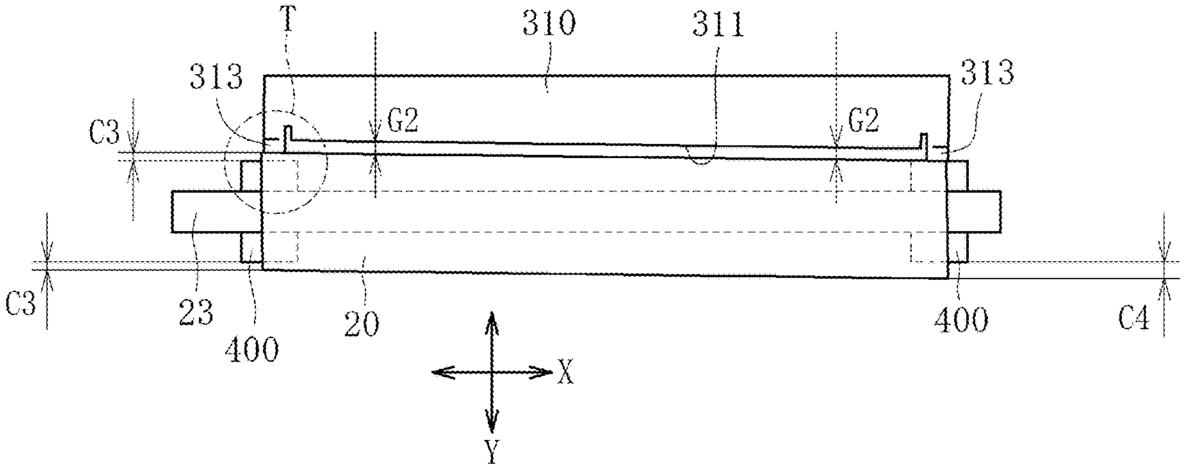
FIG. 7F is a plan view of the separation plate depicted in FIG. 7C.

Referring to FIGS. 7D, 7E, and 7F, a description is provided of deformation (e.g., elastic deformation) of the separation plate 310.

The separation plate 310 is made of heat-resistant metal such as stainless steel. However, since the separation plate 310 has a decreased thickness, the separation plate 310 is subject to deformation. Accordingly, as the separation plate 310 moves toward the fixing belt 20 as illustrated in FIGS. 7B and 7C, a region T in FIG. 7D at one of a left lateral end and a right lateral end of the separation plate 310 in the longitudinal direction thereof may be displaced downstream in the rotation direction D20 of the fixing belt 20 (e.g., rearward from a paper surface in FIG. 7D) in accordance with rotation of the fixing belt 20.

Even if the separation plate 310 does not move toward the fixing belt 20 as illustrated in FIG. 7C, as the left clearance C and the right clearance C depicted in FIG. 7B between the fixing belt 20 and the flanges 400 increase and decrease regularly or irregularly, as described above, one of the left contact portion 313 and the right contact portion 313 may be displaced downstream in the rotation direction D20 of the fixing belt 20 (e.g., rearward from the paper surface in FIG. 7D) in accordance with rotation of the fixing belt 20. Accordingly, the separation plate 310 in the region T may warp in the longitudinal direction of the separation plate 310 or may suffer from buckle (e.g., elastic buckle) in a short direction of the separation plate 310.

However, even if the separation plate 310 suffers from deformation (e.g., elastic deformation), the left contact portion 313 and the right contact portion 313 of the separation plate 310 contact the fixing belt 20 as illustrated in FIG. 7F, retaining the decreased gap G2, that is appropriate and uniform, between the edge portion 311 of the separation plate 310 and the outer circumferential face of the fixing belt 20. The left flange 400 in FIG. 7F and the fixing belt 20 define a decreased clearance C3 (e.g., backlash or looseness). The right flange 400 in FIG. 7F and the fixing belt 20 define an increased clearance C4 (e.g., backlash or looseness) that is different from the decreased clearance C3. However, the decreased gap G2 is even in size constantly throughout the entire span of the fixing belt 20 in the longitudinal direction X thereof, thus preventing the sheet P from being jammed effectively.

The region T in FIG. 7F corresponds to the region T in FIGS. 7D and 7E. As illustrated in FIG. 7F, the decreased clearance C3 between the flange 400 and the fixing belt 20 in the region T at one end (e.g., an upper end in FIG. 7F) of the fixing belt 20 in an orthogonal direction Y (e.g., a nip length direction) perpendicular to the longitudinal direction X is equivalent to the decreased clearance C3 at another end (e.g., a lower end in FIG. 7F) of the fixing belt 20 in the orthogonal direction Y. However, as the contact portion 313 of the separation plate 310 presses one lateral end of the fixing belt 20 in the longitudinal direction X thereof, the contact portion 313 decreases the decreased clearance C3 at the upper end of the fixing belt 20 and increases the decreased clearance C3 at the lower end of the fixing belt 20 in FIG. 7F. Accordingly, the contact portion 313 decreases inclination of the fixing belt 20, suppressing skew of the fixing belt 20 in the longitudinal direction X thereof and resultant breakage of a lateral end of the fixing belt 20 in the longitudinal direction X thereof.

Figure 7G:
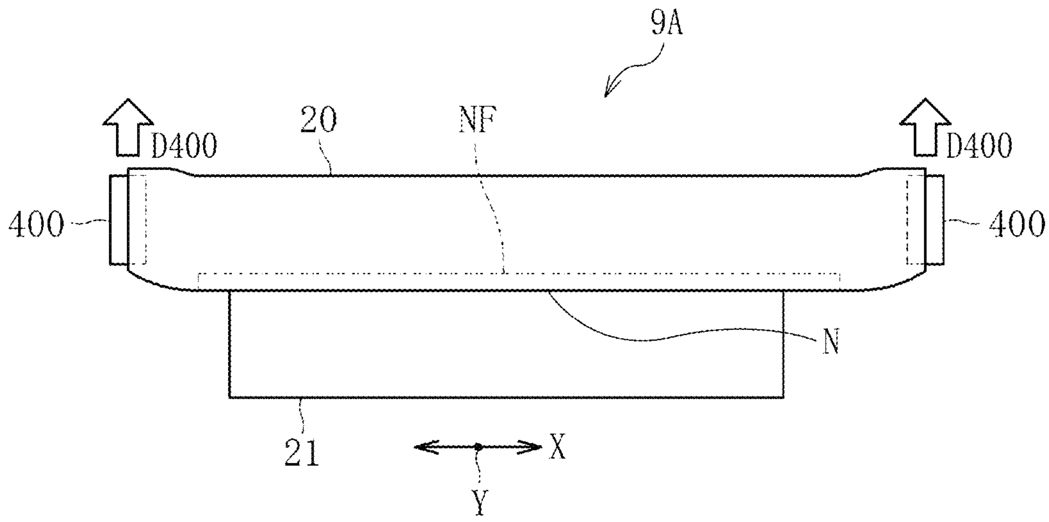
FIG. 7G is a diagram of a fixing device as a variation of the fixing device depicted in FIG. 2, illustrating flanges that are incorporated therein and pull a fixing belt.

In order to enhance separation of the sheet P from the fixing belt 20, the fixing belt 20 has an increased curvature at an exit of the fixing nip N advantageously. For example, as illustrated in FIG. 7G, the image forming apparatus 100 depicted in FIG. 1 may incorporate a fixing device 9A that includes a nip formation pad NF holding a heater. The nip formation pad NF is shorter than the fixing belt 20 in the longitudinal direction X thereof. The flanges 400 move in directions D400 in which the flanges 400 separate from the fixing nip N, thus pulling the fixing belt 20. Accordingly, the fixing belt 20 has increased curvatures at the exit and an entry of the fixing nip N throughout the entire span of the fixing belt 20 in the longitudinal direction X thereof, facilitating separation of the sheet P from the fixing belt 20.

Figure 7H:
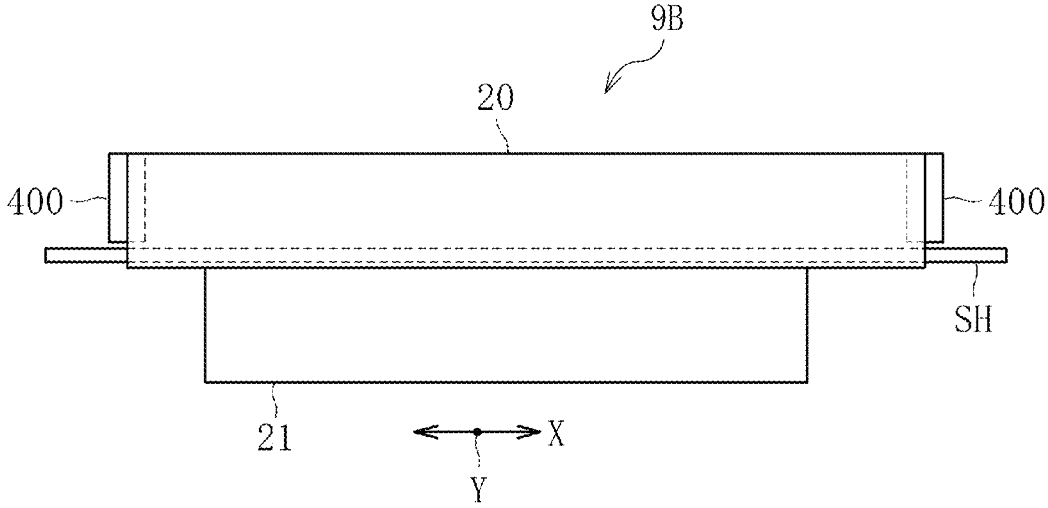
FIG. 7H is a diagram of a fixing device as another variation of the fixing device depicted in FIG. 2, illustrating a nip formation pad and the flanges incorporated therein.

Conversely, as illustrated in FIG. 7H, the fixing device 9A is compared to a fixing device 9B that includes a nip formation pad SH including a laminated heater. The nip formation pad SH is longer than the fixing belt 20 in the longitudinal direction X thereof and protrudes beyond both lateral edges of the fixing belt 20 in the longitudinal direction X thereof. As the flanges 400 move in directions in which the flanges 400 separate from the fixing nip N to pull the fixing belt 20, the fixing belt 20 may be applied with tension excessively. If the fixing belt 20 is applied with tension excessively, the fixing belt 20 may suffer from abrasion of the inner circumferential face 20*a* thereof, slippage caused by an increased slide load, and resultant faulty conveyance of the sheet P.

Additionally, if the fixing belt 20 is applied with tension excessively, the fixing device 9B may not be assembled into a fixing unit properly. To address the disadvantages, each of the flanges 400 and the nip formation pad SH has a decreased size in the radial direction of the fixing belt 20 to produce backlash between the inner circumferential face 20*a* of the fixing belt 20 and each of the flanges 400. As a result, the fixing belt 20 suffers from limitation in increasing a curvature at the exit of the fixing nip N, causing a disadvantage in improving separation of the sheet P from the fixing belt 20. In order to overcome the disadvantages described above, the fixing device 9 according to the embodiment of the present disclosure has a construction described below.

Referring to FIGS. 8A, 8B, 8C, and 9A, a description is provided of a construction of the sheet separation assembly 300 according to an embodiment of the present disclosure.

Figure 8A:
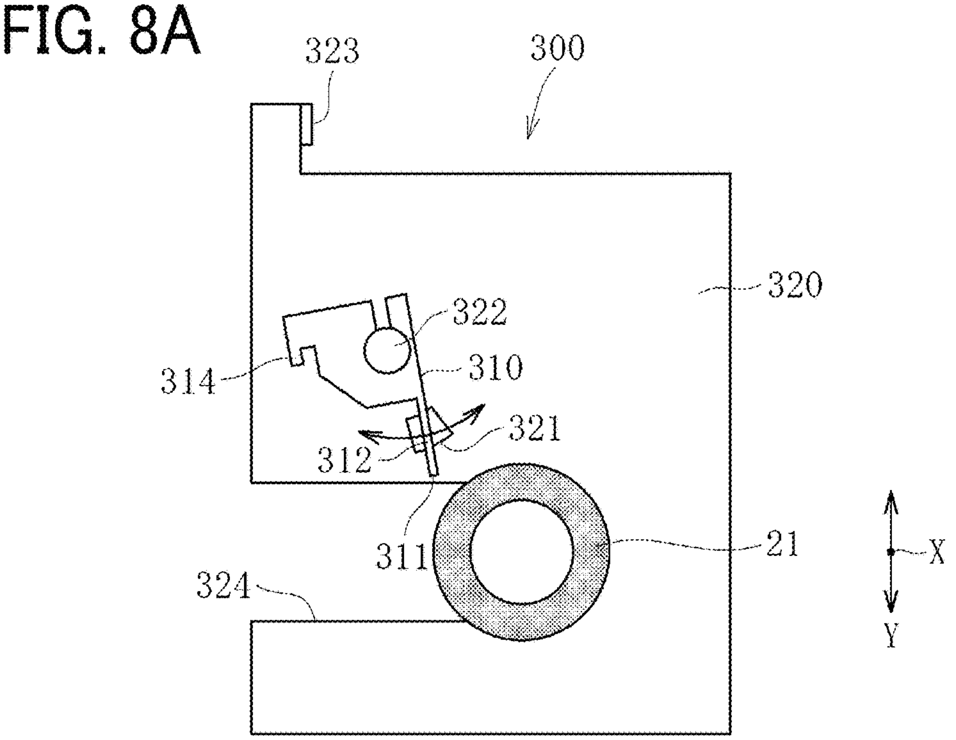
FIG. 8A is a side view of the sheet separation assembly depicted in FIG. 7A.
Figure 8B:
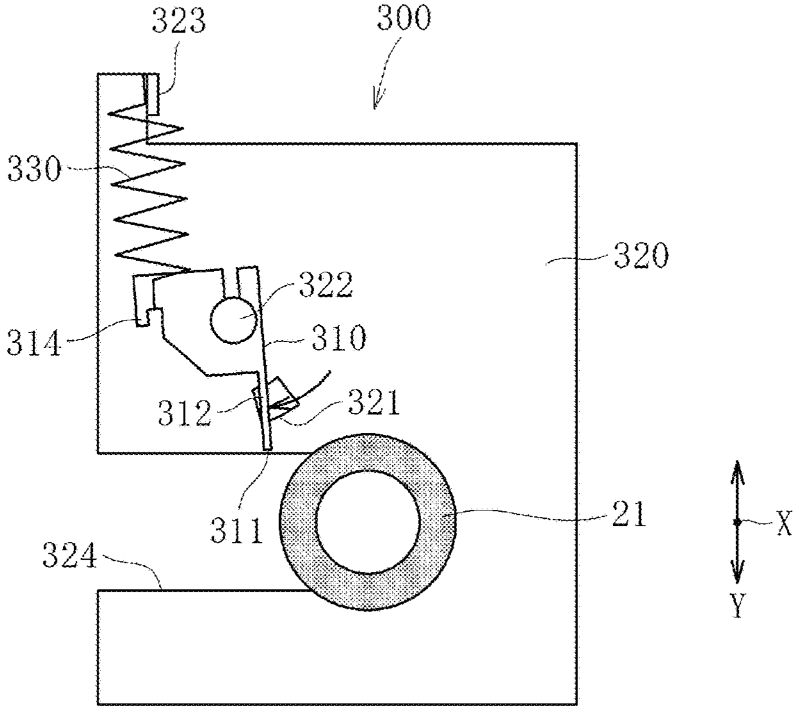
FIG. 8B is a side view of the sheet separation assembly depicted in FIG. 8A, illustrating a tension spring incorporated therein.

FIG. 8A is a cross-sectional view of the sheet separation assembly 300 incorporating the separation plate 310. According to the embodiment, the sheet separation assembly 300 further includes a support shaft 322 about which the separation plate 310 pivots. For example, the separation plate 310 pivots in an approach direction in which the edge portion 311 of the separation plate 310 moves toward the fixing belt 20 as illustrated in FIG. 8A and a separation direction in which the edge portion 311 separates from the fixing belt 20.

Figure 8C:
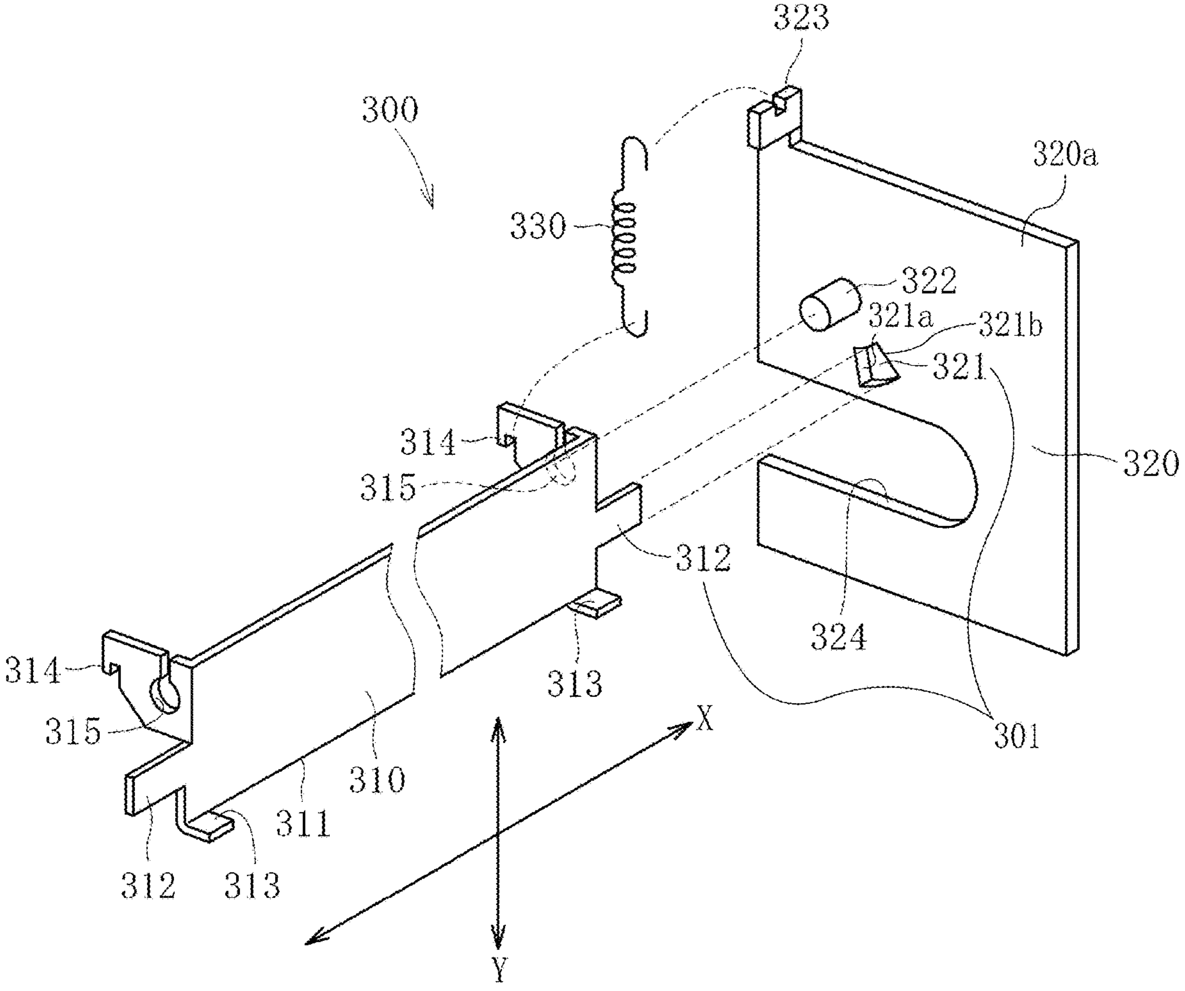
FIG. 8C is an exploded perspective view of the sheet separation assembly depicted in FIG. 7A.

As illustrated in FIG. 8C, the sheet separation assembly 300 further includes a pair of side plates 320. The side plates 320 include inner faces 320*a*, respectively, that are disposed opposite each other. The support shaft 322 projects from the inner face 320*a* of each of the side plates 320. The separation plate 310 further includes shaft holes 315 disposed at both lateral ends of the separation plate 310 in the longitudinal direction X thereof, respectively. The support shafts 322 engage the shaft holes 315, respectively, such that the separation plate 310 rotates.

The side plate 320 includes a recess 324 that is U-shaped. The recesses 324 support both lateral ends of a shaft of the pressure roller 21 in an axial direction thereof, respectively, such that the pressure roller 21 rotates. The side plate 320 includes the pivot restricting hole 321 that is disposed above the recess 324 in FIG. 8C and is adjacent to the recess 324. The pivot restricting hole 321 serves as a motion restricting hole that is fan-shaped about the support shaft 322. The pivot restricting hole 321 restricts a pivot range (e.g., motion) of the separation plate 310.

As illustrated in FIG. 8C, the separation plate 310 mounts the pivot restricted tabs 312 serving as motion restricted tabs that project from both lateral ends of the separation plate 310 in the longitudinal direction X thereof, respectively. The pivot restricted tabs 312 are inserted into the pivot restricting holes 321, respectively. The pivot restricted tab 312 and the pivot restricting hole 321 construct a pivot restrictor 301 serving as a motion restrictor that restricts motion of the separation plate 310.

For example, the pivot restricting hole 321 includes the first restricting portion 321*a* and the second restricting portion 321*b*. The first restricting portion 321*a* is disposed at one end (e.g., a left end in FIG. 8C) of the pivot restricting hole 321 and restricts a position of the separation plate 310 that moves or pivots in the approach direction in which the edge portion 311 of the separation plate 310 moves toward the fixing belt 20. The second restricting portion 321*b* is disposed at another end (e.g., a right end in FIG. 8C) of the pivot restricting hole 321 and disposed opposite the first restricting portion 321*a*. The second restricting portion 321*b* restricts a position of the separation plate 310 that moves or pivots in the separation direction in which the edge portion 311 of the separation plate 310 separates from the fixing belt 20.

The pivot restricting hole 321 further includes portions other than the first restricting portion 321*a* and the second restricting portion 321*b*, that is, arcuate faces that bridge the first restricting portion 321*a* and the second restricting portion 321*b*. The pivot restricted tab 312 and each of the arcuate faces define a proper clearance therebetween. The proper clearance prevents the arcuate face from interfering with the pivot restricted tab 312 and degrading pivoting of the separation plate 310.

When the edge portion 311 of the separation plate 310 pivots in the approach direction in which the edge portion 311 moves toward the fixing belt 20, the edge portion 311 and the fixing belt 20 preferably define a gap therebetween in a range of from 0.6 mm to 1.2 mm or a range of from 0.6 mm to 1.3 mm. If the gap between the fixing belt 20 and the edge portion 311 of the separation plate 310 is excessively small, the separation plate 310 comes into contact with the fixing belt 20 easily, damaging the fixing belt 20 and resulting in formation of a faulty image. The gap of 0.6 mm between the edge portion 311 and the fixing belt 20 prevents the separation plate 310 from damaging the fixing belt 20.

If the gap between the fixing belt 20 and the edge portion 311 of the separation plate 310 is excessively great, the sheet P passes through the excessively great gap easily and is wound around the fixing belt 20, causing the sheet P to be jammed. If the gap between the edge portion 311 and the fixing belt 20 is not greater than 1.2 mm or 1.3 mm as described above, the gap prevents the sheet P from being wound around the fixing belt 20 and jammed. Alternatively, a positional relation between the pivot restricted tab 312 and the pivot restricting hole 321 may be reversed. For example, the separation plate 310 may be provided with a pivot restricted hole and the side plate 320 may mount a pivot restricting tab.

The contact portions 313 that are L-shaped are disposed at both lateral ends of the separation plate 310 in the longitudinal direction X thereof, respectively, and lower ends in FIG. 8C of the separation plate 310 in the short direction thereof, respectively. The contact portions 313 reduce an amount of backlash of the fixing belt 20. Hence, the contact portions 313 are disposed opposite the flanges 400, respectively, in the radial direction of the fixing belt 20.

The sheet separation assembly 300 further includes spring engagements 314, spring engagements 323, and tension springs 330. The spring engagements 314 are mounted on both lateral ends of the separation plate 310 in the longitudinal direction X thereof, respectively. The spring engagement 323 is mounted on an upper end in FIG. 8C of the side plate 320. The tension spring 330 is anchored to and interposed between the spring engagements 314 and 323. The tension spring 330 serving as a biasing member biases the separation plate 310 to pivot the separation plate 310 about the support shaft 322 clockwise in FIGS. 8B and 8C.

The tension spring 330 biases and pivots the separation plate 310 in the approach direction in which the edge portion 311 moves toward the fixing belt 20. Since the separation plate 310 is subject to deformation as described above, the tension springs 330 are preferably attached to both lateral ends of the separation plate 310 in the longitudinal direction X thereof so as to bias and pivot the separation plate 310 precisely.

Figure 9A:
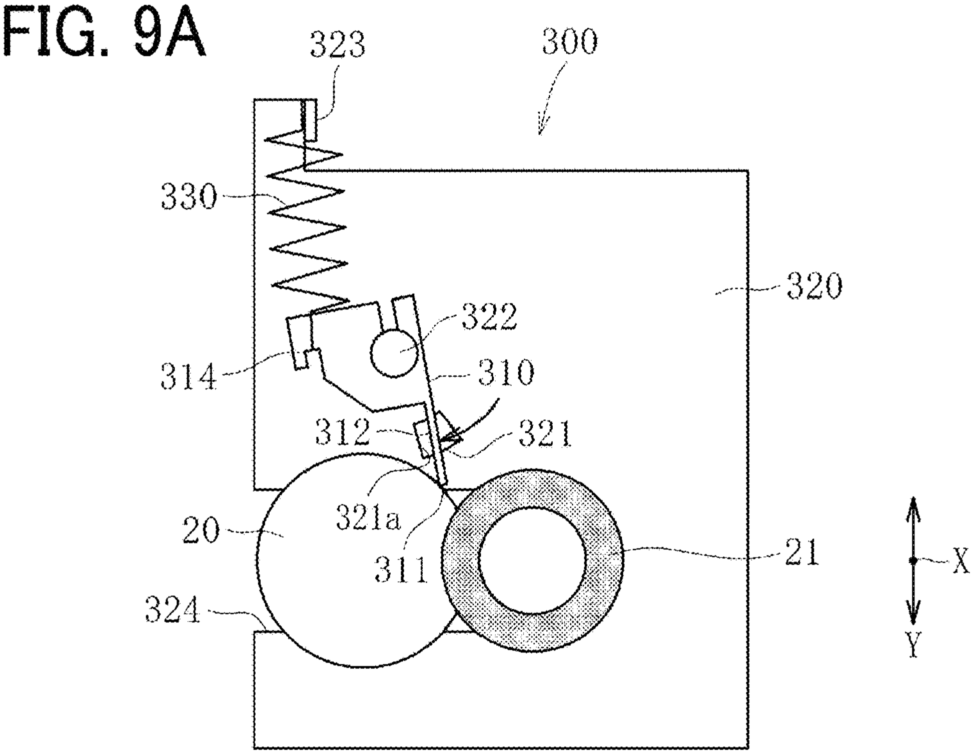
FIG. 9A is a side view of the sheet separation assembly depicted in FIG. 8B.

As illustrated in FIG. 9A, if the separation plate 310 does not incorporate the contact portions 313, the tension spring 330 generates a biasing force that brings the edge portion 311 of the separation plate 310 into contact with the outer circumferential face of the fixing belt 20. The pivot restricted tab 312 comes into contact with the first restricting portion 321*a* (e.g., a left end in FIG. 9A) of the pivot restricting hole 321. Accordingly, the first restricting portion 321*a* prohibits the separation plate 310 from pivoting clockwise from a position of the separation plate 310 depicted in FIG. 9A.

Referring to FIGS. 9B, 9C, 9D, and 10, a description is provided of operations of the sheet separation assembly 300 to cope with jamming of the sheet P.

Figure 9B:
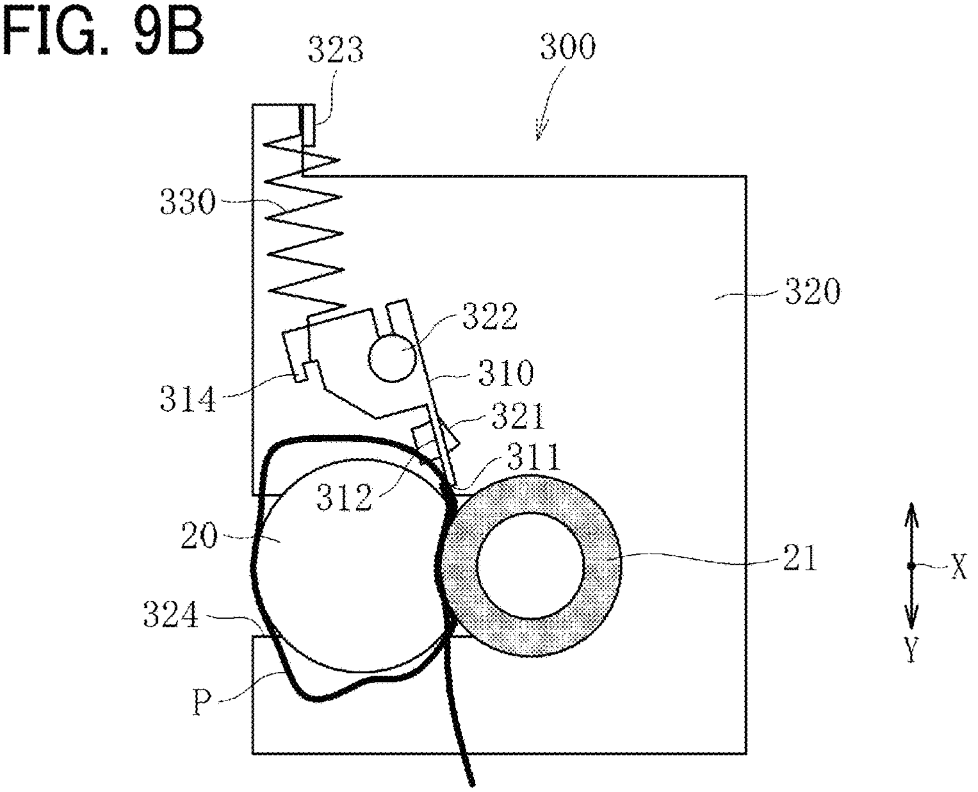
FIG. 9B is a side view of the sheet separation assembly depicted in FIG. 9A, illustrating a jammed sheet.
Figure 9C:
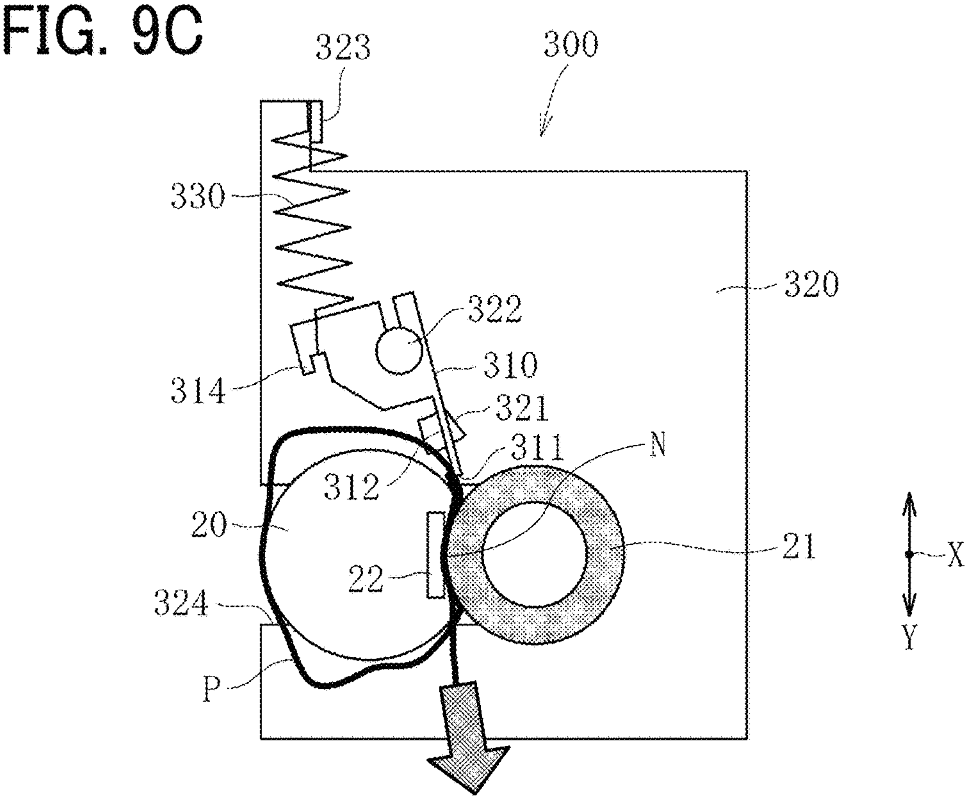
FIG. 9C is a side view of the sheet separation assembly depicted in FIG. 9B, illustrating the jammed sheet that is pulled out.
Figure 9D:
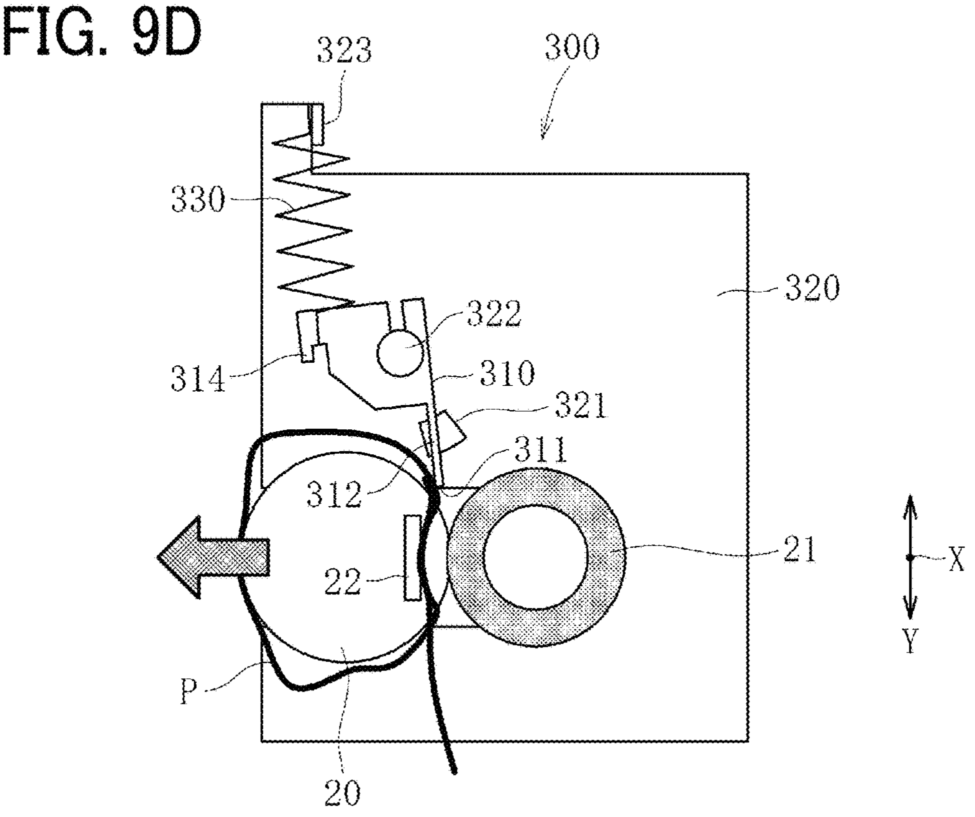
FIG. 9D is a side view of the sheet separation assembly depicted in FIG. 9C and the fixing belt that moves to release pressure.

As illustrated in FIG. 9B, if the sheet P is jammed and wound around the fixing belt 20, the separation plate 310 pivots counterclockwise in FIG. 9B to separate from the sheet P, averting collision with the sheet P. Thus, the separation plate 310 does not damage the sheet P. As illustrated in FIG. 9C, when the sheet P wound around the fixing belt 20 is pulled downward and removed from the fixing nip N, the separation plate 310 pivots counterclockwise in FIG. 9C to separate from the sheet P, allowing the sheet P to be pulled out from the fixing nip N without being damaged.

Even if the separation plate 310 improves separation of the sheet P, if the fixing device 9 is instructed to fix a toner image bearing toner to a leading edge of the sheet P on the sheet P by an erroneous print setting or the like, the sheet P may enter the gap between the separation plate 310 and the fixing belt 20 and may be wound around the fixing belt 20. If the sheet P is wound around the fixing belt 20 into a plurality of layers or if the sheet P creases substantially, when a user or a service engineer pulls out the sheet P, the sheet P may strike the separation plate 310, deforming the separation plate 310 or damaging the fixing belt 20.

To address this circumstance, according to the embodiment, the tension spring 330 presses the separation plate 310. Accordingly, when the sheet P is pulled out, the separation plate 310 opens against the biasing force of the tension spring 330. Thus, the separation plate 310 is immune from deformation and scratches. Additionally, the user or the service engineer pulls out the sheet P with a decreased pulling force that improves usability of the fixing device 9.

Figure 10:
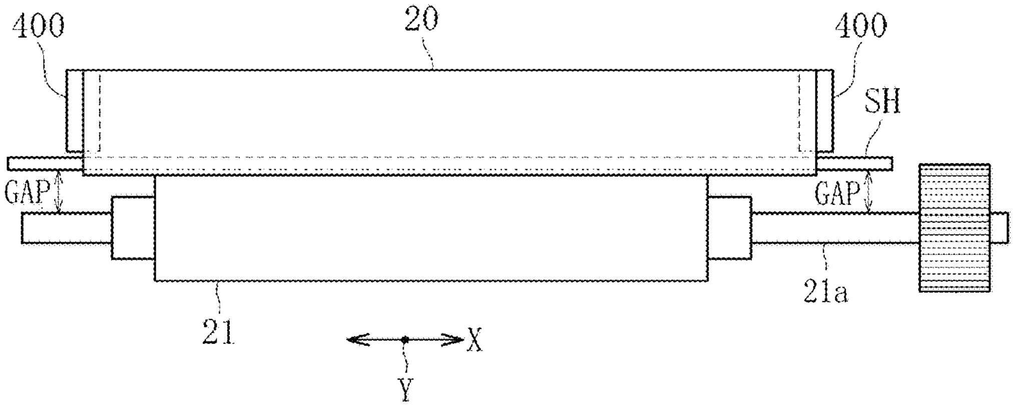
FIG. 10 is a plan view of the flanges and the nip formation pad depicted in FIG. 7H, illustrating a pressure releasing amount of the fixing belt.

In order to decrease the pulling force, the separation plate 310 opens with an open amount, that is, a clearance between the pivot restricted tab 312 mounted on the separation plate 310 and the pivot restricting hole 321 of the side plate 320, which is greater than a pressure releasing amount with which pressure applied at the fixing nip N is released. As illustrated in FIG. 10, the core metal 21*a* of the pressure roller 21 and the nip formation pad SH define a distance GAP therebetween. The distance GAP is measured with a caliper or the like in a pressurization state in which pressure is applied at the fixing nip N and a pressure releasing state in which pressure applied at the fixing nip N is released to obtain a measurement value in the pressurization state and a measurement value in the pressure releasing state. The measurement value in the pressurization state is subtracted from the measurement value in the pressure releasing state to obtain the pressure releasing amount with which pressure applied at the fixing nip N is released.

However, if the pivot restricting hole 321 is excessively great, the edge portion 311 of the separation plate 310 may come into contact with the pressure roller 21 and thereby may damage the pressure roller 21. To address this circumstance, the pivot restricting hole 321 preferably has a size that stops the separation plate 310, that pivots, at a position where the edge portion 311 of the separation plate 310 does not come into contact with the pressure roller 21. For example, when the separation plate 310 pivots in a direction in which the gap between the edge portion 311 of the separation plate 310 and the fixing belt 20 increases, the second restricting portion 321*b* (e.g., the right end in FIG. 8C) of the pivot restricting hole 321 restricts pivoting of the separation plate 310 at the position where the edge portion 311 of the separation plate 310 does not come into contact with the pressure roller 21.

Alternatively, in order to prevent the edge portion 311 from coming into contact with the pressure roller 21, the position of the support shaft 322 that supports the separation plate 310 may be adjusted to attain a layout that prevents the edge portion 311 from coming into contact with the pressure roller 21. For example, the pressure roller 21 has a diameter that is smaller than a diameter of the fixing belt 20. The pressure roller 21 has a center that is shifted from a center of the fixing belt 20 in a direction in which the pressure roller 21 separates from the separation plate 310 downward in FIG. 9D.

A description is provided of methods for applying pressure at the fixing nip N and releasing the pressure.

The method for applying pressure at the fixing nip N provides two configurations, that is, a first pressurizing configuration and a second pressurizing configuration. In the first pressurizing configuration, the heater holder 23 disposed within the loop formed by the fixing belt 20 is secured. The pressure roller 21 comes into contact with and separates from the fixing belt 20. The pressure roller 21 is biased toward the fixing belt 20. In the second pressurizing configuration, the pressure roller 21 (e.g., the core metal 21*a* of the pressure roller 21) is secured. The fixing belt 20 comes into contact with and separates from the pressure roller 21. The fixing belt 20 is biased toward the pressure roller 21.

The second pressurizing configuration is more preferable than the first pressurizing configuration because the user or the service engineer pulls out the jammed sheet P with a smaller pulling force so as to remove the sheet P. For example, in the second pressurizing configuration, the fixing belt 20 separates from the pressure roller 21 to release pressure applied at the fixing nip N. The separation plate 310 also separates from the fixing belt 20. Accordingly, the tension spring 330 displaces with a decreased displacement amount, allowing the user or the service engineer to pull out the sheet P with the smaller pulling force.

Additionally, when the fixing belt 20 is biased toward the pressure roller 21, the separation plate 310 produces a clearance in the pivot restricting hole 321, that is smaller than a clearance in the pivot restricting hole 321, that is produced when the fixing belt 20 releases pressure applied at the fixing nip N. Accordingly, when the fixing belt 20 releases pressure applied at the fixing nip N, the pivot restricting hole 321 restricts clockwise pivoting of the separation plate 310 in FIG. 9B. Consequently, the gap between the fixing belt 20 and the edge portion 311 of the separation plate 310 increases, thus facilitating pulling out of the sheet P.

If the user or the service engineer does not see the jammed sheet P through the fixing nip N clearly, the user or the service engineer does not pull out the sheet P readily. If the gap between the fixing belt 20 and the edge portion 311 of the separation plate 310 increases, the user or the service engineer rotates the pressure roller 21 and the fixing belt 20 backward readily to move the sheet P upstream from the fixing nip N and downward in FIG. 9B for a length of the sheet P, that is great enough for the user or the service engineer to pull out the sheet P.

When the fixing belt 20 rotates backward to move the jammed sheet P, the fixing belt 20 draws a trajectory that is different from a trajectory drawn when the fixing belt 20 rotates forward in the rotation direction D20 depicted in FIG. 2. To address this circumstance, even if the fixing belt 20 draws the trajectory that varies, the edge portion 311 of the separation plate 310 does not preferably contact the fixing belt 20 in the second pressurizing configuration.

A description is provided of an inner circumference usage rate.

Figure 11A:
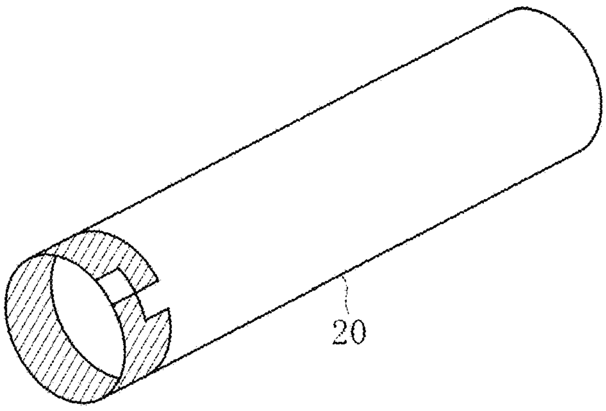
FIG. 11A is a perspective view of the fixing belt incorporated in the fixing device depicted in FIG. 2.
Figure 11B:
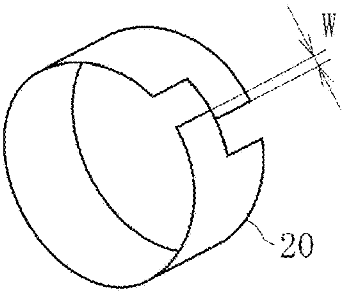
FIG. 11B is a perspective view of a cut portion of the fixing belt depicted in FIG. 11A.

The fixing belt 20 preferably has an inner circumference usage rate in a range of from 95.0 percent to 99.8 percent (see Japanese Unexamined Patent Application Publication No. 2019-082733). The inner circumference usage rate is calculated as below. As illustrated in FIG. 11A, a part of the fixing belt 20, that is shaded, is cut out into a cut portion. As illustrated in FIG. 11B, the cut portion of the fixing belt 20 is wound around the flange 400 to produce an overlap portion having an overlap amount W as illustrated in FIG. 11B. The inner circumference usage rate is calculated with the overlap amount W according to a formula (1) below.

$$Ur=[(L-W)/L]\times 100 \quad (1)$$

Figure 11C:
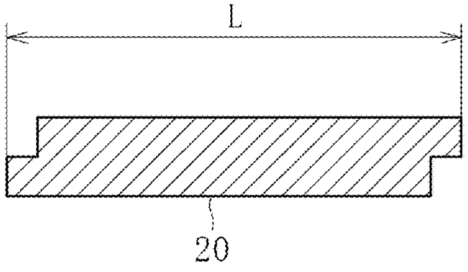
FIG. 11C is a developed plan view of the cut portion of the fixing belt depicted in FIG. 11B.

In the formula (1), Ur represents an inner circumference usage rate in percent. L represents a circumference of the fixing belt 20. The circumference L of the fixing belt 20 defines an entire length of the cut portion that is shaded in FIG. 11C.

Figure 12A:
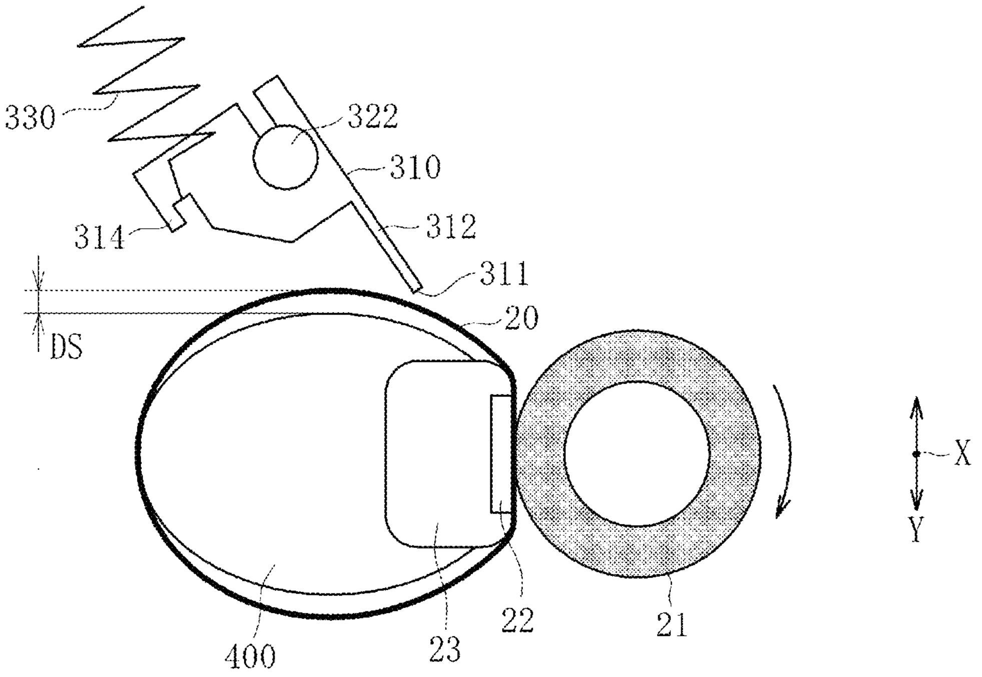
FIG. 12A is a side view of the fixing belt depicted in FIG. 11A, illustrating a decreased slack of the fixing belt.
Figure 12B:
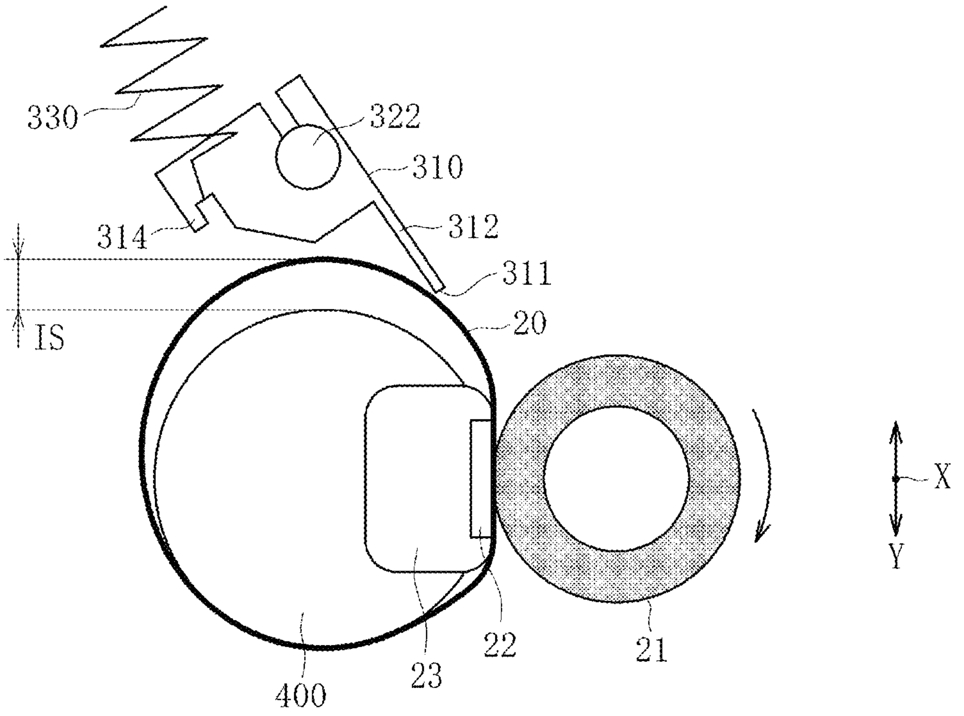
FIG. 12B is a side view of the fixing belt depicted in FIG. 11A, illustrating an increased slack of the fixing belt.

The inner circumference usage rate defines a rate of a circumference of the flange 400 serving as the guide with respect to the circumference L of the fixing belt 20. The inner circumference usage rate is used as an index for assembly (e.g., engagement). However, the inner circumference usage rate is to be improved as an index for skew of the fixing belt 20 and separation of the sheet P from the fixing belt 20. For example, as illustrated in FIGS. 12A and 12B, even with an identical inner circumference usage rate, the fixing belt 20 has slack in the orthogonal direction Y (e.g., the nip length direction) that varies depending on a rigidity of the fixing belt 20, a length of the fixing nip N in the orthogonal direction Y, and a shape of the flange 400. For example, as the rigidity of the fixing belt 20 increases, the length of the fixing nip N in the orthogonal direction Y decreases, and the shape of the flange 400 that guides the fixing belt 20 deviates from a true circle, the slack of the fixing belt 20 decreases. FIG. 12A illustrates a decreased slack DS of the fixing belt 20. FIG. 12B illustrates an increased slack IS of the fixing belt 20, which is greater than the decreased slack DS.

To address this circumstance, the slack of the fixing belt 20, which is situated downstream from the fixing nip N in the sheet conveyance direction DP, is measured directly with a height gauge to obtain a slack rate.

Figure 13:
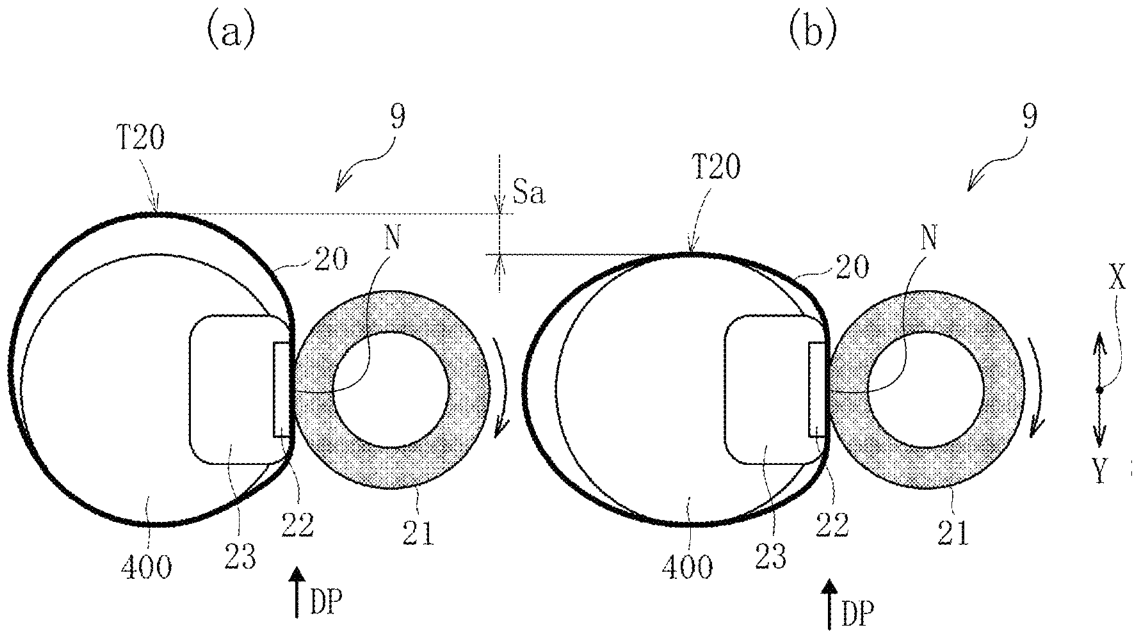
FIG. 13 is a side view of the fixing device depicted in FIG. 2, illustrating a method for measuring a slack rate of the fixing belt.

Referring to FIG. 13, a description is provided of a measurement method for measuring the slack rate.

As illustrated in FIG. 13, the fixing device 9 (e.g., a fixing unit) is oriented and secured. In a state in which the pressure roller 21 presses against the heater 22 via the fixing belt 20 to form the fixing nip N, the pressure roller 21 rotates for one rotation or more and halts. As illustrated in section (a) in FIG. 13, the height gauge measures a height coordinate of a top T20 of the fixing belt 20 in a span of the fixing belt 20 in the longitudinal direction X thereof, which is disposed opposite the flange 400.

The height gauge measures a height coordinate of the top T20 of the fixing belt 20, that is pressed against the flange 400 as illustrated in section (b) in FIG. 13. The height coordinates before and after the top T20 of the fixing belt 20 is pressed against the flange 400 define a difference between the height coordinates, that is defined as a slack amount (e.g., a slack amount Sa in FIG. 13) based on which a slack rate is calculated according to a formula (2) below.

$$Sr=[Sa/Di]\times 100 \quad (2)$$

In the formula (2), Sr represents the slack rate in percent. Sa represents the slack amount. Di represents the diameter of the fixing belt 20.

If the slack rate is excessively small, the fixing device 9 is not assembled easily. As the fixing belt 20 slides over the flange 400, the fixing belt 20 is subject to abrasion. If the slack rate is excessively great, the fixing belt 20 is subject to inclination. Additionally, the fixing belt 20 has a decreased curvature at the exit of the fixing nip N, degrading separation of the sheet P from the fixing belt 20 and installation of the separation plate 310 in the fixing device 9. To address this circumstance, the slack rate is in a range of from 0.1 percent to 10.0 percent, preferably in a range of from 0.5 percent to 5.0 percent.

Referring to FIGS. 14 to 32, a description is provided of embodiments of a thermal conductor mounted on the heater holder 23 described above.

Figure 14:
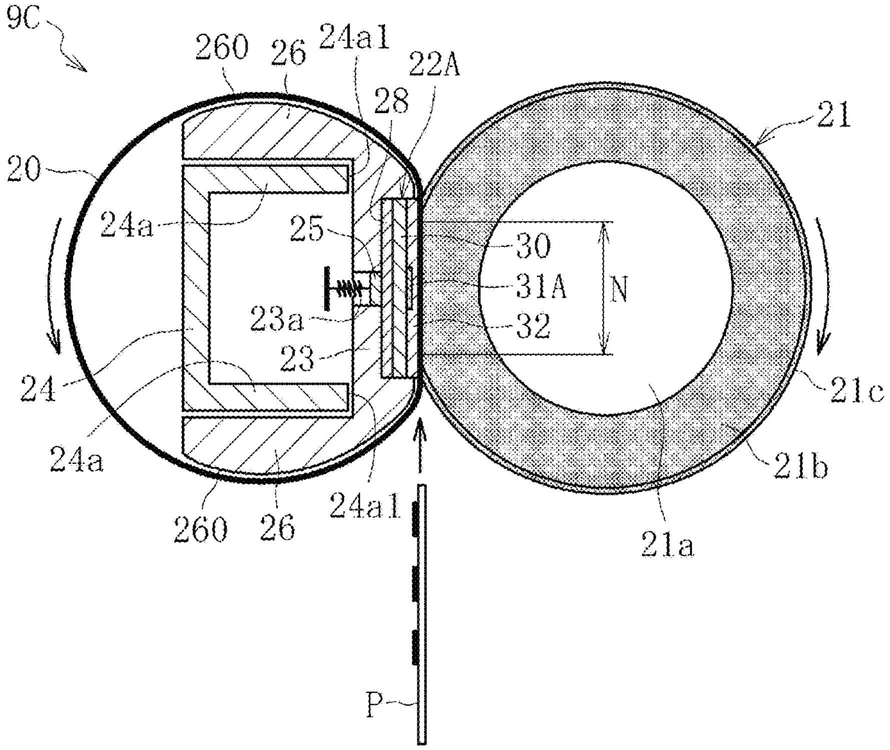
FIG. 14 is a schematic cross-sectional view of a fixing device according to another embodiment of the present disclosure.

As illustrated in FIG. 14, the image forming apparatus 100 depicted in FIG. 1 may include a fixing device 9C according to an embodiment of the present disclosure. The fixing device 9C includes the fixing belt 20 serving as a rotator or a fixing rotator, the pressure roller 21 serving as an opposed rotator or a pressure rotator, a heater 22A serving as a heat source or a heating member, the heater holder 23 serving as a holder, the stay 24 serving as a support, the thermistor 25 serving as a temperature detector, and a first thermal conductor 28.

The fixing belt 20 is an endless belt. The pressure roller 21 contacts the outer circumferential face of the fixing belt 20 to form the fixing nip N between the fixing belt 20 and the pressure roller 21. The heater 22A heats the fixing belt 20. The heater holder 23 holds or supports the heater 22A. The stay 24 supports the heater holder 23.

The thermistor 25 detects a temperature of the first thermal conductor 28. The fixing belt 20, the pressure roller 21, the heater 22A, the heater holder 23, the stay 24, and the first thermal conductor 28 extend in a longitudinal direction that is perpendicular to a paper surface in FIG. 14 and is parallel to a width direction of a sheet P conveyed through the fixing nip N, the width direction of the fixing belt 20, and the axial direction of the pressure roller 21.

The fixing device 9C according to the embodiment incorporates the first thermal conductor 28 that suppresses temperature decrease at a gap between adjacent resistive heat generators 31A of the heater 22A and thereby suppresses uneven temperature of the fixing belt 20 in the longitudinal direction thereof in which the resistive heat generators 31A are arranged.

A description is provided of a construction of the first thermal conductor 28 in detail.

As illustrated in FIG. 14, the first thermal conductor 28 is interposed between the heater 22A and the stay 24 in a horizontal direction in FIG. 14. Specifically, the first thermal conductor 28 is sandwiched between the heater 22A and the heater holder 23. For example, the first thermal conductor 28 has one face that contacts the back face of the base 30 of the heater 22A and another face that contacts the heater holder 23.

The stay 24 includes two perpendicular portions 24*a* that extend in a thickness direction of the heater 22A and the like. Each of the perpendicular portions 24*a* has a contact face 24*a*1 that contacts the heater holder 23, supporting the heater holder 23, the first thermal conductor 28, and the heater 22A. The contact faces 24*a*1 are disposed outboard from the resistive heat generators 31A in an orthogonal direction (e.g., a vertical direction in FIG. 14) perpendicular to the longitudinal direction of the heater 22A in which the resistive heat generators 31A are arranged. Thus, the stay 24 suppresses conduction of heat thereto from the heater 22A, causing the heater 22A to heat the fixing belt 20 efficiently.

Figure 15:
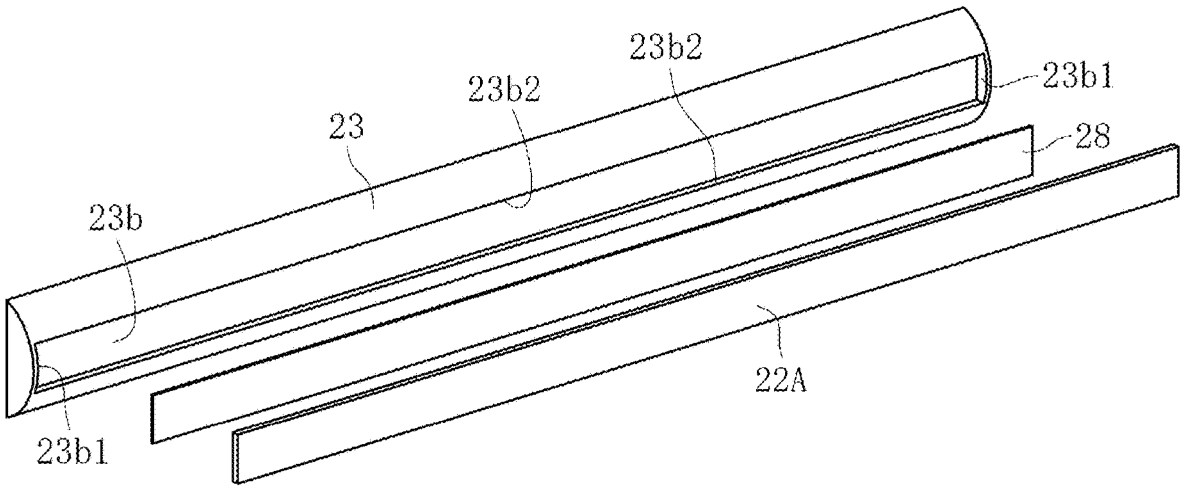
FIG. 15 is a perspective view of a heater, a first thermal conductor, and the heater holder incorporated in the fixing device depicted in FIG. 14.

As illustrated in FIG. 15, the first thermal conductor 28 is a plate that has a thickness of 0.3 mm, a length of 222 mm in the longitudinal direction thereof, and a width of 10 mm in an orthogonal direction perpendicular to the longitudinal direction of the first thermal conductor 28. According to the embodiment, the first thermal conductor 28 is constructed of a single plate. Alternatively, the first thermal conductor 28 may be constructed of a plurality of members. FIG. 15 omits illustration of the guides 26 depicted in FIG. 14.

The heater holder 23 includes a recess 23*b* into which the first thermal conductor 28 is fitted. The heater 22A is attached to the heater holder 23 from above the first thermal conductor 28. Thus, the heater holder 23 and the heater 22A sandwich and hold the first thermal conductor 28. According to the embodiment, the first thermal conductor 28 has a length in the longitudinal direction thereof, which is equivalent to a length of the heater 22A in the longitudinal direction thereof.

The heater holder 23 includes side walls 23*b*1, serving as arrangement direction restrictors, that are disposed at both lateral ends of the heater holder 23 in the longitudinal direction thereof (e.g., an arrangement direction in which the resistive heat generators 31A are arranged), respectively, and define the recess 23*b*. The side walls 23*b*1 restrict motion of the first thermal conductor 28 and the heater 22A in the longitudinal direction thereof. Thus, the side walls 23*b*1 restrict shifting of the first thermal conductor 28 in the arrangement direction in which the resistive heat generators 31A are arranged inside the fixing device 9C, improving efficiency in conduction of heat in a target span in the arrangement direction, that is, the longitudinal direction of the first thermal conductor 28. The heater holder 23 further includes side walls 23*b*2, serving as orthogonal direction restrictors, that are disposed at both ends of the heater holder 23 in an orthogonal direction perpendicular to the longitudinal direction thereof (e.g., the arrangement direction in which the resistive heat generators 31A are arranged), respectively, and define the recess 23*b*. The side walls 23*b*2 restrict motion of the first thermal conductor 28 and the heater 22A in the orthogonal direction.

Figure 16:
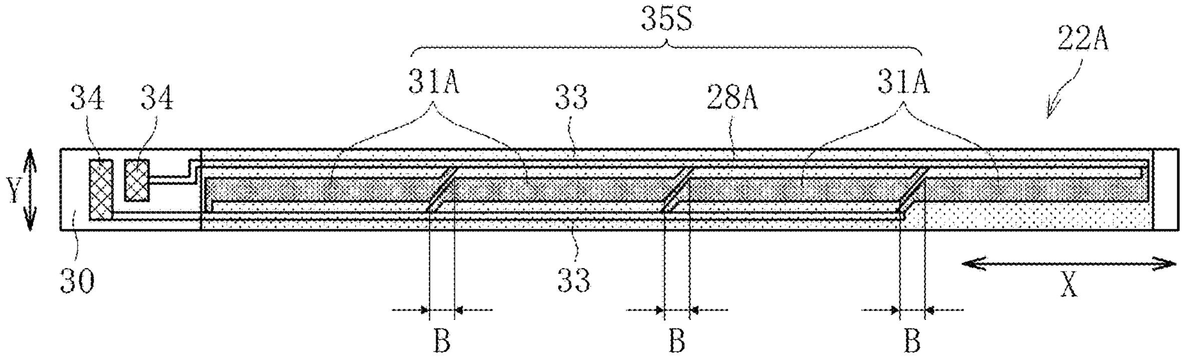
FIG. 16 is a plan view of the heater depicted in FIG. 15, illustrating an arrangement of a first thermal conductor as a variation of the first thermal conductor depicted in FIG. 15.

The first thermal conductor 28 may extend in a span other than a span in which the first thermal conductor 28 extends in the longitudinal direction thereof as illustrated in FIG. 15. For example, as illustrated in FIG. 16, the fixing device 9C may employ a first thermal conductor 28A and the heater 22A including a heat generating portion 35S constructed of the resistive heat generators 31A. The first thermal conductor 28A extends in a span hatched in FIG. 16 and defined by the heat generating portion 35S in which the resistive heat generators 31A are arranged in the longitudinal direction X of the heater 22A.

As the pressure roller 21 applies pressure to the heater 22A, the heater 22A and the heater holder 23 sandwich a first thermal conductor (e.g., the first thermal conductors 28 and 28A) such that the first thermal conductor contacts the heater 22A and the heater holder 23. As the first thermal conductor contacts the heater 22A, the first thermal conductor conducts heat generated by the heater 22A in the longitudinal direction X thereof with improved efficiency.

The first thermal conductor is disposed opposite gaps B between the adjacent resistive heat generators 31A arranged in the longitudinal direction X of the heater 22A. Thus, the first thermal conductor improves efficiency in conduction of heat at the gaps B, increases an amount of heat conducted to the gaps B in the longitudinal direction X of the heater 22A, and increases the temperature of the heater 22A at the gaps B arranged in the longitudinal direction X of the heater 22A, thus suppressing uneven temperature of the heater 22A in the longitudinal direction X thereof.

Accordingly, the first thermal conductor suppresses uneven temperature of the fixing belt 20 in the longitudinal direction X thereof. Consequently, the fixing belt 20 suppresses uneven fixing and uneven gloss of a toner image fixed on a sheet P.

The heater 22A does not increase an amount of heat generation to attain sufficient fixing performance at the gaps B, causing the fixing device 9C to save energy. The first thermal conductor extends throughout an entire span of the heat generating portion 35S in the longitudinal direction X thereof. Accordingly, the first thermal conductor improves efficiency in conduction of heat of the heater 22A in an entirety of a main heating span of the heater 22A disposed opposite an imaging span of a toner image formed on a sheet P conveyed through the fixing nip N. Consequently, the first thermal conductor suppresses uneven temperature of the heater 22A and the fixing belt 20 in the longitudinal direction X thereof.

According to the embodiment, the first thermal conductor (e.g., the first thermal conductors 28 and 28A) is coupled to the resistive heat generators 31A having the PTC property described above, suppressing overheating of the fixing belt 20 in the non-conveyance span where a sheet P having a decreased size is not conveyed effectively. For example, the PTC property suppresses an amount of heat generated by the resistive heat generators 31A in the non-conveyance span. Additionally, the first thermal conductor efficiently conducts heat from the non-conveyance span on the fixing belt 20 that suffers from temperature increase to the conveyance span on the fixing belt 20 efficiently, suppressing overheating of the fixing belt 20 in the non-conveyance span effectively.

Since the heater 22A generates heat in a decreased amount at the gap B between the adjacent resistive heat generators 31A, the heater 22A has a decreased temperature also in a periphery of the gap B. To address this circumstance, the first thermal conductor is preferably disposed also in the periphery of the gap B. According to the embodiment, the first thermal conductor extends throughout the entire span of the heat generating portion 35S in the longitudinal direction X thereof. Accordingly, the first thermal conductor suppresses uneven temperature of the heater 22A and the fixing belt 20 in the longitudinal direction X thereof more effectively.

A description is provided of a construction of a fixing device 9D according to an embodiment of the present disclosure.

Figure 17:
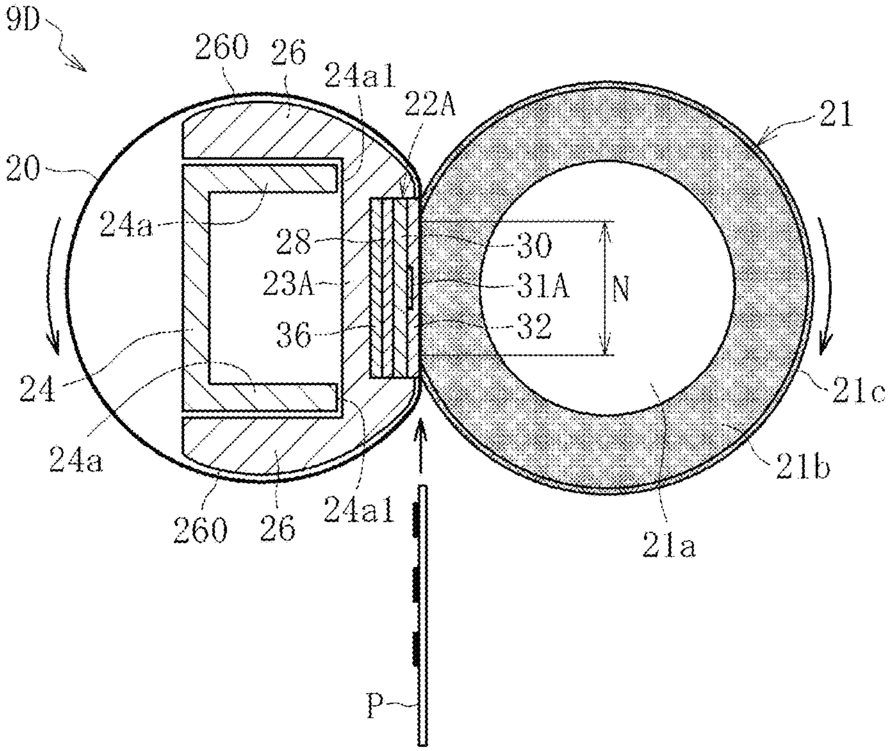
FIG. 17 is a schematic cross-sectional view of a fixing device according to yet another embodiment of the present disclosure.

As illustrated in FIG. 17, the fixing device 9D according to the embodiment includes second thermal conductors 36 and a heater holder 23A. The second thermal conductors 36 are sandwiched between the heater holder 23A and the first thermal conductor 28. Each of the second thermal conductors 36 is disposed at a position different from a position of the first thermal conductor 28 in a laminating direction (e.g., a horizontal direction in FIG. 17) in which the stay 24, the heater holder 23A, the second thermal conductor 36, the first thermal conductor 28, and the heater 22A are arranged.

Specifically, the second thermal conductors 36 are superimposed on the first thermal conductor 28. Unlike FIG. 2 illustrating the fixing device 9, FIG. 17 illustrates a cross section where the second thermal conductor 36 is disposed and the thermistor 25 is not disposed in the laminating direction.

Each of the second thermal conductors 36 is made of a material having a thermal conductivity greater than a thermal conductivity of the base 30. For example, each of the second thermal conductors 36 is made of graphene or graphite. According to the embodiment, the second thermal conductor 36 is a graphite sheet having a thickness of 1 mm. Alternatively, the second thermal conductor 36 may be a plate made of aluminum, copper, silver, or the like.

Figure 18:
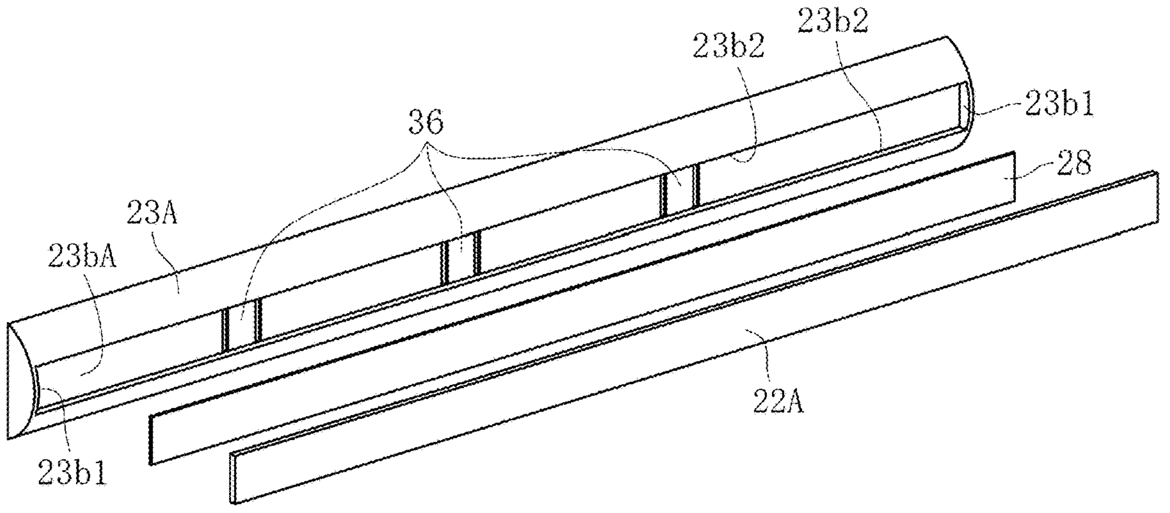
FIG. 18 is a perspective view of the heater, the first thermal conductor, second thermal conductors, and a heater holder incorporated in the fixing device depicted in FIG. 17.

As illustrated in FIG. 18, the plurality of second thermal conductors 36 is arranged on a plurality of parts on the heater holder 23A in a longitudinal direction thereof, respectively. The heater holder 23A includes a recess 23*b*A that includes cavities placed with the second thermal conductors 36, respectively. The cavities are stepped down by one step from other portion of the recess 23*b*A.

The second thermal conductor 36 and the heater holder 23A define a gap therebetween at both lateral ends of the second thermal conductor 36 in the longitudinal direction of the heater holder 23A. Thus, the second thermal conductor 36 suppresses conduction of heat therefrom to the heater holder 23A, causing the heater 22A to heat the fixing belt 20 efficiently. FIG. 18 omits illustration of the guides 26 depicted in FIG. 17.

Figure 19:
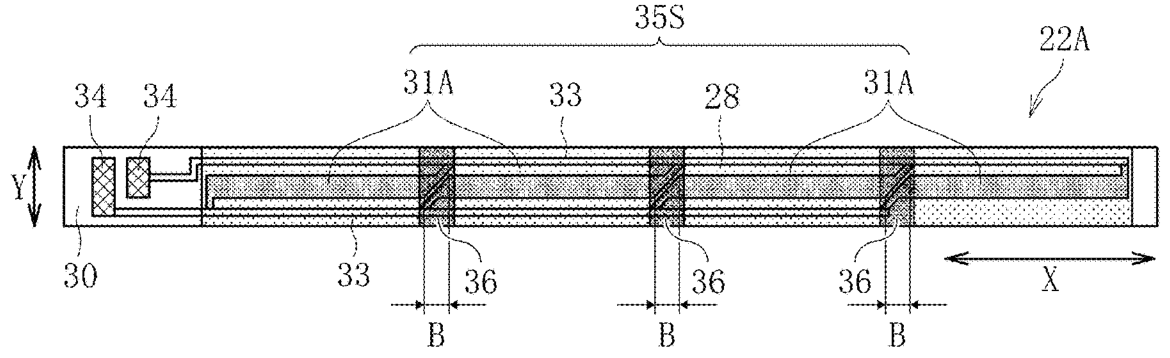
FIG. 19 is a plan view of the heater depicted in FIG. 18, illustrating an arrangement of the first thermal conductor and the second thermal conductors.
Figure 20:
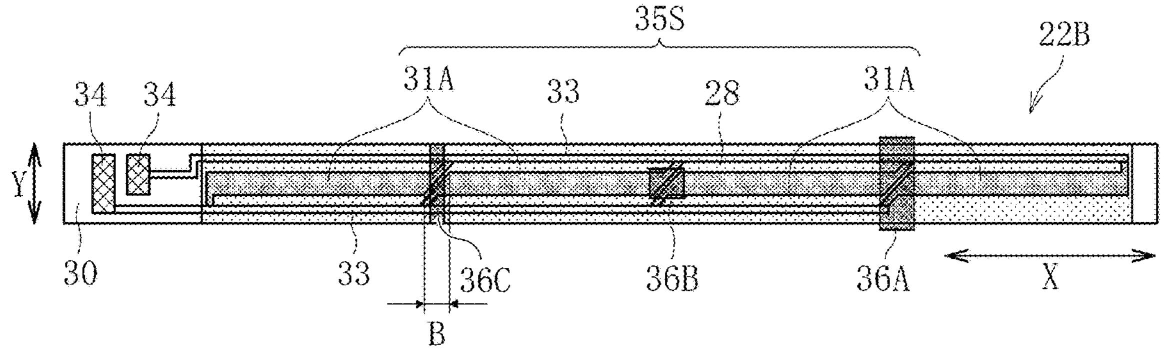
FIG. 20 is a plan view of a heater as a variation of the heater depicted in FIG. 19, illustrating an arrangement of second thermal conductors, that is different from the arrangement of the second thermal conductors depicted in FIG. 19.

As illustrated in FIG. 19, the second thermal conductor 36 that is hatched is disposed opposite the gap B between the adjacent resistive heat generators 31A and overlaps at least a part of the adjacent resistive heat generators 31A in the longitudinal direction X of the heater 22A. According to the embodiment, the second thermal conductor 36 extends throughout an entire span of the gap B. FIG. 19 and FIG. 20 referred to in a description below illustrate the first thermal conductor 28 that is disposed opposite and spans the heat generating portion 35S in the longitudinal direction X thereof. Alternatively, the first thermal conductor 28 may span differently as described above.

The fixing device 9D according to the embodiment includes, in addition to the first thermal conductor 28, the second thermal conductors 36 each of which is disposed opposite the gap B and overlaps at least a part of the adjacent resistive heat generators 31A in the longitudinal direction X of the heater 22A. The second thermal conductors 36 improve efficiency in conduction of heat at the gaps B in the longitudinal direction X of the heater 22A in which the resistive heat generators 31A are arranged, suppressing uneven temperature of the heater 22A in the longitudinal direction X thereof.

Unlike the embodiment described above, according to an embodiment of the present disclosure, each of the first thermal conductor 28 and the second thermal conductors 36 is made of a graphene sheet. Hence, each of the first thermal conductor 28 and the second thermal conductors 36 has an enhanced thermal conductivity in a predetermined direction along a surface of the graphene sheet, that is, the longitudinal direction X, not a thickness direction of the graphene sheet. Accordingly, each of the first thermal conductor 28 and the second thermal conductors 36 suppresses uneven temperature of the heater 22A and the fixing belt 20 in the longitudinal direction X thereof effectively.

For example, the first thermal conductor 28 or the second thermal conductor 36 is made of graphite. Accordingly, the first thermal conductor 28 or the second thermal conductor 36 attains an efficiency in conduction of heat in the longitudinal direction X, which is greater than an efficiency in conduction of heat in a thickness direction, that is, the laminating direction in which the stay 24, the heater holder 23A, the second thermal conductor 36, the first thermal conductor 28, and the heater 22A are arranged, thus suppressing conduction of heat to the heater holder 23A. Consequently, the first thermal conductor 28 or the second thermal conductor 36 suppresses uneven temperature of the heater 22A in the longitudinal direction X thereof efficiently. Additionally, the first thermal conductor 28 or the second thermal conductor 36 minimizes heat conducted to the heater holder 23A. The first thermal conductor 28 or the second thermal conductor 36 that is made of graphite attains enhanced heat resistance that inhibits oxidation at approximately 700 degrees Celsius.

The graphite sheet has a physical property and a dimension that are adjusted properly according to a function of the first thermal conductor 28 or the second thermal conductor 36. For example, the graphite sheet is made of graphite having enhanced purity or single crystal graphite. The graphite sheet has an increased thickness to enhance anisotropic thermal conduction.

In order to perform high speed fixing, the fixing device 9D employs the graphite sheet having a decreased thickness to decrease thermal capacity of the fixing device 9D. If the fixing nip N and the heater 22A have an increased width in the longitudinal direction X thereof, the first thermal conductor 28 or the second thermal conductor 36 also has an increased width in the longitudinal direction X thereof.

In view of increasing mechanical strength, the graphite sheet preferably has a number of layers that is not smaller than 11 layers. The graphite sheet may include a part constructed of a single layer and another part constructed of a plurality of layers.

Figure 24:
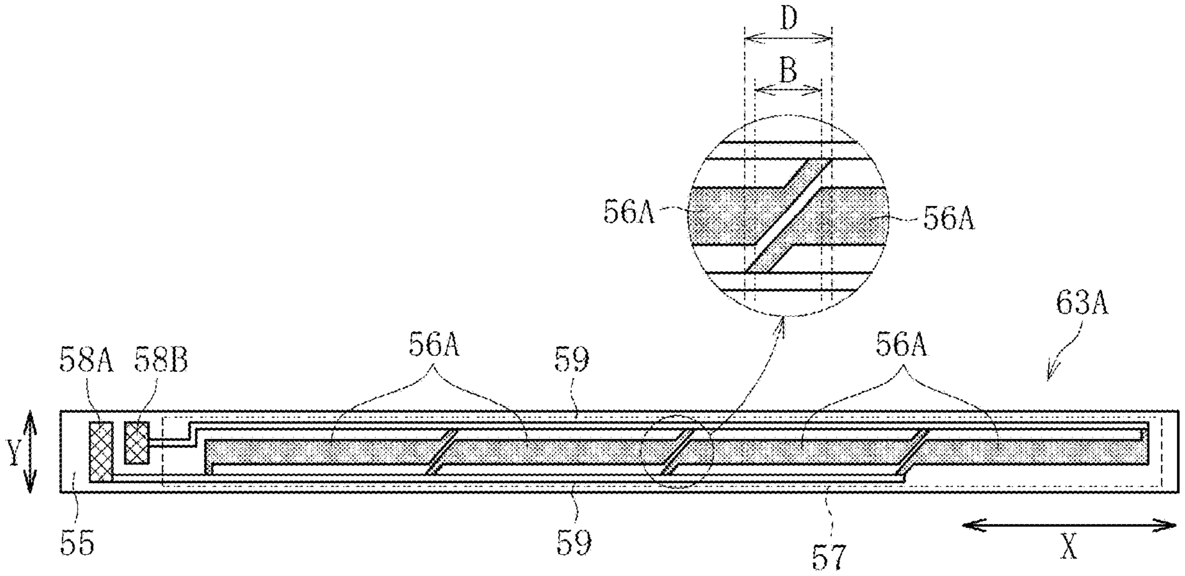
FIG. 24 is a plan view of a heater as yet another variation of the heater depicted in FIG. 19, illustrating a partially enlarged view thereof.

The second thermal conductor 36 is disposed opposite the gap B between the adjacent resistive heat generators 31A and an enlarged gap region D encompassing the periphery of the gap B depicted in FIG. 24 and overlaps at least a part of the adjacent resistive heat generators 31A in the longitudinal direction X of the heater 22A. Hence, the second thermal conductor 36 may be positioned with respect to the resistive heat generators 31A differently from the second thermal conductor 36 depicted in FIG. 19. For example, as illustrated in FIG. 20, the fixing device 9D may incorporate a heater 22B including a second thermal conductor 36A that protrudes beyond the base 30 bidirectionally in the orthogonal direction Y perpendicular to the longitudinal direction X of the heater 22B.

The heater 22B further includes a second thermal conductor 36B that is disposed within a span of the resistive heat generator 31A in the orthogonal direction Y. The heater 22B further includes a second thermal conductor 36C that spans a part of the gap B.

Figure 21:
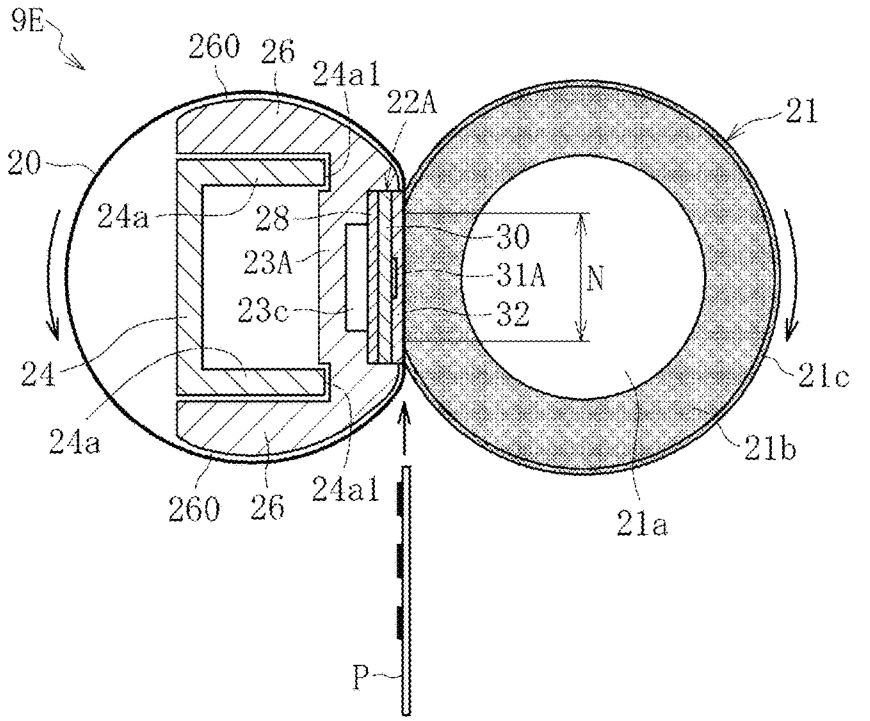
FIG. 21 is a schematic cross-sectional view of a fixing device according to yet another embodiment of the present disclosure.

FIG. 21 illustrates a fixing device 9E according to an embodiment of the present disclosure that includes a retracted portion 23*c* (e.g., a clearance) that is interposed between the first thermal conductor 28 and the heater holder 23A in the thickness direction of the heater holder 23A (e.g., a horizontal direction in FIG. 21). For example, the retracted portion 23*c* is disposed in a part of the recess 23*b*A of the heater holder 23A, which accommodates the heater 22A, the first thermal conductor 28, and the second thermal conductors 36. The retracted portion 23*c* is disposed outboard from the second thermal conductor 36 in the longitudinal direction X of the heater holder 23A. The retracted portion 23*c* spans a part of the recess 23*b*A in the orthogonal direction Y. A part of the recess 23*b*A is stepped down from other part of the recess 23*b*A, that accommodates the first thermal conductor 28, to produce the retracted portion 23*c* serving as a heat insulation layer.

Accordingly, the heater holder 23A contacts the first thermal conductor 28 with a decreased contact area, thus suppressing conduction of heat from the first thermal conductor 28 to the heater holder 23A and causing the heater 22A to heat the fixing belt 20 efficiently. On a cross section that crosses a longitudinal direction of the fixing device 9E and is provided with the second thermal conductor 36, the second thermal conductor 36 contacts the heater holder 23A as illustrated in FIG. 17 illustrating the fixing device 9D according to the embodiment described above.

According to the embodiment, the retracted portion 23*c* spans an entirety of the resistive heat generator 31A in the orthogonal direction (e.g., a vertical direction in FIG. 21) of the heater 22A. Thus, the retracted portion 23*c* suppresses conduction of heat from the first thermal conductor 28 to the heater holder 23A, causing the heater 22A to heat the fixing belt 20 efficiently. Alternatively, instead of the retracted portion 23*c* that defines the clearance, the fixing device 9E may incorporate a thermal insulator that has a thermal conductivity smaller than a thermal conductivity of the heater holder 23A as the heat insulation layer.

According to the embodiments described above, the second thermal conductor 36 is provided separately from the first thermal conductor 28. Alternatively, the fixing device 9E may have other configuration. For example, the first thermal conductor 28 may include an opposed portion that is disposed opposite the gap B and has a thickness greater than a thickness of an outboard portion of the first thermal conductor 28, which is other than the opposed portion.

Figure 22:
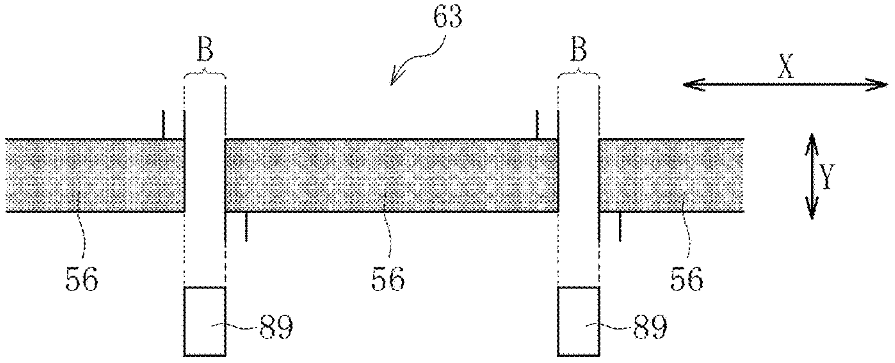
FIG. 22 is a plan view of a heater as another variation of the heater depicted in FIG. 19, illustrating an arrangement of first thermal conductors disposed opposite the heater.

FIG. 22 is a plan view of a heater 63 and first thermal conductors 89, illustrating an example of arrangement of the first thermal conductors 89. As illustrated in FIG. 22, the heater 63 includes a plurality of resistive heat generators 56. Each of the first thermal conductors 89 is disposed opposite and spans the entire span of the gap B in the longitudinal direction X in which the resistive heat generators 56 are arranged. FIG. 22 illustrates the resistive heat generators 56 shifted from the first thermal conductors 89 vertically in FIG. 22 for convenience. Practically, the resistive heat generators 56 are substantially leveled with the first thermal conductors 89 in the orthogonal direction Y perpendicular to the longitudinal direction X. Alternatively, the first thermal conductors 89 may be disposed with respect to the resistive heat generators 56 with other arrangement. For example, the first thermal conductor 89 may be replaced by a first thermal conductor 89A that spans or covers a part or an entirety of the resistive heat generator 56 in the orthogonal direction Y as illustrated in FIG. 23.

Figure 23:
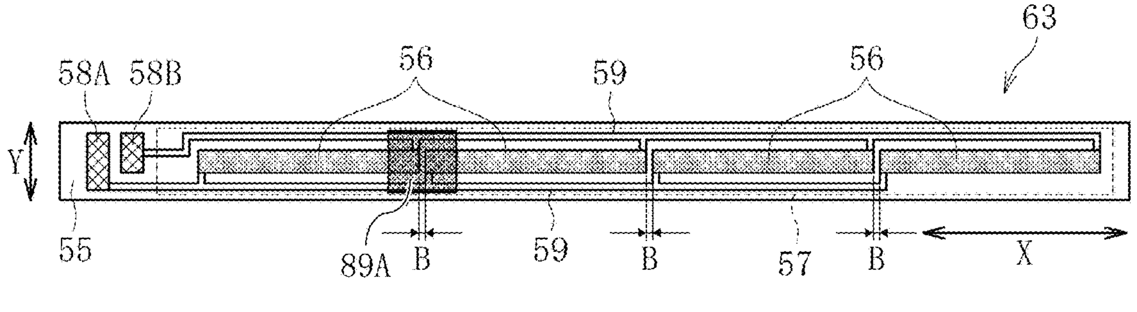
FIG. 23 is a plan view of the heater depicted in FIG. 22, illustrating another arrangement of a first thermal conductor disposed opposite the heater.

As illustrated in FIG. 23, the heater 63 includes a base 55, an insulating layer 57, electrodes 58A and 58B, and feeders 59. The base 55 mounts the resistive heat generators 56. The insulating layer 57 coats the resistive heat generators 56. The resistive heat generators 56 are electrically connected in parallel to the electrodes 58A and 58B through the feeders 59.

FIG. 23 illustrates the heater 63 and the first thermal conductor 89A that is disposed opposite and spans the gap B in the longitudinal direction X in which the resistive heat generators 56 of the heater 63 are arranged. The first thermal conductor 89A bridges the adjacent resistive heat generators 56 that sandwich the gap B. A state in which the first thermal conductor 89A bridges the adjacent resistive heat generators 56 denotes a state in which the first thermal conductor 89A overlaps the adjacent resistive heat generators 56 at least partially in the longitudinal direction X in which the resistive heat generators 56 are arranged.

FIG. 22 illustrates the plurality of first thermal conductors 89 that is disposed opposite the plurality of gaps B of the heater 63, respectively. Alternatively, as illustrated in FIG. 23, the first thermal conductor 89A may be disposed opposite a part of the gaps B, for example, one of the gaps B. A state in which the first thermal conductor 89A is disposed opposite the gap B denotes that at least a part of the first thermal conductor 89A overlaps the gap B in the longitudinal direction X in which the resistive heat generators 56 are arranged.

Like the resistive heat generators 31 of a heater 22C described below with reference to FIG. 39, the heater 63 according to the embodiment includes the plurality of resistive heat generators 56 arranged in the longitudinal direction X of the heater 63 with the gap B between the adjacent resistive heat generators 56. However, with the plurality of resistive heat generators 56 arranged with the gap B between the adjacent resistive heat generators 56, the heater 63 is subject to temperature decrease in a gap region disposed opposite the gap B between the adjacent resistive heat generators 56 depicted in FIGS. 22 and 23 compared to a heat generator region disposed opposite the resistive heat generator 56. Accordingly, a fixing belt 61 described below with reference to FIG. 25 may also suffer from temperature decrease in a gap region thereon disposed opposite the gap region of the heater 63, resulting in uneven temperature of the fixing belt 61 in a longitudinal direction thereof.

To address this circumstance, according to the embodiment, the first thermal conductor 89 suppresses temperature decrease in the gap region of the fixing belt 61 and therefore suppresses uneven temperature of the fixing belt 61 in the longitudinal direction thereof.

A description is provided of a construction of a first thermal conductor 89B according to an embodiment of the present disclosure as a variation of the first thermal conductor 89 in detail.

Figure 25:
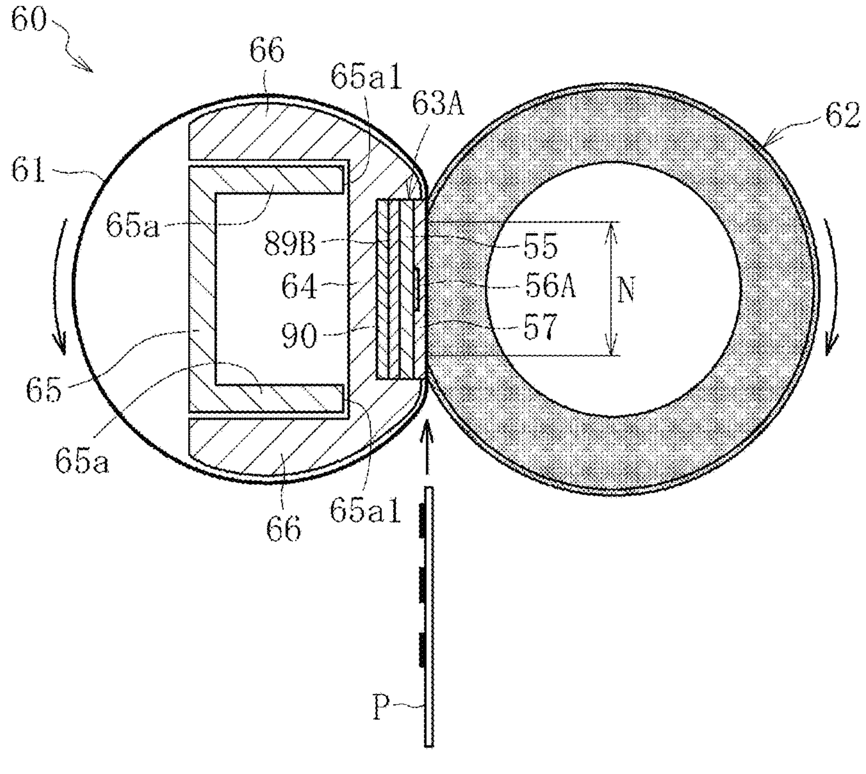
FIG. 25 is a schematic cross-sectional view of a fixing device according to yet another embodiment of the present disclosure.

FIG. 24 is a plan view of a heater 63A disposed opposite the first thermal conductor 89B. FIG. 25 is a cross-sectional view of a fixing device 60 incorporating the heater 63A.

As illustrated in FIG. 25, the fixing device 60 includes the fixing belt 61, a pressure roller 62, the heater 63A, a heater holder 64, a stay 65, guides 66, the first thermal conductor 89B, and second thermal conductors 90. The heater 63A includes the base 55, resistive heat generators 56A, and the insulating layer 57. The first thermal conductor 89B is interposed between the heater 63A and the stay 65 in a horizontal direction in FIG. 25. Specifically, the first thermal conductor 89B is sandwiched between the heater 63A and the heater holder 64. For example, the first thermal conductor 89B has one face that contacts a back face of the base 55 of the heater 63A. The first thermal conductor 89B has another face (e.g., an opposite face opposite to the one face) that contacts the heater holder 64.

The stay 65 includes two perpendicular portions 65*a* that extend in a thickness direction of the heater 63A and the like. Each of the perpendicular portions 65*a* has a contact face 65*a*1 that contacts the heater holder 64, supporting the heater holder 64, the first thermal conductor 89B, and the heater 63A. The contact faces 65*a*1 are disposed outboard from the resistive heat generators 56A in the orthogonal direction Y perpendicular to the longitudinal direction X depicted in FIG. 24 of the stay 65 (e.g., a vertical direction in FIG. 25). Thus, the stay 65 suppresses conduction of heat thereto from the heater 63A, causing the heater 63A to heat the fixing belt 61 efficiently.

Figure 26:
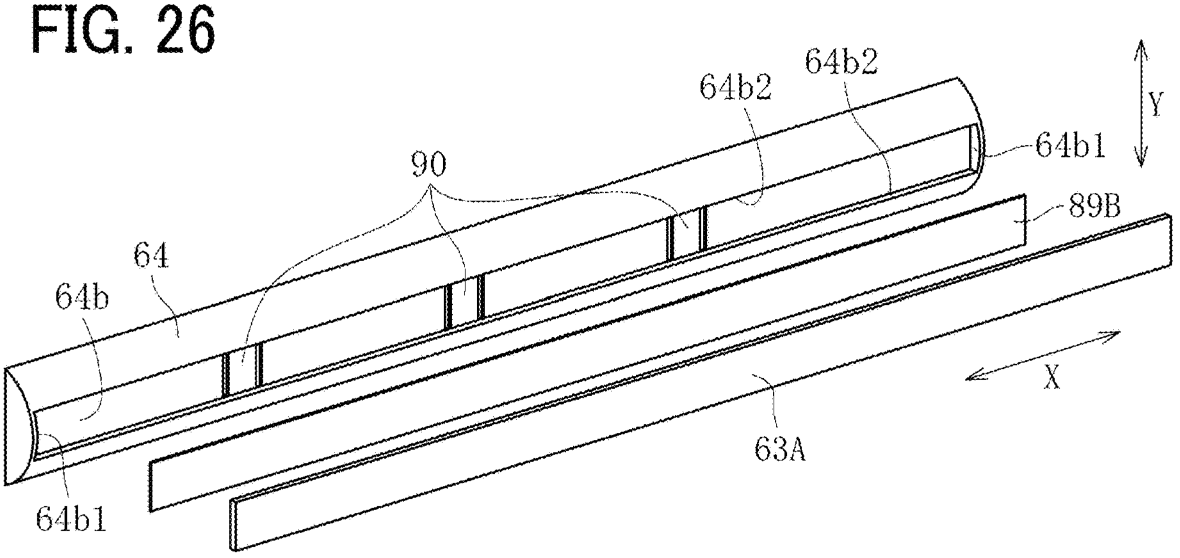
FIG. 26 is a perspective view of the heater, a first thermal conductor, second thermal conductors, and a heater holder incorporated in the fixing device depicted in FIG. 25.

As illustrated in FIG. 26, the first thermal conductor 89B is a plate having an even thickness. For example, the first thermal conductor 89B has a thickness of 0.3 mm, a length of 222 mm in a longitudinal direction thereof, and a width of 10 mm in an orthogonal direction perpendicular to the longitudinal direction thereof. According to the embodiment, the first thermal conductor 89B is constructed of a single plate. Alternatively, the first thermal conductor 89B may be constructed of a plurality of members. FIG. 26 omits illustration of the guides 66 depicted in FIG. 25.

The first thermal conductor 89B is fitted to a recess 64*b* of the heater holder 64. The heater 63A is attached to the heater holder 64 from above the first thermal conductor 89B. Thus, the heater holder 64 and the heater 63A sandwich and hold the first thermal conductor 89B. According to the embodiment, the first thermal conductor 89B has a length in the longitudinal direction X thereof, which is equivalent to a length of the heater 63A in the longitudinal direction X thereof.

The recess 64*b* includes side walls 64*b*1 that extend in the orthogonal direction Y perpendicular to the longitudinal direction X of the first thermal conductor 89B. The side walls 64*b*1 serving as longitudinal direction restrictors, respectively, restrict motion of the first thermal conductor 89B and the heater 63A in the longitudinal direction X thereof. Thus, the side walls 64*b*1 restrict shifting of the first thermal conductor 89B in the longitudinal direction X thereof inside the fixing device 60, improving efficiency in conduction of heat in a target span in the longitudinal direction X of the first thermal conductor 89B. The heater holder 64 further includes side walls 64*b*2 that extend in the longitudinal direction X of the recess 64*b*. The side walls 64*b*2, serving as orthogonal direction restrictors, respectively, restrict motion of the first thermal conductor 89B and the heater 63A in the orthogonal direction Y perpendicular to the longitudinal direction X of the first thermal conductor 89B.

Figure 27:
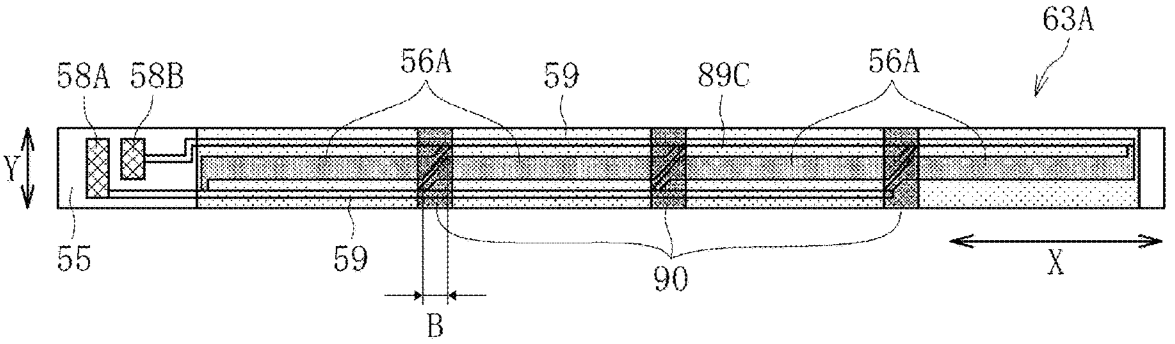
FIG. 27 is a plan view of the heater depicted in FIG. 26, illustrating an arrangement of a first thermal conductor as a variation of the first thermal conductor depicted in FIG. 26 and the second thermal conductors that are disposed opposite the heater.

The first thermal conductor 89B may extend in a span other than a span in which the first thermal conductor 89B extends in the longitudinal direction X thereof as illustrated in FIG. 26. For example, as illustrated in FIG. 27, the fixing device 60 may employ a first thermal conductor 89C that extends in a span hatched in FIG. 27 in which the resistive heat generators 56A are arranged in the longitudinal direction X of the heater 63A.

Alternatively, as illustrated in FIG. 22, the fixing device 60 may include the heater 63 and the first thermal conductors 89 that are disposed opposite and span the gaps B, respectively, in the longitudinal direction X. FIG. 22 illustrates the resistive heat generators 56 shifted from the first thermal conductors 89 vertically in FIG. 22 for convenience. Practically, the resistive heat generators 56 are substantially leveled with the first thermal conductors 89 in the orthogonal direction Y perpendicular to the longitudinal direction X.

The first thermal conductor 89C may span a part of the resistive heat generator 56A in the orthogonal direction Y. As illustrated in FIG. 23, the fixing device 60 may employ the first thermal conductor 89A that spans the entirety of the resistive heat generator 56 in the orthogonal direction Y. Further, as illustrated in FIG. 23, the first thermal conductor 89A is disposed opposite and spans the gap B in the longitudinal direction X. Additionally, the first thermal conductor 89A bridges the adjacent resistive heat generators 56 that sandwich the gap B.

A state in which the first thermal conductor 89A bridges the adjacent resistive heat generators 56 denotes a state in which the first thermal conductor 89A overlaps the adjacent resistive heat generators 56 at least partially in the longitudinal direction X. As illustrated in FIG. 22, the fixing device 60 may incorporate the plurality of first thermal conductors 89 that is disposed opposite the plurality of gaps B of the heater 63, respectively. As illustrated in FIG. 23, the fixing device 60 may employ one or more first thermal conductors 89A that are disposed opposite a part of the plurality of gaps B (e.g., a single gap B according to an embodiment depicted in FIG. 23). A state in which the first thermal conductor 89 or 89A is disposed opposite the gap B denotes a state in which at least a part of the first thermal conductor 89 or 89A overlaps the gap B in the longitudinal direction X of the first thermal conductor 89 or 89A.

As illustrated in FIG. 25, as the pressure roller 62 applies pressure to the heater 63A, the heater 63A and the heater holder 64 sandwich the first thermal conductor 89B such that the first thermal conductor 89B contacts the heater 63A and the heater holder 64. As the first thermal conductor 89B contacts the heater 63A, the first thermal conductor 89B conducts heat generated by the heater 63A in the longitudinal direction X thereof with improved efficiency. The first thermal conductor 89B is disposed opposite the gaps B arranged in the longitudinal direction X of the heater 63A. Thus, the first thermal conductor 89B improves efficiency in conduction of heat at the gaps B, increases an amount of heat conducted to the gaps B, and increases the temperature of the heater 63A at the gaps B.

Accordingly, the first thermal conductor 89B suppresses uneven temperature of the heater 63A in the longitudinal direction X thereof, thereby suppressing uneven temperature of the fixing belt 61 in the longitudinal direction X thereof. Consequently, the fixing belt 61 suppresses uneven fixing and uneven gloss of a toner image fixed on a sheet P.

The heater 63A does not increase an amount of heat generation to attain sufficient fixing performance at the gaps B, causing the fixing device 60 to save energy. For example, if the fixing device 60 incorporates the first thermal conductor 89B or 89C that spans an entire region where the resistive heat generators 56A are arranged in the longitudinal direction X, the first thermal conductor 89B or 89C improves efficiency in conduction of heat of the heater 63A in an entirety of a main heating span of the heater 63A disposed opposite the imaging span of a toner image formed on a sheet P conveyed through the fixing nip N. Accordingly, the first thermal conductor 89B or 89C suppresses uneven temperature of the heater 63A and the fixing belt 61 in the longitudinal direction X thereof.

The first thermal conductor 89B or 89C is coupled to the resistive heat generators 56A having the PTC property, suppressing overheating of the fixing belt 61 in the non-conveyance span where the sheet P having the decreased size is not conveyed more effectively. The PTC property defines a property in which the resistance value increases as the temperature increases, for example, a heater output decreases under a given voltage. For example, the resistive heat generator 56 or 56A having the PTC property suppresses an amount of heat generated by the resistive heat generator 56 or 56A in the non-conveyance span effectively. Additionally, the first thermal conductor 89B or 89C conducts heat from the non-conveyance span on the fixing belt 61 that suffers from temperature increase to the conveyance span on the fixing belt 61 efficiently. The PTC property and heat conduction of the resistive heat generator 56 or 56A attain a synergistic effect that suppresses overheating of the fixing belt 61 in the non-conveyance span effectively.

Since the heater 63 or 63A generates heat in a decreased amount at the gap B, the heater 63 or 63A has a decreased temperature also in the periphery of the gap B. To address this circumstance, the first thermal conductor 89A is preferably disposed in the periphery of the gap B. For example, as illustrated in FIG. 24, the first thermal conductor 89A is disposed opposite the enlarged gap region D encompassing the periphery of the gap B. Thus, the first thermal conductor 89A improves efficiency in conduction of heat in the longitudinal direction X at the gap B and the periphery thereof, suppressing uneven temperature of the heater 63A in the longitudinal direction X thereof more effectively. Each of the first thermal conductors 89B and 89C depicted in FIGS. 26 and 27, respectively, spans the entire region where the resistive heat generators 56A are arranged in the longitudinal direction X, suppressing uneven temperature of the heater 63A and the fixing belt 61 in the longitudinal direction X thereof more precisely.

A description is provided of a construction of the fixing device 60 according to an embodiment of the present disclosure.

As illustrated in FIG. 25, the fixing device 60 includes the plurality of second thermal conductors 90 interposed between the heater holder 64 and the first thermal conductor 89B. The second thermal conductors 90 are disposed at a position different from a position of the first thermal conductor 89B in a laminating direction (e.g., the horizontal direction in FIG. 25) in which the stay 65, the heater holder 64, the second thermal conductors 90, the first thermal conductor 89B, and the heater 63A are arranged.

Specifically, the second thermal conductors 90 are superimposed on the first thermal conductor 89B. Like the fixing device 9C depicted in FIG. 14, the fixing device 60 depicted in FIG. 25 incorporates a temperature sensor (e.g., a thermistor). FIG. 25 illustrates a cross section of the fixing device 60 in which the temperature sensor is not disposed.

The second thermal conductors 90 are made of a material having a thermal conductivity greater than a thermal conductivity of the base 55. For example, the second thermal conductors 90 are made of graphene or graphite. According to the embodiment, each of the second thermal conductors 90 is a graphite sheet having a thickness of 1 mm. Alternatively, each of the second thermal conductors 90 may be a plate made of aluminum, copper, silver, or the like.

As illustrated in FIG. 26, the plurality of second thermal conductors 90 is disposed in the recess 64*b* of the heater holder 64. The adjacent second thermal conductors 90 sandwich a gap in the longitudinal direction X. The heater holder 64 includes cavities placed with the second thermal conductors 90, respectively. The cavities are stepped down by one step from other portion of the heater holder 64.

The second thermal conductor 90 and the heater holder 64 define clearances therebetween at both lateral ends of the second thermal conductor 90 in the longitudinal direction X. The clearances suppress conduction of heat from the second thermal conductor 90 to the heater holder 64, causing the heater 63A to heat the fixing belt 61 efficiently. FIG. 26 omits illustration of the guides 66 depicted in FIG. 25.

Figure 29:
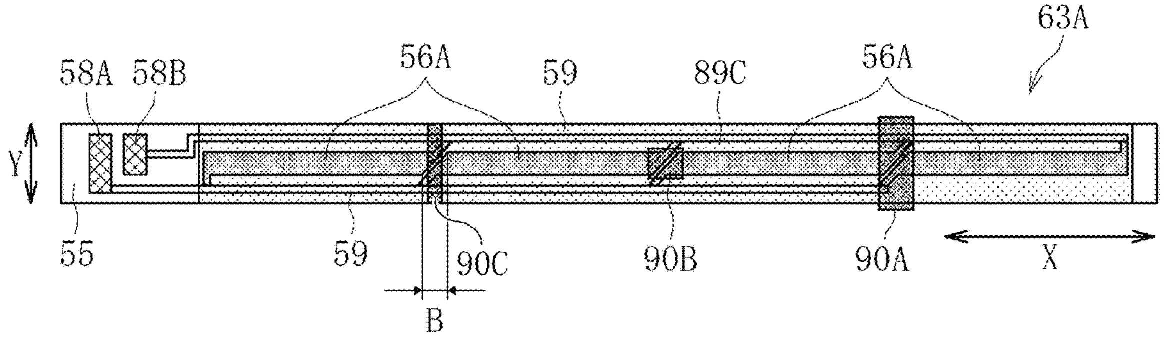
FIG. 29 is a plan view of the heater depicted in FIG. 27, illustrating an arrangement of second thermal conductors as a variation of the second thermal conductors depicted in FIG. 27, which are disposed opposite the heater.

As illustrated in FIG. 27, the second thermal conductor 90 that is hatched is disposed opposite the gap B between the adjacent resistive heat generators 56A and overlaps at least a part of the adjacent resistive heat generators 56A in the longitudinal direction X. According to the embodiment, the second thermal conductor 90 spans an entirety of the gap B. FIG. 27 and FIG. 29 that is referred to in a description below illustrate the first thermal conductor 89C that spans the entire region where the resistive heat generators 56A are arranged in the longitudinal direction X. Alternatively, the first thermal conductor 89C may span a region that is different from the region depicted in FIGS. 27 and 29.

Figure 28:
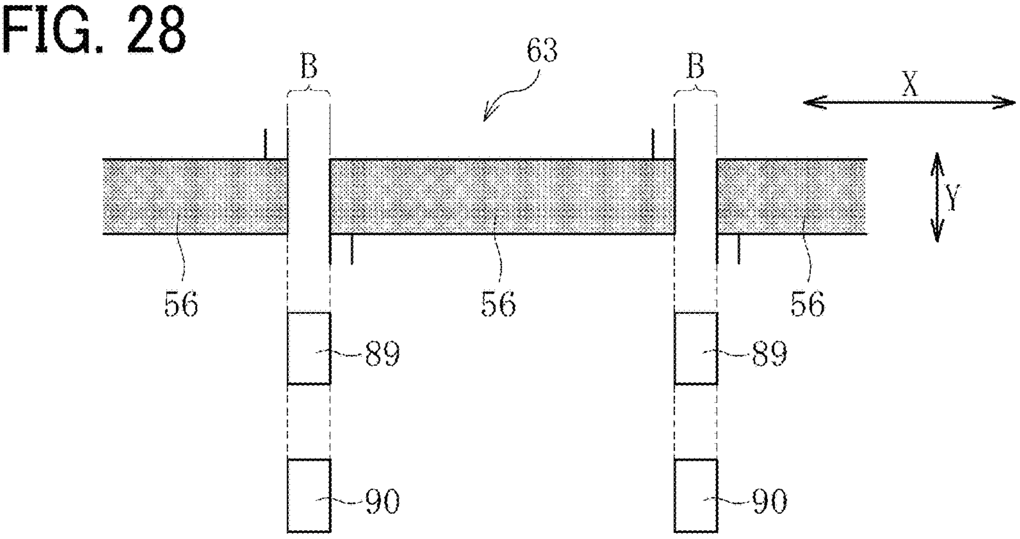
FIG. 28 is a plan view of the heater depicted in FIG. 22, illustrating another arrangement of the first thermal conductors and the second thermal conductors that are disposed opposite the heater.

The fixing device 60 according to the embodiment includes the second thermal conductors 90 in addition to the first thermal conductor 89B. The second thermal conductor 90 is disposed opposite the gap B and overlaps at least a part of the adjacent resistive heat generators 56A in the longitudinal direction X. The second thermal conductor 90 further improves efficiency in conduction of heat at the gap B in the longitudinal direction X, suppressing uneven temperature of the heater 63A in the longitudinal direction X thereof more effectively. As illustrated in FIG. 28, the fixing device 60 may include the heater 63 disposed opposite the first thermal conductor 89 and the second thermal conductor 90 that are preferably disposed opposite the entire span of the gap B in the longitudinal direction X.

Accordingly, the first thermal conductor 89 and the second thermal conductor 90 improve efficiency in conduction of heat at the gap B compared to an outboard region of the heater 63, which is other than the gap B. FIG. 28 illustrates the resistive heat generators 56 shifted from the first thermal conductors 89 and the second thermal conductors 90 vertically in FIG. 28 for convenience. Practically, the resistive heat generators 56 are substantially leveled with the first thermal conductors 89 and the second thermal conductors 90 in the orthogonal direction Y perpendicular to the longitudinal direction X. Alternatively, the first thermal conductors 89 and the second thermal conductors 90 may be disposed with respect to the resistive heat generators 56 with other arrangement. For example, the first thermal conductor 89 and the second thermal conductor 90 may span or cover a part or the entirety of the resistive heat generator 56 in the orthogonal direction Y.

Each of the first thermal conductors 89, 89A, 89B, and 89C and the second thermal conductor 90 may be a graphene sheet. In this case, each of the first thermal conductors 89, 89A, 89B, and 89C and the second thermal conductor 90 has an enhanced thermal conductivity in a predetermined direction along a surface of the graphene sheet, that is, the longitudinal direction X, not a thickness direction of the graphene sheet. Accordingly, each of the first thermal conductors 89, 89A, 89B, and 89C and the second thermal conductor 90 suppresses uneven temperature of the heaters 63 and 63A and the fixing belt 61 in the longitudinal direction X thereof effectively. Each of the first thermal conductors 89, 89A, 89B, and 89C and the second thermal conductor 90 may be a graphite sheet. A description of a configuration of each of the graphene sheet and the graphite sheet is provided below with reference to FIGS. 31 and 32.

The second thermal conductor 90 is disposed opposite the gap B between the adjacent resistive heat generators 56A and the enlarged gap region D depicted in FIG. 24 and overlaps at least a part of the adjacent resistive heat generators 56A in the longitudinal direction X of the heater 63A. Hence, the second thermal conductor 90 may be positioned with respect to the resistive heat generators 56A differently from the second thermal conductor 90 depicted in FIG. 27. For example, as illustrated in FIG. 29, the fixing device 60 may include second thermal conductors 90A, 90B, and 90C. The second thermal conductor 90A protrudes beyond the base 55 bidirectionally in the orthogonal direction Y.

The second thermal conductor 90B is disposed within a span of the resistive heat generator 56A in the orthogonal direction Y. The second thermal conductor 90C spans a part of the gap B.

A description is provided of a construction of a fixing device 60A according to an embodiment of the present disclosure.

Figure 30:
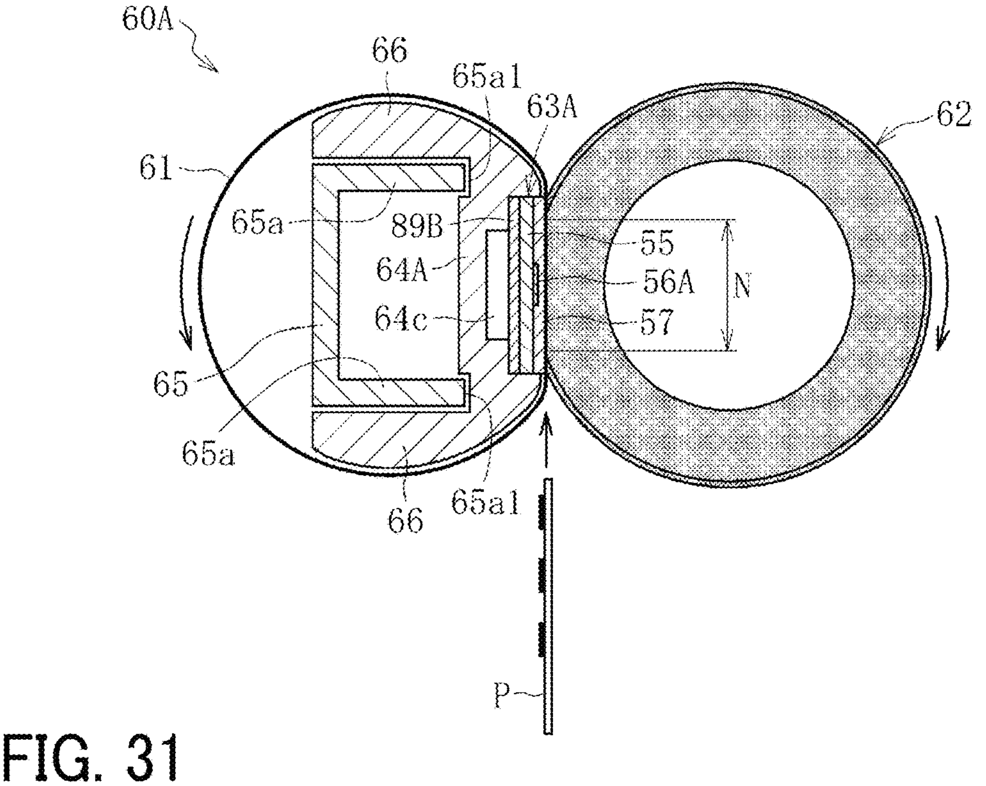
FIG. 30 is a schematic cross-sectional view of a fixing device according to yet another embodiment of the present disclosure.

As illustrated in FIG. 30, the fixing device 60A includes a heater holder 64A. The heater holder 64A and the first thermal conductor 89B define a clearance therebetween in a thickness direction of the heater holder 64A (e.g., a horizontal direction in FIG. 30). For example, the heater holder 64A includes the recess **64*b* depicted in FIG. 26 that accommodates the heater 63A, the first thermal conductor 89B, and the second thermal conductors 90. The heater holder 64A includes a retracted portion 64*c* serving as a heat insulation layer disposed at a part of the recess 64*b***.

The retracted portion **64*c* is disposed at a part of the recess 64*b*, which is outboard from a portion of the recess 64*b*, which is placed with the second thermal conductor 90, in the longitudinal direction X of the heater holder 64A. FIG. 30 omits illustration of the second thermal conductor 90. A part of the recess 64*b* of the heater holder 64A is deepened compared to other part of the recess 64*b* to produce the retracted portion 64*c***.

Accordingly, the heater holder 64A contacts the first thermal conductor 89B with a minimum contact area, suppressing conduction of heat from the first thermal conductor 89B to the heater holder 64A and causing the heater 63A to heat the fixing belt 61 efficiently. On a cross section that crosses a longitudinal direction of the fixing device 60A and is provided with the second thermal conductor 90, the second thermal conductor 90 contacts the heater holder 64A like in the fixing device 60 according to the embodiment depicted in FIG. 25.

The fixing device 60A according to the embodiment depicted in FIG. 30 includes the retracted portion **64*c* that spans an entirety of the resistive heat generator 56A in the orthogonal direction Y depicted in FIG. 29 (e.g., a vertical direction in FIG. 30). Accordingly, the retracted portion 64*c* suppresses conduction of heat from the first thermal conductor 89B to the heater holder 64A effectively, improving efficiency in heating of the fixing belt 61 by the heater 63A. Alternatively, instead of the retracted portion 64*c* that defines the clearance, the fixing device 60A may incorporate a thermal insulator that has a thermal conductivity smaller than a thermal conductivity of the heater holder 64**A as the heat insulation layer.

The fixing device 60A according to the embodiment includes the second thermal conductor 90 that is provided separately from the first thermal conductor 89B. Alternatively, the fixing device 60A may have other configuration. For example, the first thermal conductor 89B may include an opposed portion that is disposed opposite the gap B and has a thickness greater than a thickness of an outboard portion of the first thermal conductor 89B, which is other than the opposed portion. Thus, the first thermal conductor 89B also achieves a function of the second thermal conductor 90.

The above describes the embodiments of the present disclosure applied to a fixing device (e.g., the fixing devices 9, 9A, 9B, 9C, 9D, 9E, 60, and 60A) as one example of a belt type heating device including a nip forming device. However, application of the embodiments of the present disclosure is not limited to the fixing device. Alternatively, the embodiments of the present disclosure may be applied to a dryer that dries liquid such as ink applied on a sheet, a laminator that bonds film as a coating member onto a surface of a sheet by thermocompression, and a heating device such as a heat sealer that bonds sealing portions of a packaging material by thermocompression. The embodiments of the present disclosure are also applied to a nip forming device that does not incorporate a heat source such as a heater.

Figure 31:
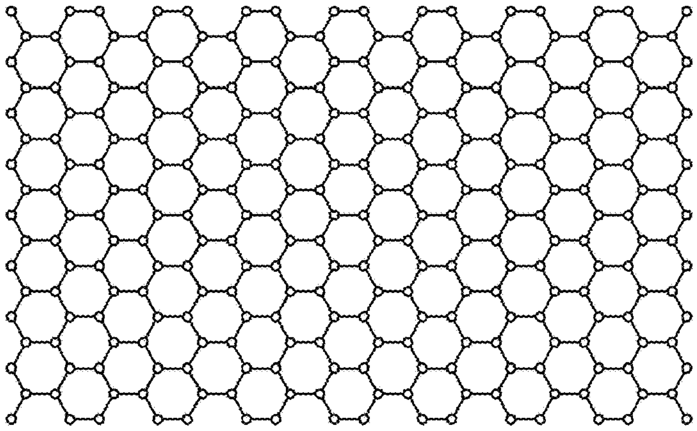
FIG. 31 is a diagram of a crystalline structure of atoms of graphene.

With reference to FIGS. 30 and 31, a description is provided of the configuration of each of the graphene sheet and the graphite sheet.

Graphene is thin powder. As illustrated in FIG. 31, graphene is constructed of a plane of carbon atoms arranged in a two-dimensional honeycomb lattice. The graphene sheet is graphene in a sheet form and is usually constructed of a single layer.

The graphene sheet may contain impurities in the single layer of carbon atoms or may have a fullerene structure. The fullerene structure is generally recognized as a polycyclic compound constructed of an identical number of carbon atoms bonded to form a cage with fused rings of five and six atoms. For example, the fullerene structure is other closed cage structure formed of fullerene C60, C70, and C80 or 3-coordinated carbon atoms.

The graphene sheet is artificial and is produced by chemical vapor deposition (CVD), for example. The graphene sheet is commercially available. A size and a thickness of the graphene sheet and a number of layers and the like of the graphite sheet described below are measured with a transmission electron microscope (TEM), for example.

Figure 32:
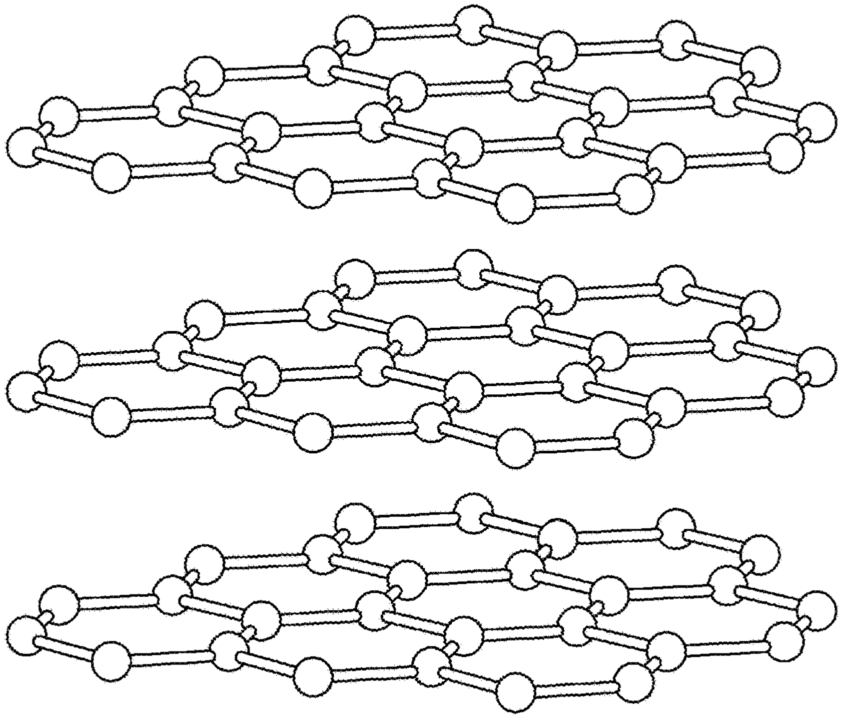
FIG. 32 is a diagram of a crystalline structure of atoms of graphite.

Graphite is constructed of stacked layers of graphene and is highly anisotropic in thermal conduction. As illustrated in FIG. 32, graphite has a plurality of layers, each of which is constructed of hexagonal fused rings of carbon atoms, which are bonded planarly. The plurality of layers defines a crystalline structure.

In the crystalline structure, adjacent carbon atoms in the layer are bonded with each other by a covalent bond. Bonding between layers of carbon atoms defines the van der Waals bond. The covalent bond achieves bonding greater than bonding of the van der Waals bond. Graphite is highly anisotropic with bonding within the layer and bonding between the layers. For example, a first thermal conductor (e.g., the first thermal conductors 89, 89A, 89B, and 89C) or a second thermal conductor (e.g., the second thermal conductors 90, 90A, 90B, and 90C) is made of graphite. Accordingly, the first thermal conductor or the second thermal conductor attains an efficiency in conduction of heat in the longitudinal direction X, which is greater than an efficiency in conduction of heat in a thickness direction, that is, a laminating direction (e.g., the horizontal direction in FIG. 30) in which the stay 65, the heater holder 64A, the second thermal conductor 90, the first thermal conductor 89B, and the heater 63A are arranged, thus suppressing conduction of heat to a heater holder (e.g., the heater holders 64 and 64A).

Consequently, the first thermal conductor or the second thermal conductor suppresses uneven temperature of a heater (e.g., the heaters 63 and 63A) in the longitudinal direction X thereof efficiently. Additionally, the first thermal conductor or the second thermal conductor minimizes heat conducted to the heater holder. The first thermal conductor or the second thermal conductor that is made of graphite attains enhanced heat resistance that inhibits oxidation at approximately 700 degrees Celsius.

The graphite sheet has a physical property and a dimension that are adjusted properly according to a function of the first thermal conductor or the second thermal conductor. For example, the graphite sheet is made of graphite having enhanced purity or single crystal graphite. The graphite sheet has an increased thickness to enhance anisotropic thermal conduction.

In order to perform high speed fixing, the fixing devices 60 and 60A employ the graphite sheet having a decreased thickness to decrease thermal capacity of the fixing devices 60 and 60A. If the fixing nip N and the heater 63A have an increased width in the longitudinal direction X thereof, the first thermal conductor or the second thermal conductor also has an increased width in the longitudinal direction X thereof.

In view of increasing mechanical strength, the graphite sheet preferably has a number of layers that is not smaller than 11 layers. The graphite sheet may include a part constructed of a single layer and another part constructed of a plurality of layers.

Referring to FIGS. 33 to 43, a description is provided of constructions of fixing devices according to modification embodiments of the fixing device 9 depicted in FIG. 2.

Figure 33:
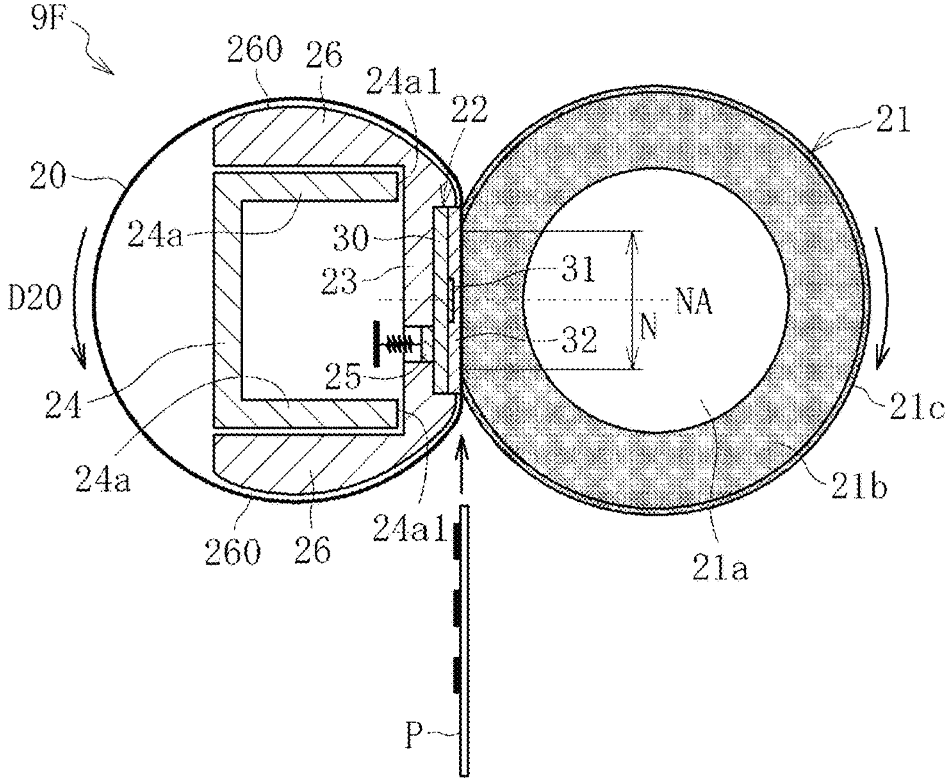
FIG. 33 is a schematic cross-sectional view of a fixing device according to yet another embodiment of the present disclosure, illustrating an arrangement of thermistors incorporated therein.

Referring to FIG. 33, a description is provided of a construction of a fixing device 9F according to an embodiment of the present disclosure.

The fixing device 9F includes the thermistors 25 disposed at a position different from a position of the thermistors 25 depicted in FIG. 2.

According to the embodiment, the thermistors 25 are disposed upstream from a center NA of the fixing nip N in the rotation direction D20 of the fixing belt 20. In other words, the thermistors 25 are disposed at the entry to the fixing nip N. Since a sheet P draws heat from the fixing belt 20 at the entry to the fixing nip N easily, the thermistors 25 detect a temperature of the heater 22 at the entry to the fixing nip N, thus achieving a fixing property of fixing a toner image on the sheet P properly and suppressing fixing offset effectively.

Figure 34:
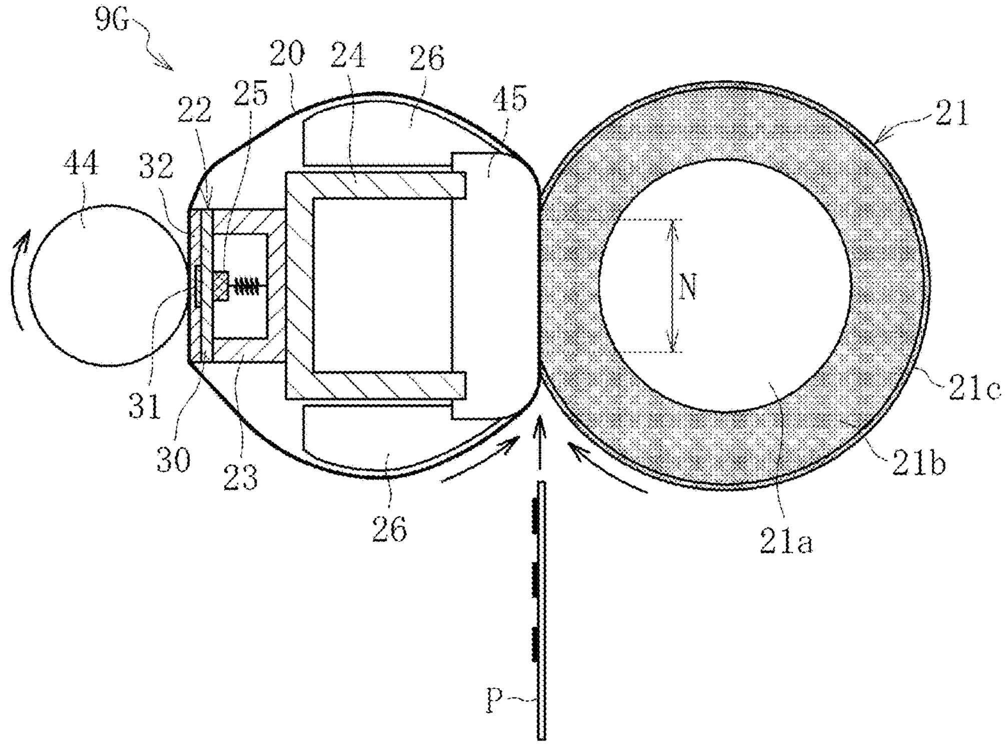
FIG. 34 is a schematic cross-sectional view of a fixing device according to yet another embodiment of the present disclosure.

Referring to FIG. 34, a description is provided of a construction of a fixing device 9G according to an embodiment of the present disclosure.

The fixing device 9G includes a pressurization roller 44 disposed opposite the pressure roller 21 via the fixing belt 20. The pressurization roller 44 serves as an opposed rotator disposed opposite the fixing belt 20 serving as a rotator. The pressurization roller 44 rotates in accordance with rotation of the fixing belt 20. The pressurization roller 44 and the heater 22 sandwich the fixing belt 20 so that the heater 22 heats the fixing belt 20.

Within the loop formed by the fixing belt 20 is a nip formation pad 45 that is disposed opposite the pressure roller 21 via the fixing belt 20. The stay 24 supports the nip formation pad 45. The nip formation pad 45 and the pressure roller 21 sandwich the fixing belt 20 and define the fixing nip N.

Figure 35:
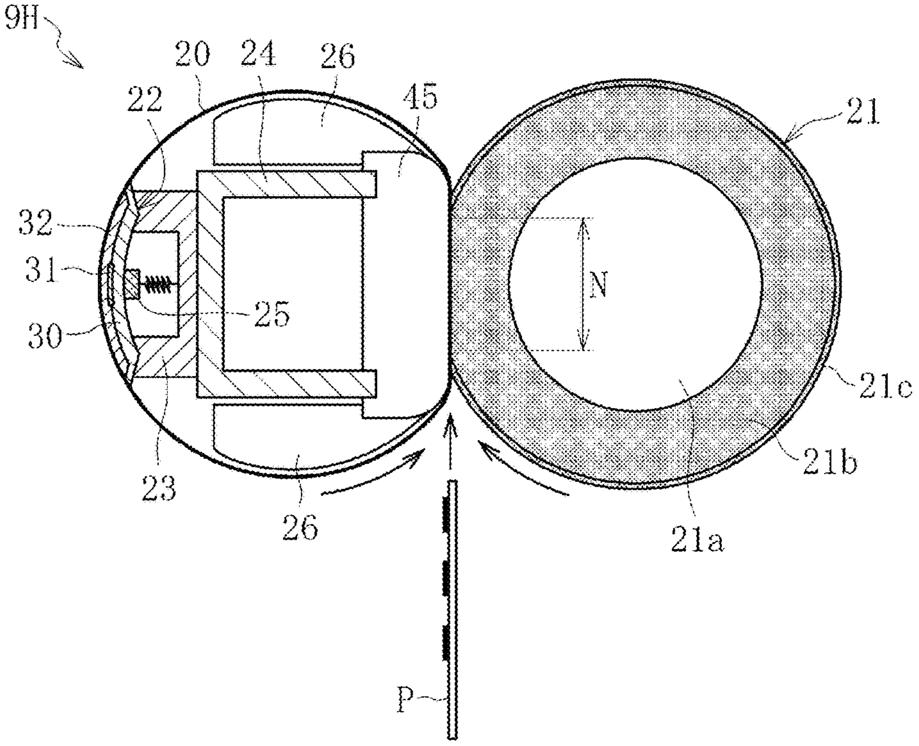
FIG. 35 is a schematic cross-sectional view of a fixing device according to yet another embodiment of the present disclosure.

Referring to FIG. 35, a description is provided of a construction of a fixing device 9H according to an embodiment of the present disclosure.

The fixing device 9H does not include the pressurization roller 44. In order to attain a contact length for which the heater 22 contacts the fixing belt 20 in the circumferential direction thereof, the heater 22 is curved into an arc in cross section that corresponds to a curvature of the fixing belt 20. Other construction of the fixing device 9H is equivalent to the construction of the fixing device 9G depicted in FIG. 34.

Figure 36:
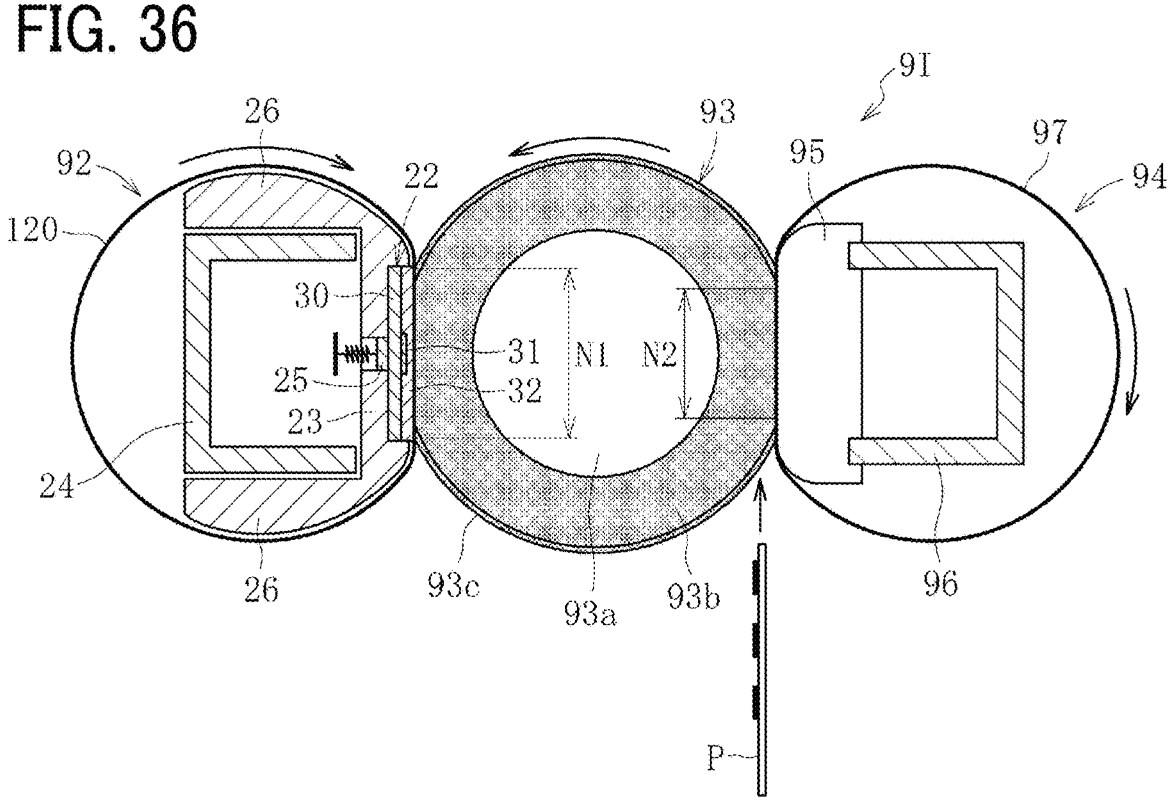
FIG. 36 is a schematic cross-sectional view of a fixing device according to yet another embodiment of the present disclosure.

Referring to FIG. 36, a description is provided of a construction of a fixing device 9I according to an embodiment of the present disclosure.

The fixing device 9I includes a heating assembly 92, a fixing roller 93 serving as a fixing rotator, and a pressure assembly 94 serving as an opposed rotator.

The heating assembly 92 includes the heater 22, the heater holder 23, and the stay 24 that are described in the embodiments above and a heating belt 120 serving as a rotator. The fixing roller 93 serves as an opposed rotator disposed opposite the heating belt 120 serving as the rotator. The fixing roller 93 rotates in accordance with rotation of the heating belt 120. The fixing roller 93 includes a core metal 93*a* that is solid and made of iron, an elastic layer 93*b* that is disposed on a surface of the core metal 93*a*, and a release layer 93*c* that coats an outer surface of the elastic layer 93*b*.

The pressure assembly 94 is disposed opposite the heating assembly 92 via the fixing roller 93. The pressure assembly 94 includes a nip formation pad 95, a stay 96, and a pressure belt 97. The pressure belt 97 rotates and is formed into a loop within which the nip formation pad 95 and the stay 96 are disposed. The heating belt 120 and the fixing roller 93 define a heating nip N1 therebetween. The pressure belt 97 and the fixing roller 93 define a fixing nip N2 therebetween. As a sheet P is conveyed through the fixing nip N2, the fixing roller 93 heated at the heating nip N1 and the pressure belt 97 fix a toner image formed on the sheet P thereon under heat and pressure.

Also in the fixing devices 9G, 9H, and 9I depicted in FIGS. 34, 35, and 36, respectively, the heater 22 is subject to a decreased heat generation amount at the gap B between the adjacent resistive heat generators 31. To address this circumstance, like the embodiments described above, each of the fixing devices 9G, 9H, and 9I includes a temperature detector including a temperature detecting element that is disposed opposite the gap B between the adjacent resistive heat generators 31 of the heater 22. Accordingly, the heater 22 heats an opposed portion of the rotator (e.g., the fixing belt 20 and the heating belt 120), which is disposed opposite the gap B, sufficiently. Consequently, the heater 22 attains the fixing property of fixing the toner image on the sheet P properly and prevents failures such as fixing offset.

Application of the technology of the present disclosure is not limited to the fixing devices (e.g., the fixing devices 9, 9A, 9B, 9C, 9D, 9E, 9F, 9G, 9H, 9I, 60, and 60A) according to the embodiments described above. For example, the technology of the present disclosure is also applied to a heater such a dryer that dries ink applied onto a sheet. Further, the technology of the present disclosure is also applied to a heater such as a thermocompression bonding device including a laminator and a heat sealer. The laminator bonds film as a coating member onto a surface of a sheet by thermocompression. The heat sealer bonds sealing portions of a packaging material by thermocompression. Accordingly, the heater heats the opposed portion of the rotator, which is disposed opposite the gap B, sufficiently.

Figure 37:
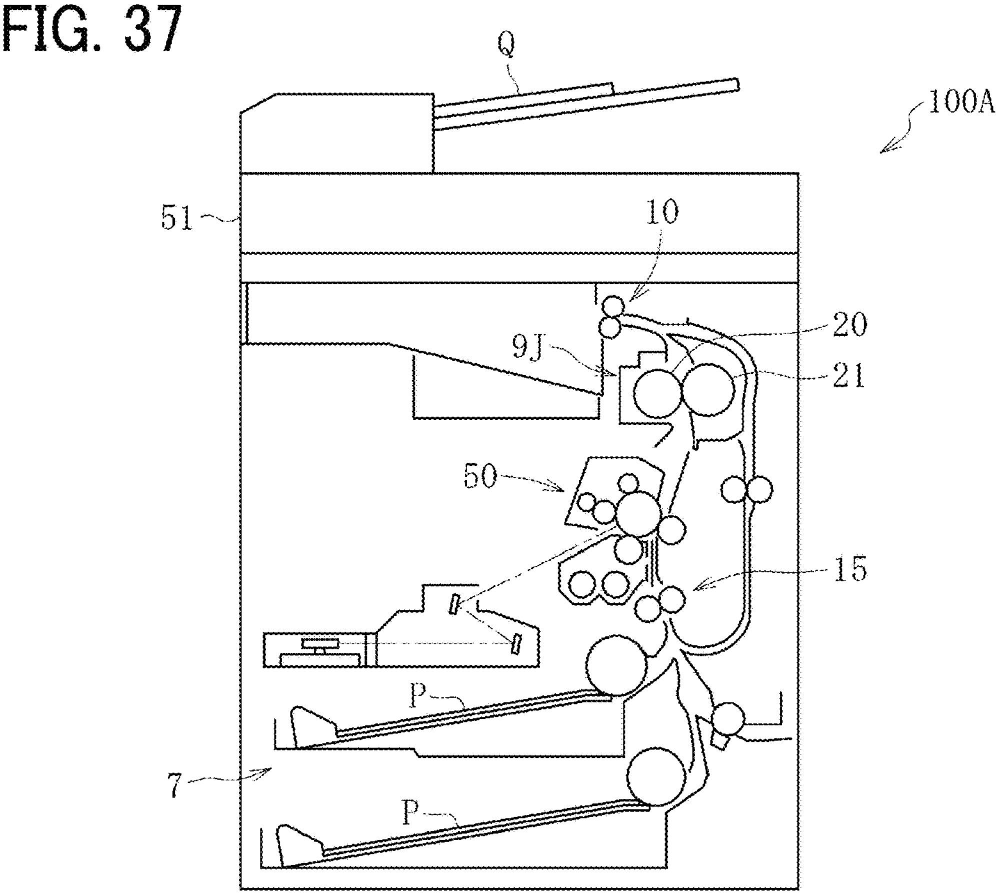
FIG. 37 is a schematic cross-sectional view of an image forming apparatus according to another embodiment of the present disclosure.

Application of the technology of the present disclosure is not limited to the color image forming apparatus 100 depicted in FIG. 1 that forms a color toner image. The technology of the present disclosure is also applied to a monochrome image forming apparatus that forms a monochrome toner image, a copier, a printer, a facsimile machine, a multifunction peripheral (MFP) having at least two of copying, printing, facsimile, scanning, and plotter functions, or the like. For example, FIG. 37 illustrates an image forming apparatus 100A applied with the technology of the present disclosure. The image forming apparatus 100A includes an image forming device 50 including a photoconductive drum, a sheet conveyance device including the timing roller pair 15, the sheet feeder 7, a fixing device 9J, the output device 10, and a scanner 51. The sheet feeder 7 includes a plurality of sheet trays (e.g., paper trays) that loads a plurality of sheets P having different sizes, respectively.

The scanner 51 reads an image on an original Q into image data. The sheet feeder 7 loads the plurality of sheets P and feeds the sheets P to a conveyance path one by one. The timing roller pair 15 conveys the sheet P conveyed through the conveyance path to the image forming device 50.

The image forming device 50 forms a toner image on the sheet P. For example, the image forming device 50 includes the photoconductive drum, a charging roller, an exposure device, a developing device, a replenishing device, a transfer roller, a cleaner, and a discharger. The toner image is a reproduction of the image on the original Q, for example.

The fixing device 9J fixes the toner image on the sheet P under heat and pressure. The sheet P bearing the fixed toner image is conveyed to the output device 10 by a conveyance roller and the like. The output device 10 ejects the sheet P onto an outside of the image forming apparatus 100A.

A description is provided of a construction of the fixing device 9J according to an embodiment of the present disclosure.

A description of a construction of the fixing device 9J, which is common to the fixing device 9 depicted in FIG. 2, is omitted properly.

Figure 38:
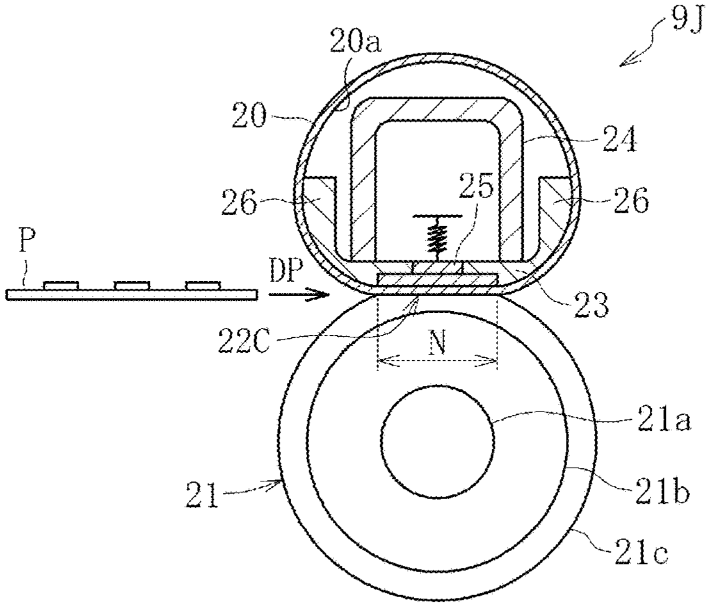
FIG. 38 is a schematic cross-sectional view of a fixing device incorporated in the image forming apparatus depicted in FIG. 37.

As illustrated in FIG. 38, the fixing device 9J includes the fixing belt 20, the pressure roller 21, a heater 22C, the heater holder 23, the stay 24, and the thermistors 25. The fixing belt 20 and the pressure roller 21 define the fixing nip N therebetween. The fixing nip N has a nip length of 10 mm in the sheet conveyance direction DP. The fixing belt 20 and the pressure roller 21 convey the sheet P at a linear velocity of 240 mm/s.

The fixing belt 20 includes the base layer made of polyimide and the release layer and does not include the elastic layer. The release layer is heat-resistant film made of fluororesin, for example. The fixing belt 20 has an outer diameter of approximately 24 mm.

The pressure roller 21 includes the core metal 21*a*, the elastic layer 21*b*, and the release layer 21*c*. The pressure roller 21 has an outer diameter in a range of from 24 mm to 30 mm. The elastic layer 21*b* has a thickness in a range of from 3 mm to 4 mm.

The heater 22C includes a base layer, a heat insulation layer, a conductor layer including a resistive heat generator, and an insulating layer. The heater 22C has a total thickness of 1 mm. The heater 22C has a length of 13 mm in the sheet conveyance direction DP, that is, the orthogonal direction Y depicted in FIG. 39.

Figure 39:
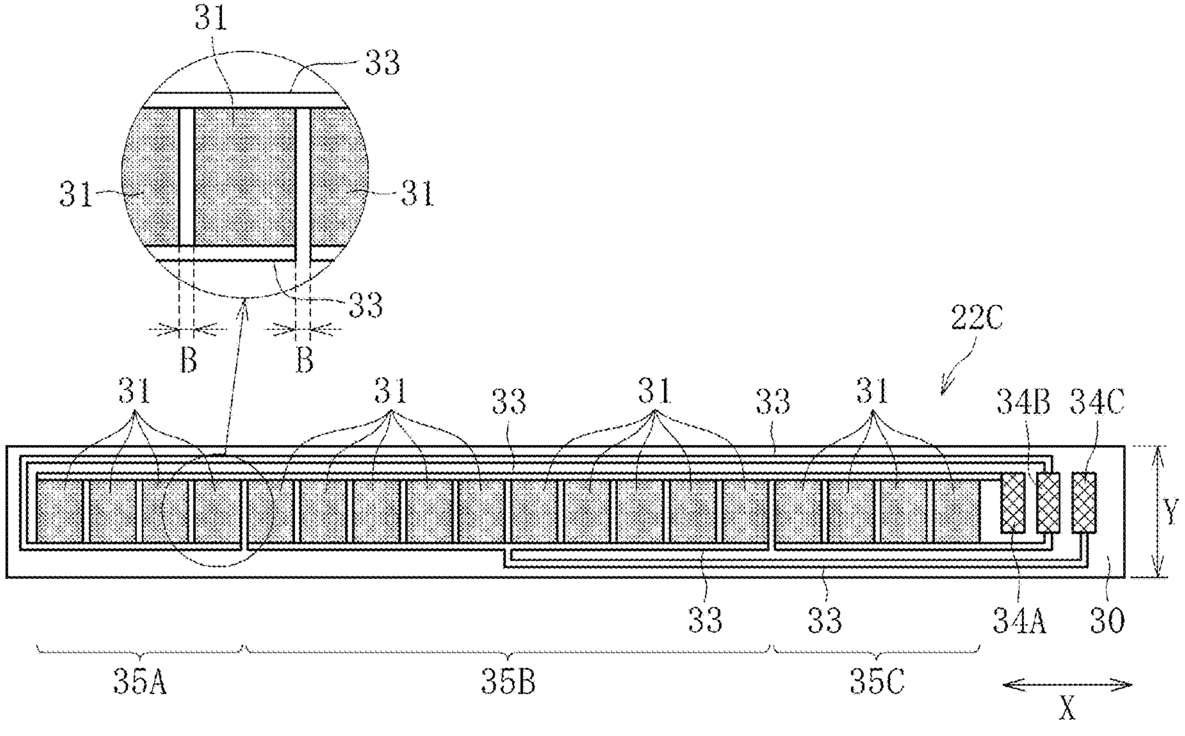
FIG. 39 is a plan view of a heater incorporated in the fixing device depicted in FIG. 38.

As illustrated in FIG. 39, the conductor layer of the heater 22C includes the plurality of resistive heat generators 31, the feeders 33, and electrodes 34A, 34B, and 34C. According to the embodiment also, as illustrated in an enlarged view in FIG. 39, the gap B is interposed between the adjacent resistive heat generators 31 in the longitudinal direction X in which the resistive heat generators 31 are arranged. FIG. 39 illustrates the two gaps B in the enlarged view. However, the gap B is disposed at each interval between the adjacent resistive heat generators 31 depicted in FIG. 39.

The heater 22C further includes three heat generating portions 35A, 35B, and 35C each of which is constructed of the resistive heat generators 31. The heat generating portions 35A and 35C serve as lateral end heaters that are disposed opposite and heat both lateral end spans of the fixing belt 20 in the longitudinal direction thereof, respectively. The heat generating portion 35B serves as a center heater that is disposed opposite and heats the center span of the fixing belt 20 in the longitudinal direction thereof. As the electrodes 34A and 34B are energized, the heat generation portions 35A and 35C generate heat. As the electrodes 34A and 34C are energized, the heat generation portion 35B generates heat. For example, in order to fix a toner image on a sheet P having a decreased size, the heat generation portion 35B generates heat. In order to fix a toner image on a sheet P having an increased size, the heat generation portions 35A, 35B, and 35C generate heat.

Figure 40:
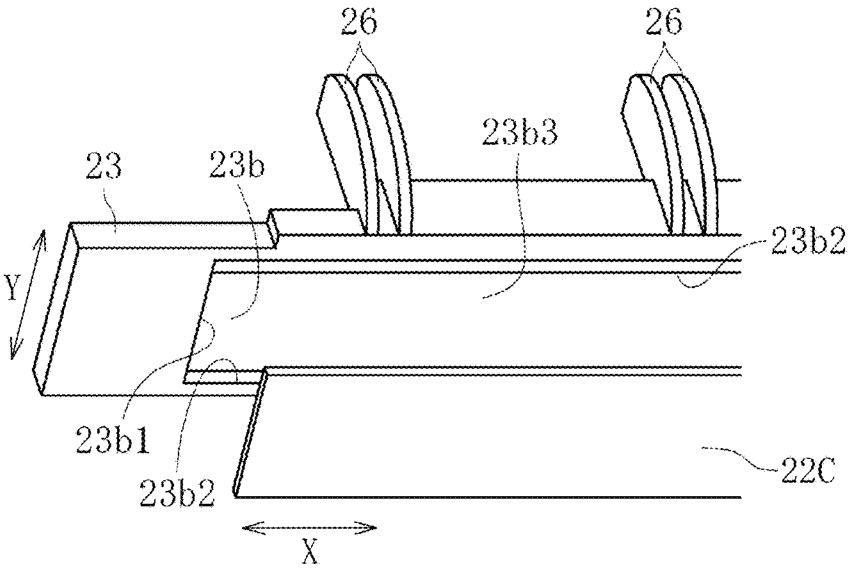
FIG. 40 is a perspective view of the heater and the heater holder incorporated in the fixing device depicted in FIG. 38.

As illustrated in FIG. 40, the recess 23*b* of the heater holder 23 holds or supports the heater 22C. The recess 23*b* is disposed on a heater opposed face of the heater holder 23, which is disposed opposite the heater 22C. The recess 23*b* includes a bottom face 23*b*3 and the side walls 23*b*1 and 23*b*2. The bottom face 23*b*3 is substantially parallel to the base 30 recessed with respect to the stay 24 compared to other faces of the heater 22C. The side wall 23*b*1 is disposed at at least one of both lateral ends of the heater holder 23 in the longitudinal direction X thereof and serves as an interior wall of the heater holder 23. The side walls 23*b*2 are disposed at both ends of the heater holder 23 in the orthogonal direction Y perpendicular to the longitudinal direction X thereof and serve as interior walls of the heater holder 23, respectively.

The heater holder 23 mounts the guides 26. The heater holder 23 is made of LCP.

Figure 41:
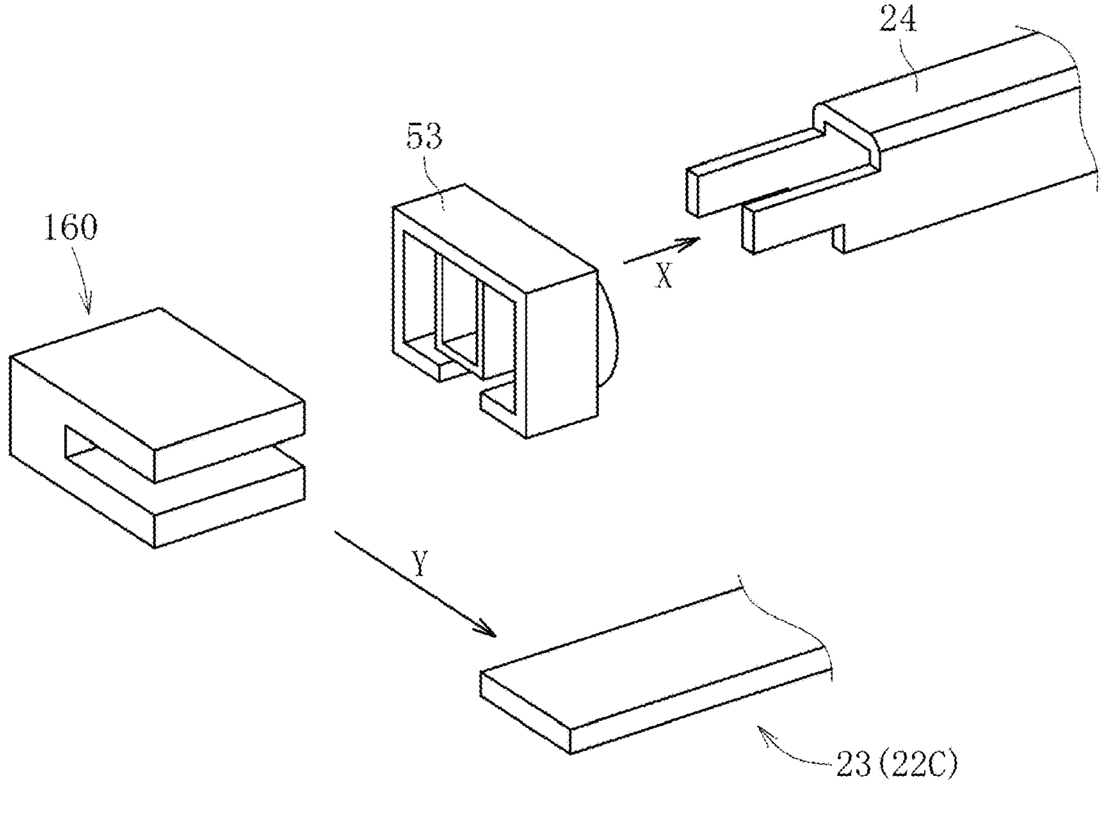
FIG. 41 is a perspective view of the heater depicted in FIG. 40 and a connector attached to the heater.

As illustrated in FIG. 41, the fixing device 9J further includes a connector 160 that includes a housing made of resin such as LCP and a plurality of contact terminals disposed in the housing. The connector 160 is attached to the heater 22C and the heater holder 23 such that the connector 160 sandwiches the heater 22C and the heater holder 23 together at a front face and a back face of the heater 22C and the heater holder 23.

In a state in which the connector 160 sandwiches and holds the heater 22C and the heater holder 23, as the contact terminals of the connector 160 contact and press against the electrodes 34A, 34B, and 34C of the heater 22C, the heat generating portions 35A, 35B, and 35C are electrically connected to a power supply disposed in the image forming apparatus 100A through the connector 160. Thus, the power supply is ready to supply power to the heat generating portions 35A, 35B, and 35C. At least a part of each of the electrodes 34A, 34B, and 34C is not coated with the insulating layer and is exposed so that each of the electrodes 34A, 34B, and 34C is coupled to the connector 160.

The fixing device 9J further includes a flange 53 that is disposed on each lateral end of the fixing belt 20 in the longitudinal direction X thereof. The flange 53 contacts the inner circumferential face 20*a* of the fixing belt 20 depicted in FIG. 38 and holds or supports the fixing belt 20 at each lateral end of the fixing belt 20 in the longitudinal direction X thereof. The flanges 53 are secured to a frame of the fixing device 9J. The flange 53 is inserted into each lateral end of the stay 24 in the longitudinal direction X thereof.

The connector 160 is attached to the heater 22C and the heater holder 23 in the orthogonal direction Y perpendicular to the longitudinal direction X of the heater 22C in which the resistive heat generators 31 are arranged. Alternatively, in order to attach the connector 160 to the heater holder 23, one of the connector 160 and the heater holder 23 may include a projection that engages a recess disposed in another one of the connector 160 and the heater holder 23 such that the projection moves inside the recess relatively. The connector 160 is attached to one lateral end of the heater 22C and the heater holder 23 in the longitudinal direction X of the heater 22C in which the resistive heat generators 31 are arranged. The one lateral end of the heater 22C and the heater holder 23 is opposite to another lateral end of the heater 22C and the heater holder 23 to which the driver (e.g., a motor) that drives the pressure roller 21 is coupled.

Figure 42:
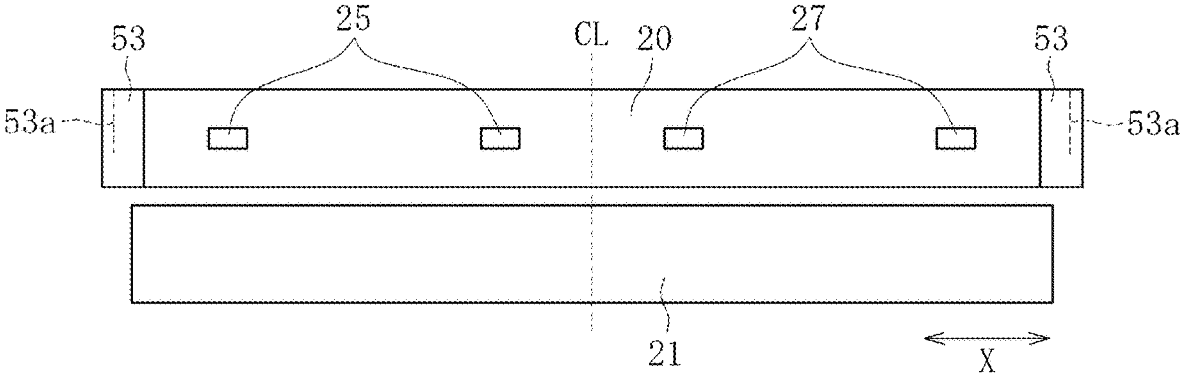
FIG. 42 is a diagram of the thermistors and thermostats incorporated in the fixing device depicted in FIG. 38, illustrating an arrangement of the thermistors and the thermostats.

As illustrated in FIG. 42, the thermistors 25 are disposed opposite the inner circumferential face 20*a* of the fixing belt 20 at a position in proximity to a center line CL and a position in one lateral end of the fixing belt 20 in the longitudinal direction X thereof, respectively. The controller 220 depicted in FIG. 5 controls the heater 22C based on a temperature of the fixing belt 20, that is detected by the thermistor 25 disposed at the position in proximity to the center line CL, and a temperature of the fixing belt 20, that is detected by the thermistor 25 disposed opposite the one lateral end of the fixing belt 20 in the longitudinal direction X thereof. Like the thermistor 25 of the fixing device 9 according to the embodiment described above with reference to FIG. 2, one of the thermistors 25 depicted in FIG. 42 is disposed opposite the gap B between the adjacent resistive heat generators 31 of the heater 22C.

The thermostats 27 are disposed opposite the inner circumferential face 20*a* of the fixing belt 20 at a position in proximity to the center line CL and a position in another lateral end of the fixing belt 20 in the longitudinal direction X thereof, respectively. If the thermostat 27 detects a temperature of the fixing belt 20, that is higher than a preset threshold, the thermostat 27 breaks power to the heater 22C.

The flanges 53 contact and support both lateral ends of the fixing belt 20 in the longitudinal direction X thereof, respectively. Each of the flanges 53 is made of LCP.

Figure 43:
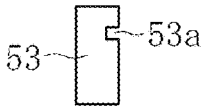
FIG. 43 is a diagram of a flange incorporated in the fixing device depicted in FIG. 38, illustrating a groove of the flange.

As illustrated in FIG. 43, the flange 53 includes a slide groove 53*a*. The slide groove 53*a* extends in a contact-separation direction in which the fixing belt 20 comes into contact with and separates from the pressure roller 21. The slide groove 53*a* engages an engagement mounted on the frame of the fixing device 9J. As the engagement moves relatively inside the slide groove 53*a*, the fixing belt 20 moves in the contact-separation direction with respect to the pressure roller 21.

Also in the fixing device 9J depicted in FIG. 38, the temperature detecting element of each of the thermistors 25 is disposed opposite the gap B between the adjacent resistive heat generators 31 of the heater 22C. Accordingly, the heater 22C heats the opposed portion of the fixing belt 20, which is disposed opposite the gap B, sufficiently. Consequently, the heater 22C attains the fixing property of fixing the toner image on the sheet P properly and prevents failures such as fixing offset.

An image forming apparatus that forms a monochrome toner image with toner in a single color is less susceptible to hot offset compared to an image forming apparatus that forms a color toner image with toners in a plurality of colors. Hence, like in the embodiments of the present disclosure, even if the controller 220 controls the heater 22C based on a detection result provided by the temperature detecting element that is disposed opposite the gap B between the adjacent resistive heat generators 31, the image forming apparatus that uses the toner in the single color is less susceptible to hot offset advantageously.

The above describes the embodiments of the present disclosure. However, the technology of the present disclosure is not limited to the embodiments described above and is modified into variations. For example, the separation plate 310 depicted in FIG. 9A moves toward and away from the fixing belt 20. The separation plate 310 pivots as described above in the embodiments. Alternatively, in a state in which the separation plate 310 retains parallelism with the heater holder 23, the separation plate 310 may move in parallel to a contact-separation direction with respect to the fixing belt 20.

The separation plate 310 may be secured such that the separation plate 310 does not move. For example, the separation plate 310 may be modified as long as the separation plate 310 includes the edge portion 311 and the contact portions 313. The edge portion 311 contacts the sheet P serving as the conveyed object and does not contact the fixing belt 20. As the contact portions 313 contact the fixing belt 20, the contact portions 313 retain the gap having a predetermined size between the edge portion 311 and the fixing belt 20.

According to the embodiments described above, the fixing belt 20 or 61 of the fixing device 9, 9A, 9B, 9C, 9D, 9E, 9F, 9G, 9H, 9I, 9J, 60, or 60A is used as an endless belt. Alternatively, the endless belt may be a photoconductor belt. For example, the separation plate 310 may be installed in an image forming apparatus that transfers a toner image borne on the photoconductor belt serving as an image bearer onto a recording medium serving as a conveyed object. The separation plate 310 separates the recording medium from the photoconductor belt.

Yet alternatively, the endless belt may be the intermediate transfer belt 11 serving as an image bearer depicted in FIG. 1. For example, the separation plate 310 separates the recording medium conveyed through the secondary transfer nip formed between the intermediate transfer belt 11 and the secondary transfer roller 13 from the intermediate transfer belt 11. Similarly, the endless belt may be an intermediate transfer belt employed by an inkjet image forming apparatus. The separation plate 310 may be installed in other inkjet image forming apparatus in which a pressure rotator presses against a nip formation pad via an endless belt to form a nip between the pressure rotator and the endless belt. As a conveyed object is conveyed through the nip, the separation plate 310 separates the conveyed object that has passed through the nip from the endless belt.

A description is provided of advantages of a nip forming device (e.g., the fixing devices 9, 9A, 9B, 9C, 9D, 9E, 9F, 9G, 9H, 9I, 9J, 60, and 60A).

As illustrated in FIGS. 2 and 9A, the nip forming device (e.g., a nip forming unit) includes an endless belt (e.g., the fixing belts 20 and 61 and the pressure belt 97), a nip former (e.g., the heaters 22, 22A, 22B, 22C, 63, and 63A and the nip formation pads 45 and 95), a pressure rotator (e.g., the pressure rollers 21 and 62 and the fixing roller 93), a guide (e.g., the flange 400), and a separator (e.g., the separation plate 310).

The endless belt is flexible and rotates. The nip former (e.g., a nip formation pad) is disposed opposite or contacts an inner circumferential face (e.g., the inner circumferential face 20*a*) of the endless belt. The pressure rotator presses against the nip former via the endless belt to form a nip (e.g., the fixing nip N) between the endless belt and the pressure rotator. The guide guides each lateral end of the endless belt in a longitudinal direction (e.g., the longitudinal direction X) thereof. A conveyed object (e.g., the sheet P) is conveyed through the nip. The separator separates the conveyed object that is past the nip from the endless belt. The separator includes a non-contact portion (e.g., the edge portion 311) and a contact portion (e.g., the contact portion 313). The non-contact portion is separated from the endless belt. As illustrated in FIG. 7C, the contact portion contacts the endless belt and retains a gap (e.g., the gap G2) having a predetermined size between the non-contact portion and the endless belt.

Accordingly, the contact portion optimizes the gap between the endless belt and the separator, improving separation of the conveyed object from the endless belt.

According to the embodiments described above, the fixing belt 20 serves as an endless belt. Alternatively, a fixing film, a fixing sleeve, or the like may be used as an endless belt. Further, the pressure roller 21 serves as a pressure rotator. Alternatively, a pressure belt or the like may be used as a pressure rotator.

Some aspects of the present disclosure are further described below.

Aspect 1

A nip forming device includes: an endless belt that is rotatable and flexible; a nip former disposed to contact an inner circumferential face of the endless belt; a pressure rotator to press against the nip former via the endless belt to form a nip between the endless belt and the pressure rotator; a guide to guide each lateral end of the endless belt in a longitudinal direction of the endless belt; and a separator to separate the conveyed object from the endless belt, the separator including: a non-contact portion separated from the endless belt; and a contact portion to contact the endless belt to retain a gap having a predetermined size between the non-contact portion and the endless belt.

Aspect 2

The nip forming device according to aspect 1, wherein the separator is disposed to be movable toward the endless belt in an approach direction and away from the endless belt in a separation direction, wherein a motion restrictor is disposed that includes: a first restricting portion to restrict a moving position of the separator in the approach direction; and a second restricting portion to restrict a moving position of the separator in the separation direction.

Aspect 3

The nip forming device according to aspect 2, further comprising a biasing member to bias the separator in the approach direction.

Aspect 4

The nip forming device according to aspect 3, wherein the nip former is disposed to be movable with respect to the pressure rotator between an approach position where the pressure rotator presses against the nip former via the endless belt at the nip and a separation position where the pressure rotator releases pressure applied at the nip, and wherein the nip former is configured to be movable to the separation position in a state in which the first restricting portion restricts motion of the separator.

Aspect 5

The nip forming device according to any one of aspects 2 to 4, wherein, when the separator moves in the separation direction, the second restricting portion restricts motion of the separator in the separation direction at a position where the separator does not come into contact with the pressure rotator.

Aspect 6

The nip forming device according to any one of aspects 2 to 5, wherein the separator includes a separation plate movably supported between a pair of side plates, and wherein the motion restrictor is disposed between the separation plate and each side plate of the pair of side plates.

Aspect 7

The nip forming device according to aspect 6, wherein the motion restrictor includes a motion restricted tab formed on an end of the separation plate and a motion restricting hole formed in each of the side plates, and wherein the first restricting portion is formed by one end of the motion restricting hole, and the second restriction portion is formed by another end of the motion restricting hole the motion restricted tab inserted into the motion restricting hole.

Aspect 8

The nip forming device according to any one of aspects 1 to 7, wherein the contact portion is disposed outboard from a conveyance span of the conveyed object in a longitudinal direction of the endless belt, the conveyance span where the conveyed object is conveyed over the endless belt.

Aspect 9

The nip forming device according to aspect 8, further comprising at least three heaters divided and disposed on the nip format to heat the endless belt, wherein the at least three heaters include: a center heater to heat a center of the endless belt in a longitudinal direction of the endless belt; and end heaters to heat both ends of the endless belt in the longitudinal direction of the endless belt.

Aspect 10

An image forming apparatus, comprising the nip forming device according to any one of aspects 1 to 9.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. A nip forming device comprising:
an endless belt that is flexible, the endless belt configured to rotate;
a nip former disposed opposite an inner circumferential face of the endless belt;
a pressure rotator configured to press against the nip former via the endless belt to form a nip between the endless belt and the pressure rotator, the nip through which a conveyed object is conveyed; and
a separator disposed downstream from the nip in a conveyance direction of the conveyed object, the separator configured to separate the conveyed object from the endless belt,
the separator including:
a non-contact portion separated from the endless belt; and
a contact portion configured to contact the endless belt, the contact portion configured to retain a gap having a predetermined size between the non-contact portion and the endless belt; and
a flange to support both lateral ends of the endless belt in axial direction of the endless belt,
wherein a slack rate Sr, which is defined as [Sa/Di]×100, is in a range of 0.1% to 10%, wherein Sa represents a difference in height coordinate of a top of the fixing belt before and after the top of the fixing belt is pressed against the flange, and Di represents a diameter of the fixing belt.

2. The nip forming device according to claim 1, further comprising a guide configured to guide each lateral end of the endless belt in a longitudinal direction of the endless belt.

3. The nip forming device according to claim 1,
wherein the separator is configured to move toward the endless belt in an approach direction and separate from the endless belt in a separation direction.

4. The nip forming device according to claim 3, further comprising a motion restrictor including:
a first restricting portion configured to restrict motion of the separator in the approach direction; and
a second restricting portion configured to restrict motion of the separator in the separation direction.

5. The nip forming device according to claim 4,
wherein the second restricting portion is configured to restrict motion of the separator in the separation direction at a position where the separator does not come into contact with the pressure rotator.

6. The nip forming device according to claim 5, further comprising a biasing structure to bias the separator in the approach direction.

7. The nip forming device according to claim 6,
wherein the nip former is configured to move with respect to the pressure rotator between a pressurization position where the pressure rotator presses against the nip former via the endless belt at the nip and a separation position where the pressure rotator releases pressure applied at the nip, and
wherein the nip former is configured to move to the separation position in a state in which the first restricting portion restricts motion of the separator.

8. The nip forming device according to claim 6,
wherein the separator includes a separation plate configured to move.

9. The nip forming device according to claim 8, further comprising a side plate configured to support the separation plate.

10. The nip forming device according to claim 9,
wherein the motion restrictor is interposed between the separation plate and the side plate.

11. The nip forming device according to claim 10,
wherein the side plate has a motion restricting hole defined by the first restricting portion and the second restricting portion disposed opposite the first restricting portion, and
wherein the motion restrictor further includes a motion restricted tab mounted on a lateral end of the separation plate in a longitudinal direction of the separation plate, the motion restricted tab inserted into the motion restricting hole.

12. The nip forming device according to claim 10, further comprising a support shaft projecting from the side plate,
wherein the separation plate is configured to pivot about the support shaft.

13. The nip forming device according to claim 9,
wherein the biasing structure includes a tension spring interposed between the side plate and the separation plate.

14. The nip forming device according to claim 9,
wherein the side plate includes a recess configured to support the pressure rotator.

15. The nip forming device according to claim 1,
wherein the contact portion is disposed outboard from a conveyance span in a longitudinal direction of the endless belt, the conveyance span where the conveyed object is conveyed over the endless belt.

16. The nip forming device according to claim 1,
wherein the nip former includes:
a center heater disposed opposite a center span of the endless belt in a longitudinal direction of the endless belt, the center heater configured to heat the center span of the endless belt; and
a plurality of lateral end heaters disposed opposite both lateral end spans of the endless belt in the longitudinal direction of the endless belt, respectively, the plurality of lateral end heaters configured to heat the lateral end spans of the endless belt, respectively.

17. The nip forming device according to claim 1, wherein the nip former includes a pad.

18. The nip forming device according to claim 1, wherein the nip former includes a heater configured to heat the endless belt.

19. An image forming apparatus comprising:

an image forming device configured to form an image; and a nip forming device through which a conveyed object bearing the image is conveyed, the nip forming device including:

an endless belt that is flexible, the endless belt configured to rotate;

a nip former disposed opposite an inner circumferential face of the endless belt;

a pressure rotator configured to press against the nip former via the endless belt to form a nip between the endless belt and the pressure rotator, the nip through which the conveyed object is conveyed;

a separator disposed downstream from the nip in a conveyance direction of the conveyed object, the separator configured to separate the conveyed object from the endless belt, the separator including:

a non-contact portion separated from the endless belt; and a contact portion configured to contact the endless belt, the contact portion configured to retain a gap having a predetermined size between the non-contact portion and the endless belt, a flange to support both lateral ends of the endless belt in the axial direction of the endless belt, wherein a slack rate Sr, which is defined as $[Sa/Di]\times 100$, is in a range of 0.1% to 10%, wherein Sa represents a difference in height coordinate of a top of the fixing belt before and after the top of the fixing belt is pressed against the flange, and Di represents a diameter of the fixing belt.

* * * * *